(12) United States Patent
Fujii et al.

(10) Patent No.: US 6,493,113 B1
(45) Date of Patent: Dec. 10, 2002

(54) SHEET CONVEYING APPARATUS AND IMAGE FORMING APPARATUS THEREWITH

(75) Inventors: Takayuki Fujii, Tokyo (JP); Chikara Sato, Hachioji (JP); Katsuya Yamazaki, Kawasaki (JP); Yuzoh Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/313,738

(22) Filed: May 18, 1999

(30) Foreign Application Priority Data

May 20, 1998 (JP) ............................................. 10-138953

(51) Int. Cl.[7] ............................................. H04N 1/04
(52) U.S. Cl. ...................................................... 358/488
(58) Field of Search ................................ 358/498, 488; 271/10.03, 10.11, 111, 117

(56) References Cited

U.S. PATENT DOCUMENTS

| | | | |
|---|---|---|---|
| 5,535,012 A | | 7/1996 | Matsumoto et al. ........ 358/400 |
| 5,580,045 A | | 12/1996 | Matsumoto et al. ........ 271/298 |
| 6,009,303 A | * | 12/1999 | Kumagai et al. ........... 399/370 |
| 6,038,424 A | * | 3/2000 | Nakagawa ................... 399/367 |
| 6,118,972 A | * | 9/2000 | Yamazaki et al. .......... 399/370 |
| 6,131,898 A | * | 10/2000 | Hiroi et al. ............... 271/10.03 |
| 6,145,834 A | * | 11/2000 | Hirota et al. ................ 271/225 |

* cited by examiner

*Primary Examiner*—Jerome Grant, II
(74) *Attorney, Agent, or Firm*—Fitzpatrick, Cella, Harper & Scinto

(57) ABSTRACT

An original conveying apparatus including an original stacker, a conveying roller for conveying originals on the original stacker one by one, a first rotary member for further conveying the original to a reading position, a second rotary member for conveying the original conveyed by the first rotary member to read the original, a reading device, a sensor disposed in the vicinity of the first rotary member for detecting passage of the original, and a control device for controlling an original conveying amount of the second rotary member by the action of the sensor to convey a leading end of the original to a predetermined position on the reading position, and wherein the control device controls the original conveying amount in consideration of a length of the original based on a timing when a trailing end of the original passes by the sensor when the original has a fixed size and controls the original conveying amount based on a timing when a leading end of the original passes by the sensor when the original has a non-fixed size.

12 Claims, 45 Drawing Sheets

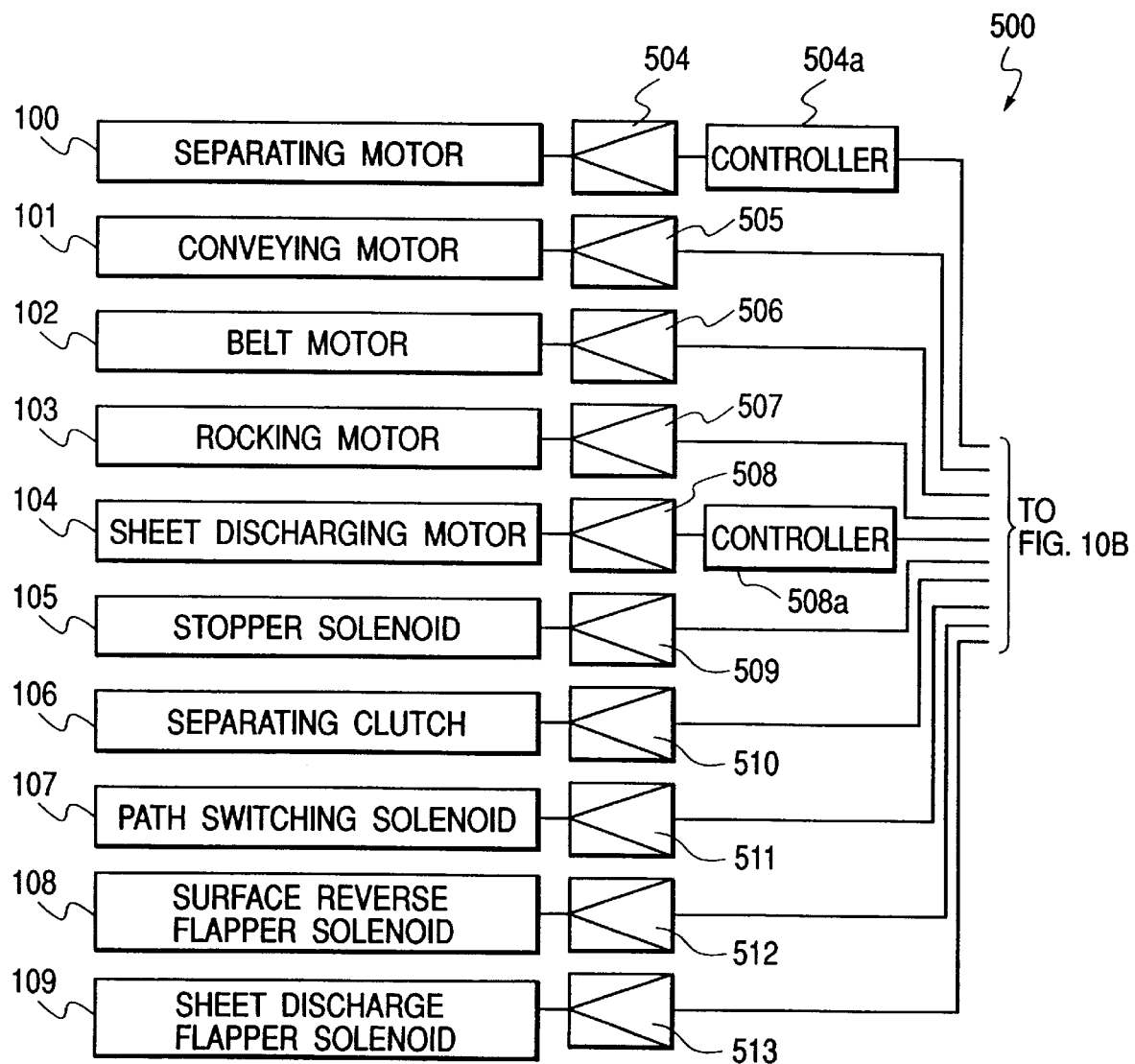

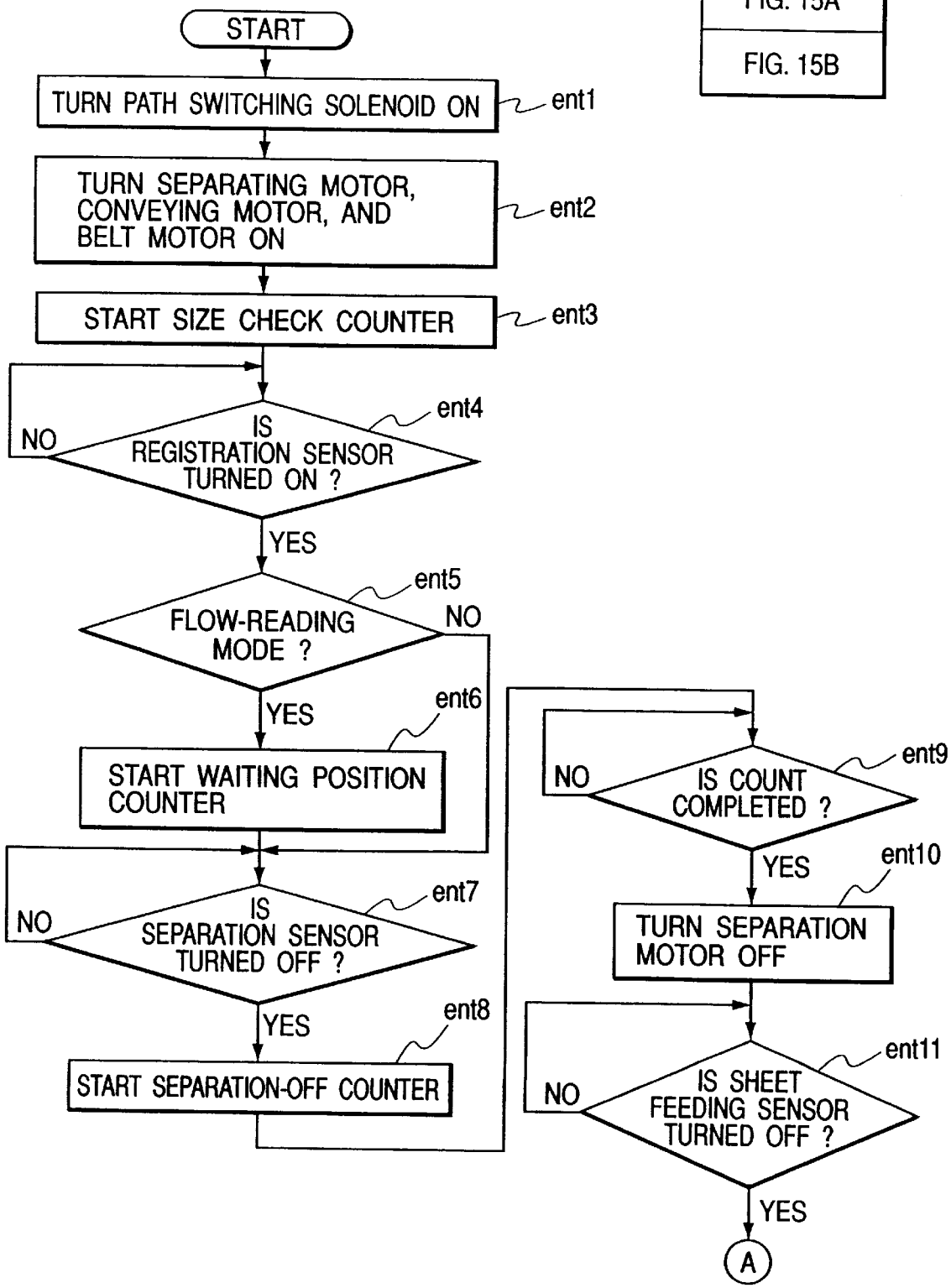
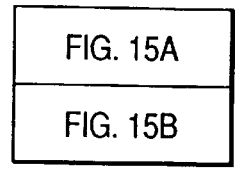
FIG. 15A
FIG. 15

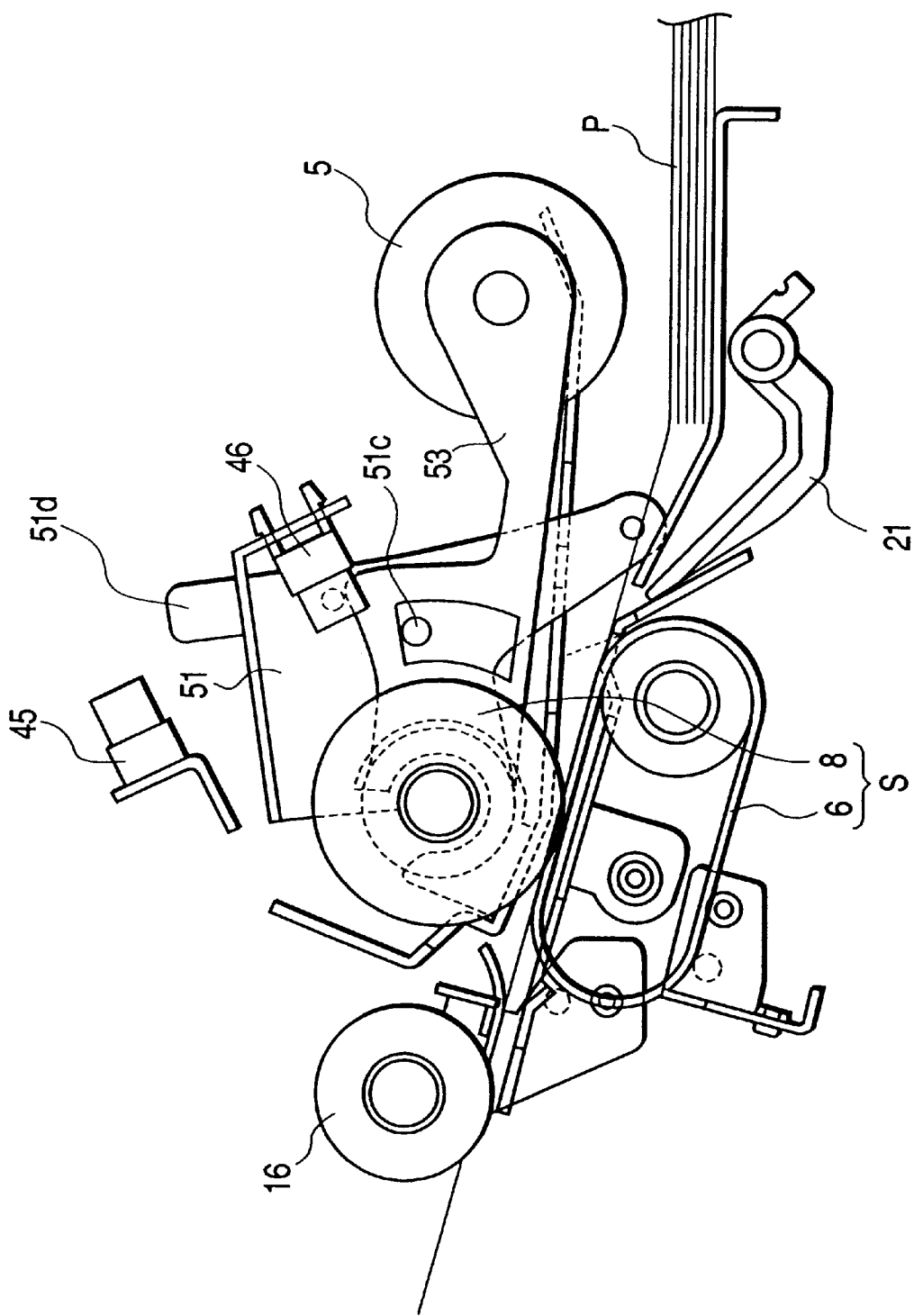

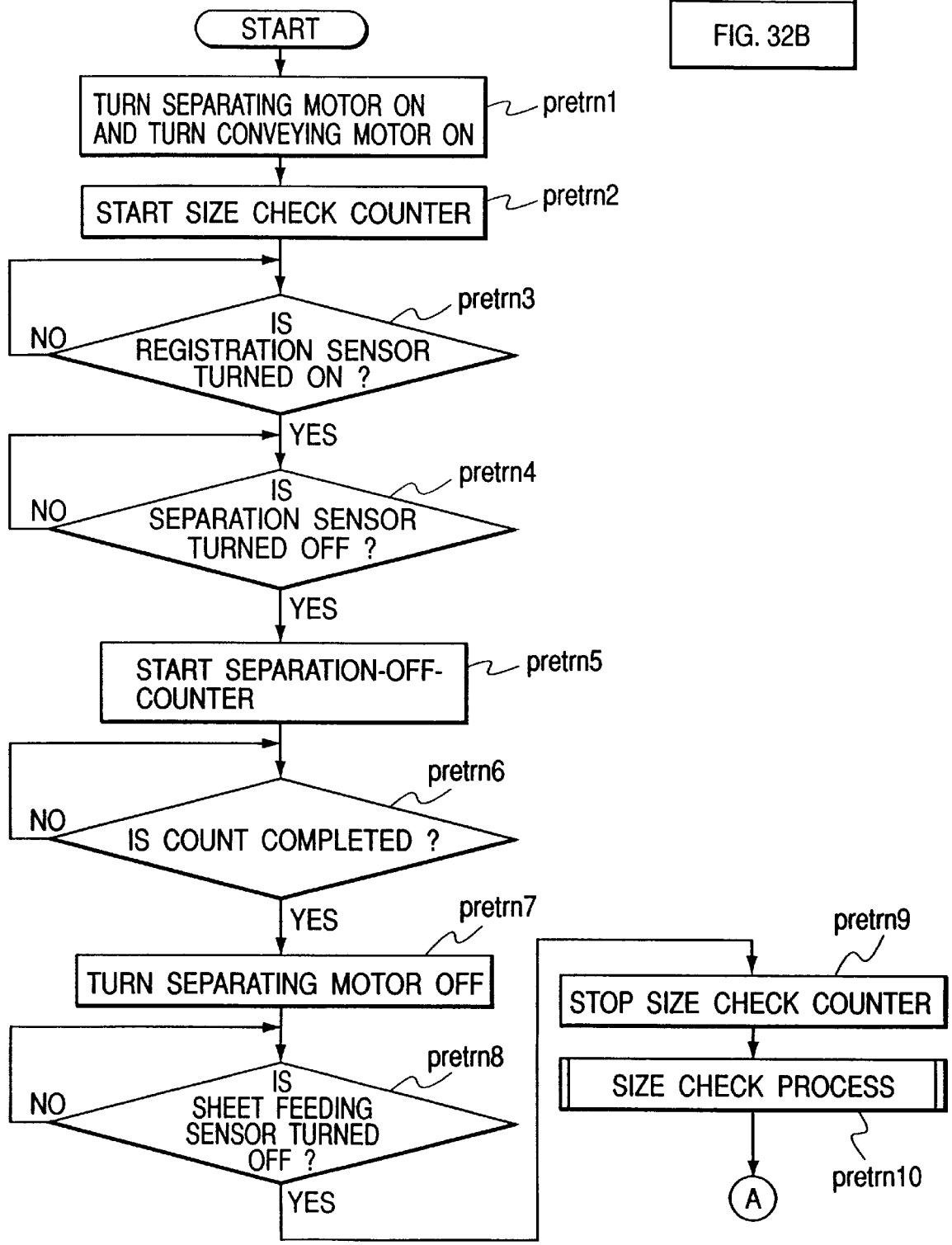

ent is to provide a sheet conveying apparatus
SHEET CONVEYING APPARATUS AND IMAGE FORMING APPARATUS THEREWITH

BACKGROUND OF THE INVENTION

1. Field of the Invention

The present invention relates to a sheet conveying apparatus for conveying a sheet, and an image forming apparatus having such a sheet conveying apparatus.

2. Related Background Art

Conventionally, a sheet conveying apparatus for conveying an original, a copy sheet or the like has been used with an image forming apparatus such as a copying machine, a facsimile, a laser beam printer and the like.

In such a sheet conveying apparatus, it is required that a position of a sheet (particularly, a position of a leading end of the sheet) being conveyed is monitored for various reasons (for example, in order to stop the sheet being conveyed at a predetermined position (for example, when the sheet conveying apparatus is used for conveying an original in a copying machine, the original is stopped at a waiting position where the original is waited until a scanner becomes a readable condition or the original is stopped at an image reading position where the original is read), or, in order to effect any control at a timing when the sheet is conveyed to a predetermined position).

In order to monitor or grasp the leading end of the sheet being conveyed, although it is considered that sensors are disposed at predetermined positions (for example, in the vicinity of the waiting position or in the vicinity of the image reading position), in some cases, it is obliged that the sensors are arranged at upstream sides of the predetermined positions for various reasons (for example, problem regarding an installation space). In such cases, the position of the sheet has been grasped in the following methods:

(1) method in which a timing of passage of the "leading end" of the sheet is (detected by the sensor and the position is grasped on the basis of a conveying amount of the sheet after such timing; and (2) method in which a timing of passage of the "trailing end" of the sheet is detected by the sensor and the position of the leading end of the sheet is detected on the basis of a value obtained by adding a "length of sheet" to a "conveying amount of the sheet after such timing".

Incidentally, in both methods (1) and (2), the conveying amount of the sheet is calculated on the basis of a signal from conveying means for conveying the sheet.

However, since the conveying amount of the sheet calculated on the basis of the signal from the conveying means includes any error more or less, when the above method (1) in which the conveying amount of the sheet is great is used, there arises a problem that grasp of the position of the sheet becomes incorrect.

On the other hand, when the above method (2) is used, since the conveying amount of the sheet is small in comparison with the above method (1), such a problem is reduced. However, if a sheet having a non-fixed size is conveyed, since it is difficult to detect a length of such a sheet correctly, any error is generated.

SUMMARY OF THE INVENTION

The present invention aims to eliminate the above-mentioned conventional drawbacks, and an object of the present invention is to provide a sheet conveying apparatus in which a sheet having a fixed size and a sheet having a non-fixed size can be conveyed to a predetermined position correctly.

According to the present invention, there is provided a sheet conveying apparatus comprising sheet conveying means, detecting means for detecting passage of a sheet, and control means for controlling a sheet conveying amount of the sheet conveying means by the action of the detecting means to convey a leading end of the sheet to a predetermined position, and wherein the control means controls the sheet conveying amount in consideration of a length of the sheet on the basis of a timing when a trailing end of the sheet passes by the detecting means when the sheet has a fixed size and controls the sheet conveying amount on the basis of a timing when a leading end of the sheet passes by the detecting means when the sheet has a non-fixed size.

The present invention further provides a sheet conveying apparatus comprising original stacking means, feeding means for feeding originals on the original stacking means one by one, a first rotary member for further feeding the original to a reading position, a second rotary member for feeding the original fed by the first rotary member to read the original, reading means, detecting means disposed in the vicinity of the first rotary member to detect passage of the original, and control means for controlling an original conveying amount of the second rotary member by the action of the detecting means to stop a leading end of the original in a predetermined position of the reading position, and wherein the control means controls the original conveying amount in consideration of a length of the original on the basis of a timing when a trailing end of the original passes by the detecting means when the original has a fixed size and controls the original conveying amount on the basis of a timing when a leading end of the original passes by the detecting means when the original has a non-fixed size.

The present invention further provides a sheet conveying apparatus having conveying means for conveying a sheet, comprising size judging means for judging whether the sheet has a fixed size or a non-fixed size, length detecting means for detecting a length of the sheet in a conveying direction, sheet detecting means for detecting a timing of passage of a leading end of the sheet and a timing of passage of a trailing end of the sheet to generate a signal, conveying amount detecting means for receiving the signal from the sheet detecting means and for calculating a sheet conveying amount after the timing of passage of the leading end of the sheet or the timing of passage of the trailing end of the sheet, and conveying position calculating means for calculating a position of the leading end of the sheet conveyed at a downstream side of the sheet detecting means, and wherein, when it is judged that the sheet has the fixed size by the size judging means, the conveying position calculating means calculates the position of the leading end of the sheet on the basis of the sheet conveying amount after the timing of passage of the trailing end of the sheet calculated by the conveying amount detecting means and the length of the sheet in the conveying direction detected by the length detecting means, and, when it is judged that the sheet has the non-fixed size by the size judging means, the conveying position calculating means calculates the position of the leading end of the sheet on the basis of the sheet conveying amount after the timing of passage of the leading end of the sheet calculated by the conveying amount detecting means.

The present invention further provides an image forming apparatus comprising a sheet conveying apparatus for conveying an original, image reading means for reading an image on the original, and an image outputting portion for outputting the read image, in which the sheet conveying apparatus includes conveying means for conveying the original, size judging means for judging whether the original has a fixed size or a non-fixed size, length detecting means for detecting a length of the original in a conveying direction, sheet detecting means for detecting a timing of passage of a leading end of the original and a timing of passage of a trailing end of the original to generate a signal, conveying amount detecting means for receiving the signal from the sheet detecting means and for calculating an original conveying amount after the timing of passage of the leading end of the original or the timing of passage of the trailing end of the original, and conveying position calculating means for calculating a position of the leading end of the original conveyed at a downstream side of the sheet detecting means, and wherein, when it is judged that the original has the fixed size by the size judging means, the conveying position calculating means calculates the position of the leading end of the original on the basis of the original conveying amount after the timing of passage of the trailing end of the original calculated by the conveying amount detecting means and the length of the original in the conveying direction detected by the length detecting means, and, when it is judged that the original has the non-fixed size by the size judging means, the conveying position calculating means calculates the position of the leading end of the original on the basis of the original conveying amount after the timing of passage of the leading end of the original calculated by the conveying amount detecting means.

According to the feature of the present invention, both sheets having the fixed size and non-fixed size can be conveyed to the predetermined position correctly.

BRIEF DESCRIPTION OF THE DRAWINGS

FIGS. 6A, 6B and 6C are views showing parts such as a rocking arm and the like;

FIG. 7 is a plan view showing the sheet feeding roller and the like;

FIG. 16 is a view for explaining a retracted position of the sheet feeding roller;

DESCRIPTION OF THE PREFERRED EMBODIMENTS

The present invention will now be explained in connection with embodiments thereof with reference to the accompanying drawings.

The embodiments of the present invention will be described with reference to FIGS. 1 to 43.

Explanation of Entire Construction of Image Forming Apparatus

Figure 1:
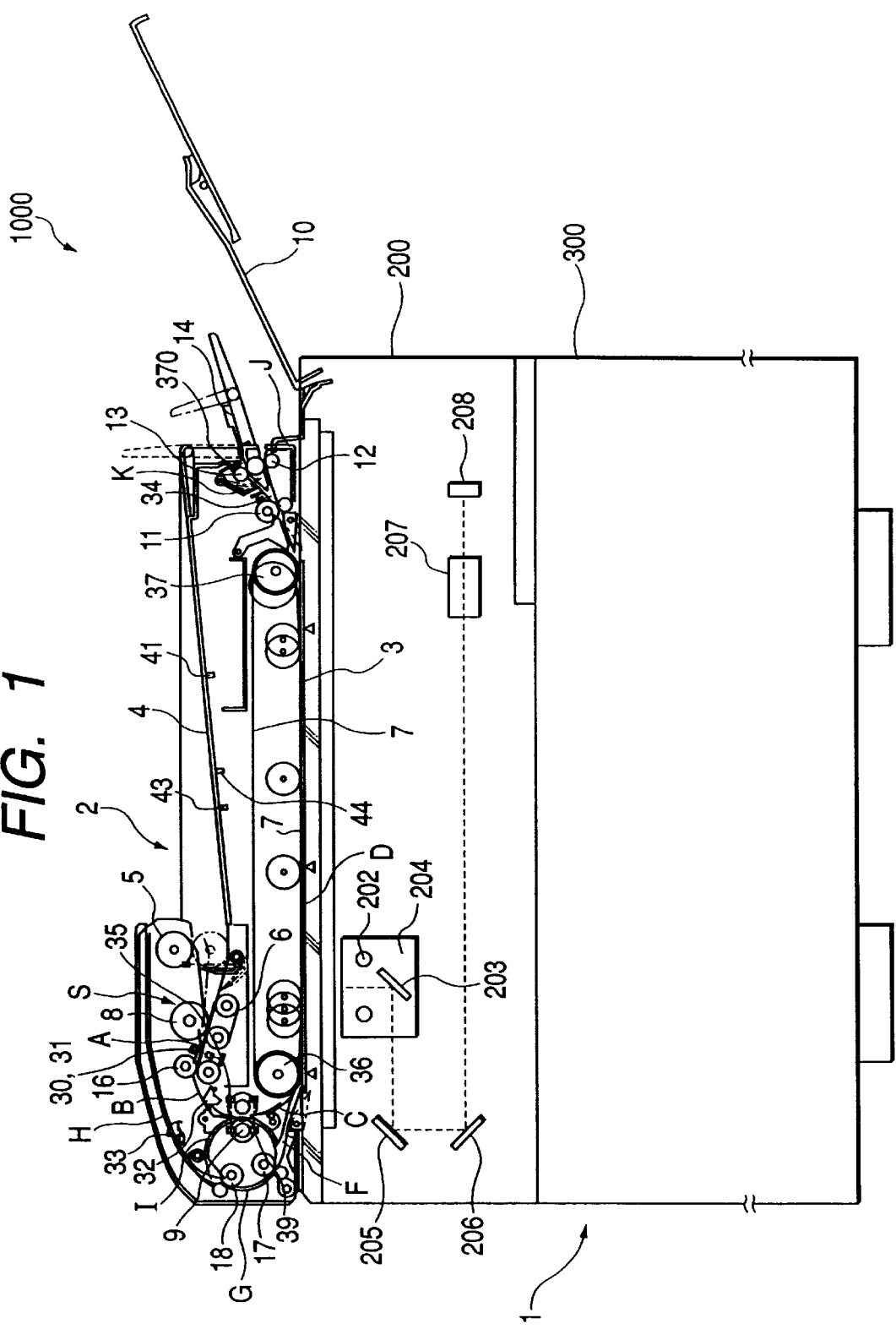
FIG. 1 is a sectional view of an entire image forming apparatus according to the present invention.

FIG. 1 is a sectional view showing an entire construction of an image forming apparatus 1000 according to the present invention. A body 1 of the image forming apparatus 1000 (referred to as "main body 1" hereinafter) includes an image inputting portion (referred to as "reader portion". hereinafter) 200 for optically reading image information of an original (sheet) rested on an image reading position, and an image outputting portion (referred to as "printer portion" hereinafter) 300 for printing-out a read image on a predetermined paper sheet, and an automatic original feeding device (referred to as "ADF" hereinafter) 2 as a sheet conveying apparatus for automatically conveying the originals (sheets) to the image reading position successively and for reversing a front surface and a rear surface of the original to be conveyed to the image reading position is disposed on the main body 1.

Explanation of Reader Portion 200

The reader portion 200 includes a platen 3 for defining an upper surface of the main body 1 and on which the original is rested, and a scanner (image reading means) 204 is disposed below the platen 3 (that is, opposite to a wide belt 7 which will be described later). The scanner 204 includes a lamp 202 and a mirror 203 so that the image information recorded on the original can optically be read by illuminating light on the original conveyed onto the platen 3.

The reader portion 200 further includes mirrors 205, 206, a lens 207, an image sensor 208 and so on so that light reflected from the original is converted photo-electrically to read it as image data.

Explanation of Printer Portion 300

Figure 2:
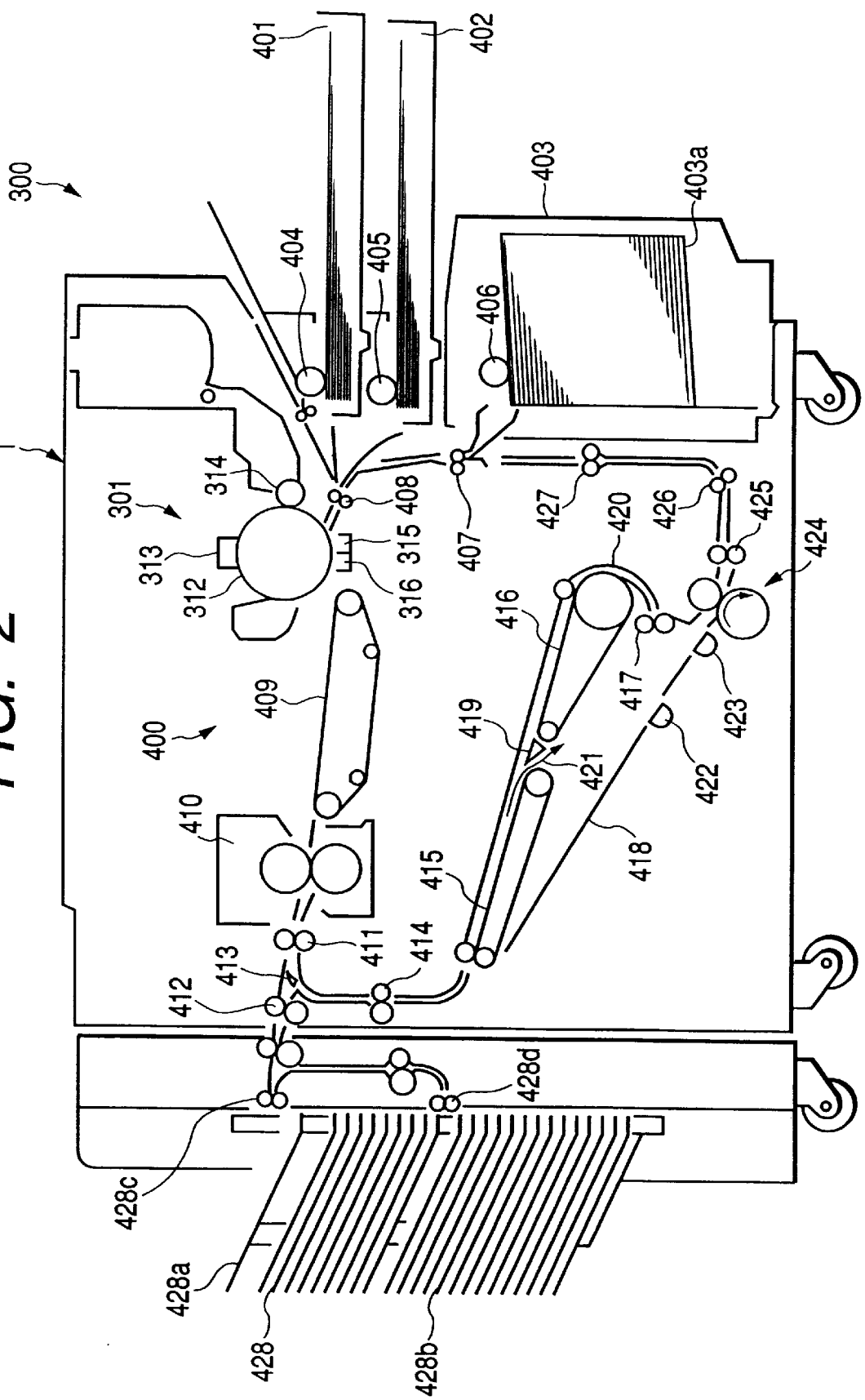
FIG. 2 is a sectional view showing a printer portion in detail.

As shown in FIG. 2, the printer portion 300 includes an image forming portion 301 for printing-out the image read by the reader portion 200 onto a paper sheet, and a paper sheet conveying system 400 for conveying the paper sheet.

The image forming portion 301 includes a photosensitive drum 312 rotatably supported and rotated in a clockwise direction by a driving means (not shown). Around the photosensitive drum 312, there are disposed a primary charging device 313 for charging a surface of the photosensitive drum 312 with a uniform electrical potential, a developing device 314 for containing toner and for developing an electrostatic latent image formed on the photosensitive drum 312 as a toner image, a transfer charger 315 for transferring the toner image onto the paper sheet, and a separation charger 316 for separating the paper sheet from the photosensitive drum 312.

Next, the paper sheet conveying system 400 will be described.

Cassettes 401, 402 and a paper sheet stacking device 403 for containing the paper sheets are disposed at one side of the main body 1. As is known, the cassettes 401, 402 and the paper sheet stacking device 403 have separation pawls (not shown), and sheet feeding rollers 404, 405, 406 are disposed at positions where these rollers abut against the stacked paper sheets. The paper sheets contained in the cassettes 401, 402 and the paper sheet stacking device 403 are discharged one by one by the actions of the separation pawls and the sheet feeding rollers 404, 405, 406. Incidentally, the paper sheet stacking device 403 has an intermediate plate 403a on which the paper sheets are stacked. The intermediate plate 403a is lifted and lowered by a motor and the like so that the paper sheet is always contacted with the sheet feeding roller 406. Further, a convey roller 407 for conveying the paper sheet is disposed in the vicinity of the sheet feeding roller 406 (leftwardly and upwardly).

A pair of registration rollers 408 are disposed between the cassettes 401, 402 and the paper sheet stacking device 403 and the photosensitive drum 312 so that the conveyance of the paper sheet supplied from the cassette 401 or 402 or the. paper sheet stacking device 403 is synchronized with rotation of the photosensitive drum 312.

A conveying belt 409 for conveying the paper sheet is disposed downwardly and leftwardly of the photosensitive drum 312, and a fixing device 410 for fixing the transferred toner image to the paper sheet is disposed at a downstream side of the conveying belt 409. A pair of conveying rollers 411 and a pair of discharging rollers 412 are disposed at a downstream side of the fixing device 410 to discharge the paper sheet out of the apparatus after the fixing operation.

Between the pair of conveying rollers 411 and the pair of discharging rollers 412, a sheet convey path is branched downwardly, and the branched convey path permits re-conveyance of the paper sheet toward the pair of registration rollers 408 for a both-face copy mode (in which images are formed on both surfaces of the paper sheet) and a multi-copy mode (in which images are formed on a one surface of the paper sheet in a superimposed fashion).

More specifically, a flapper 413 is disposed at a branched portion to switch the convey path. The downwardly branched convey path includes a pair of conveying rollers 414, a conveying belt 415, a conveying belt 416, a pair of conveying rollers 417, which serve to convey the paper sheet, and an intermediate tray 418 on which the paper sheets are temporarily stacked. A flapper 419 for switching the convey path is disposed between the conveying belt 415 and the conveying belt 416. By switching the flapper 419, in the both-face copy mode, the paper sheet is conveyed through a path 420 and is rested on the intermediate tray 418 with the imaged surface facing upwardly. In the multi-copy mode, the paper sheet is conveyed through a path 421 and is rested on the intermediate tray 418 with the,imaged surface facing downwardly.

The paper sheets stacked on the intermediate tray 418 in this way are separated one by one from a lowermost one by actions of auxiliary rollers 422, 423 and a pair of reversible separating rollers 424, and the separated paper sheet is conveyed to the image forming portion 301 by pairs of conveying rollers 425, 426, 427 and the pair of conveying rollers 407. In the image forming portion 301, second image formation is effected, and the imaged paper sheet is again conveyed to the fixing device 410 through the conveying belt 409 and then is discharged out of the apparatus by the pair of conveying rollers 411 and the pair of discharging rollers 412.

A sorter 428 for sorting the discharged paper sheets is disposed at a side (near the pair of discharging rollers 412) of the main body 1. The sorter 428 includes a single non-sort tray 428a, and a plurality of sort bin trays 428b. At least the sort in trays 428b can be lifted and lowered. A pair of non-sort tray discharging rollers 428c for discharging the paper sheet onto the non-sorted tray 428a is associated with the non-sort tray 428a and a pair of sort bin tray discharging rollers 428d for discharging the paper sheet onto any one of the sort bin trays 428b is associated with the sort bin trays 428b.

When the paper sheets are not sorted, the paper sheet is discharged onto the non-sort tray 428a by the pair of non-sort tray discharging rollers 428c; whereas, when paper sheets are sorted, the paper sheets are discharged one by one onto the lifted and lowered sort bin trays 428b by the pair of sort bin tray discharging rollers 428d.

For example, when a plurality of parts of both-face copies are obtained by using a single both-face original (both surface on which the images are recorded), in the image forming apparatus 1000, the one-face copy operation is effected for the set copy number (parts); meanwhile, the paper sheets one surfaces of which the images were formed are stacked on the intermediate tray 418. When the one-face copy operation for the set copy number is finished, the original is surface-reversed, and the paper sheets stacked on the intermediate tray 418 are successively fed to the image forming portion, where the images are successively formed on the other surfaces of the paper sheets. The paper sheets on both surfaces of which the images were formed are sorted by the sorter 428.

There is also a method in which, whenever the original is once circulated by the ADF 2, one set of copies are obtained. According, to this method, even when a plurality of parts of both-face copies are formed, since the copy group arranged in a page sequence can be obtained, the required parts of copies can be sorted without using any sorter. When the both-face copy operation is effected by using this method, both surfaces of a single original are read continuously and the images are formed on a front and a rear surfaces of a paper sheet continuously and the imaged paper sheet is discharged. Then, regarding both surfaces of a next original, the similar operations are effected. By repeating such operations, the sorted both-face copy group can be obtained.

Incidentally, in place of such a sorter 428, a discharge tray not having a sorting mechanism may be used.

Explanation of ADF 2

Next, a construction of the ADF 2 will be described.

Explanation of Original Tray

Figure 3:
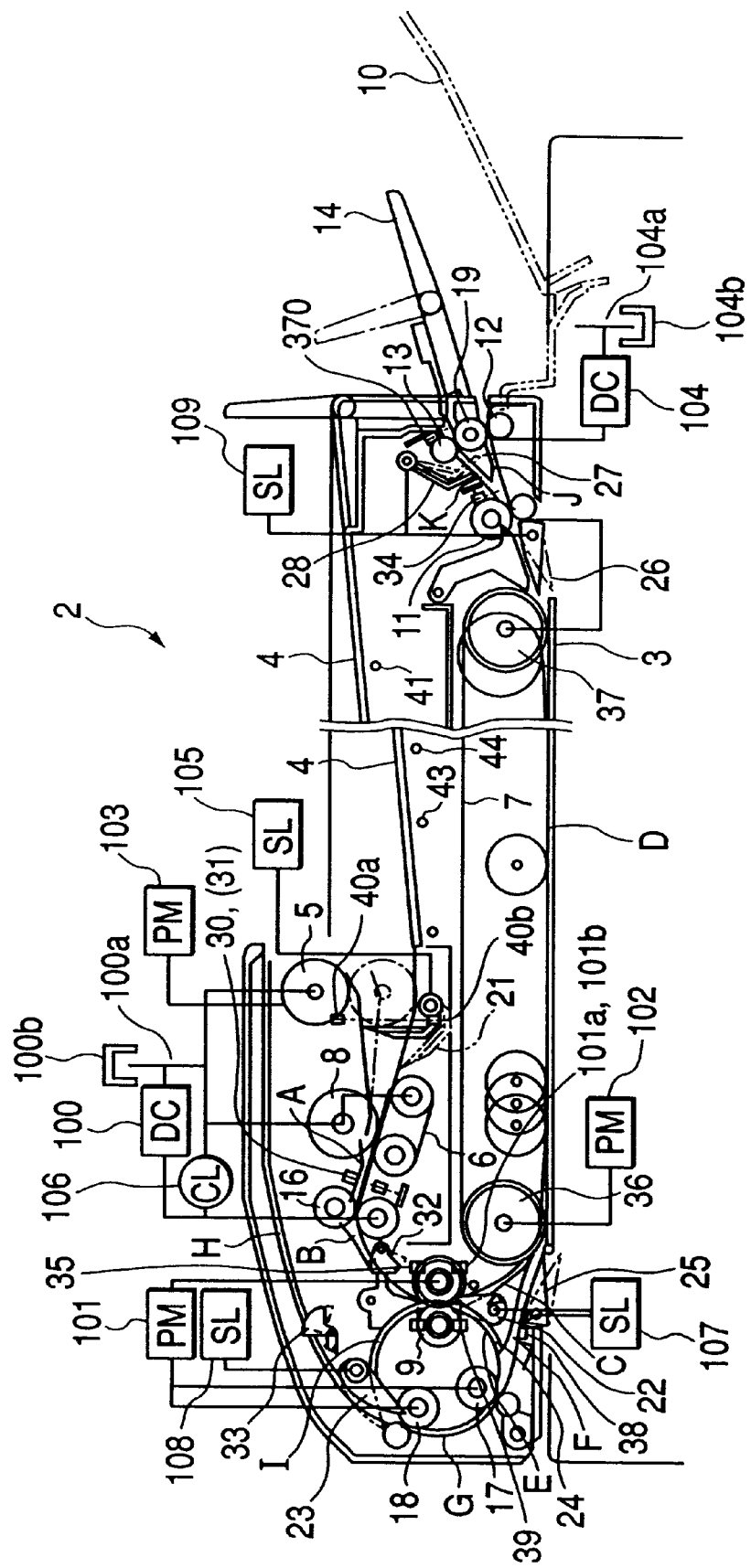
FIG. 3 is a sectional view showing an ADF in detail.

FIG. 3 is a sectional view showing the construction of the ADF in detail. The ADF 2 has an original tray 4 for stacking sheet-shaped originals. A pair of width-wise regulating plates 4a (FIG. 8) is attached to the original tray 4 for sliding movement in a width-wise direction of the original, so that, by regulating the width-wise direction of the original by means of the width-wise regulating plates, feeding stability of the original is ensured.

A stopper 21 is rotatably supported at a downstream end (left end in FIG. 3) of the original tray 4 in an original conveying direction. The stopper 21 can selectively be shifted between a position (shown by the solid line) where the stopper 21 is upstanding on the tray to prevent the feeding of the original and a position (shown by the two dot and chain line) where the stopper 21 is retracted to permit the feeding of the original.

Explanation of Rollers and Original Convey Path

Next, rollers disposed within the ADF 2 and a convey path through which the original is conveyed will be described with reference to FIGS. 3 to 6A through 6C.

Figure 4:
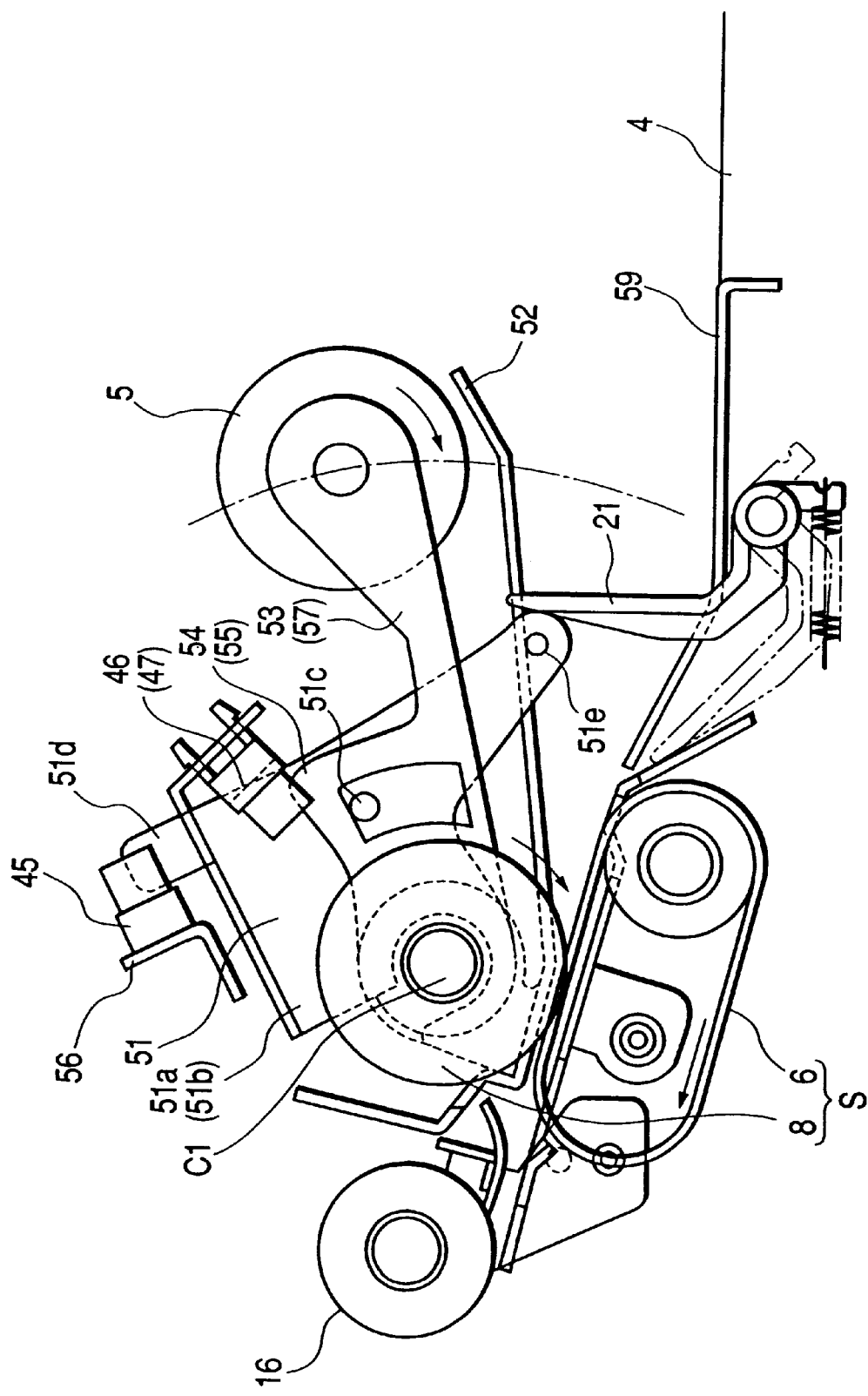
FIG. 4 is a view showing an arrangement of a sheet feeding roller and the like arranged at the left end of an original tray, a function of the sheet feeding roller, and a maximum lifted position of the sheet feeding roller.
Figure 5:
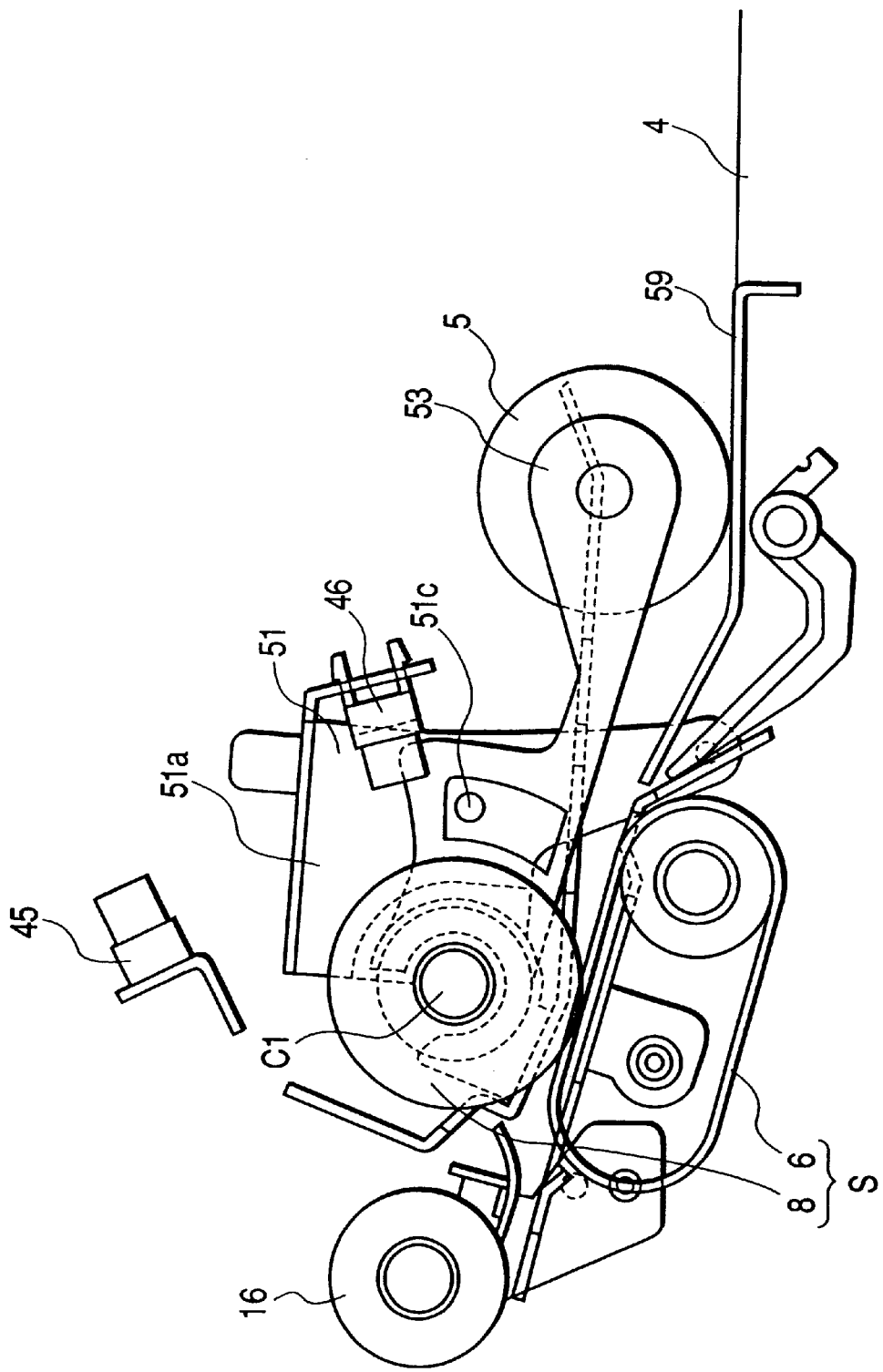
FIG. 5 is a view showing a maximum lowered position of the sheet feeding roller.
Figure 7:
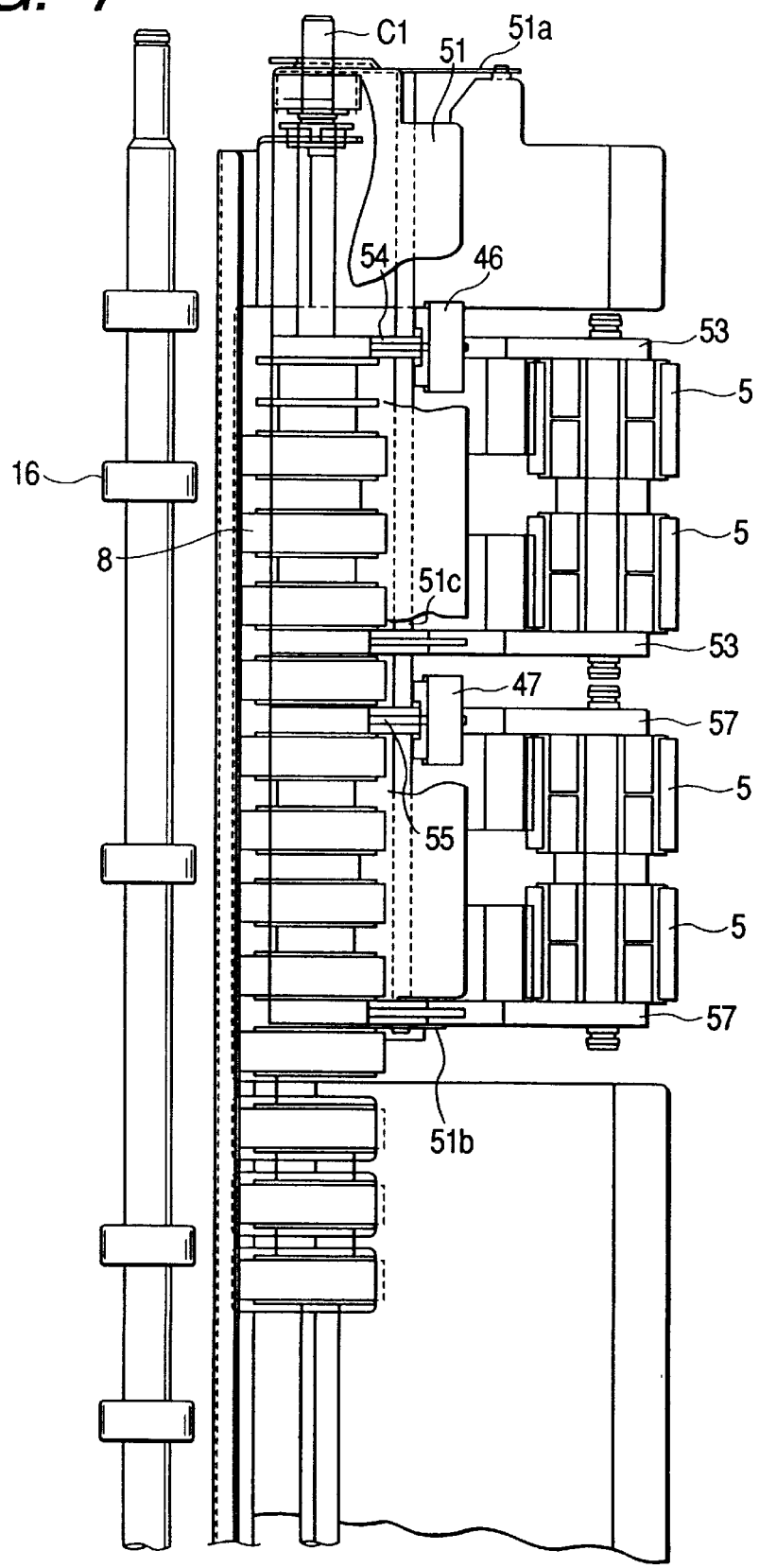

FIG. 4 is a view showing an arrangement of a sheet feeding roller 5 and the like arranged at the left end of the original tray 4, a function of the sheet feeding roller 5, and a maximum lifted position of the sheet feeding roller 5, and FIG. 5 is a view showing a maximum lowered position of the sheet feeding roller 5. FIG. 7 is a plan view showing the sheet feeding roller and the like.

Figure 6A:
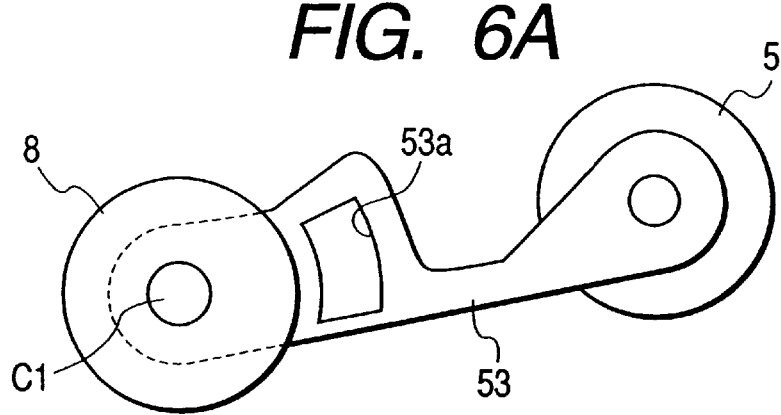
Figure 6B:
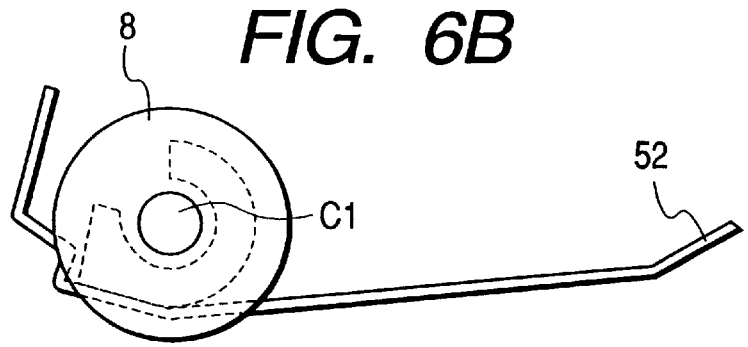

As clearly shown in FIG. 4, a rocking arm 53 rocking around a point c1 is disposed above the left end of the original tray 4, and the sheet feeding roller 5 is rotatably supported on a distal end of the rocking arm 53. The sheet feeding roller 5 is rotated by a separating motor 100 (described later) to successively convey-out the originals stacked on the original tray 4. As seen in FIG. 6A, an arcuate through hole 53a is formed in the rocking arm 53, which will be described later fully. As shown in FIG. 7, the sheet feeding roller 5 comprises a plurality of sheet feeding rollers 5 arranged along the width-wise direction of the original opposite to the stacked originals.

Figure 6C:
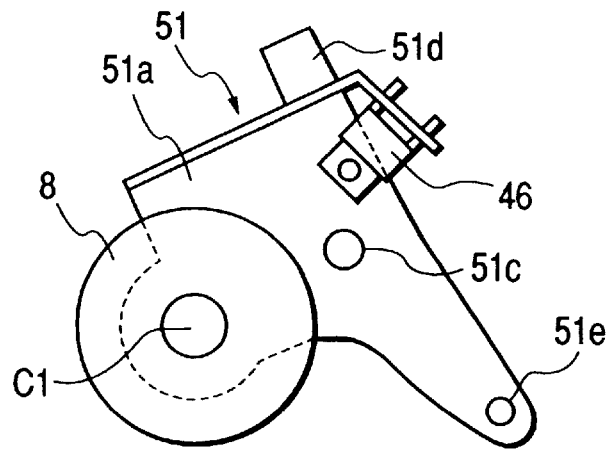

A lift/lower arm 51 is disposed for rocking movement around the point c1 so that it can be rotated between a position shown in FIG. 4 and a position shown in FIG. 5. The lift/lower arm 51 has a support plates 51a, 51b arranged in parallel with the plane of FIG. 4 and spaced apart from each other by a predetermined distance, and positioning pins 51c are secured to the support plates 51a, 51b by caulking (FIG. 6C). The positioning pins 51c are inserted into the through hole 53a to engage the lift/lower arm 51 by the rocking arm 53, so that, when the lift/lower arm 51 is rocked, the rocking arm 53 is also rocked. Positioning pins 51e re secured to the support plates 51a, 51b by caulking (described later fully).

An upper separation guide plate 52 is disposed for rocking movement around the point c1 (FIG. 6B), and a lower separation guide plate 59, is contiguous to the original tray 4 below the upper separation guide plate 52. The lower separation guide plate 59 is disposed below the original conveyed by the sheet feeding roller 5 to guide a lower surface of the original, and the upper separation guide plate 52 is disposed above the conveyed original to guide an upper surface of the original.

As best seen in FIG. 4, when the originals are set (lifted position), the positioning pins 51e of the lift/lower arm 51 support the upper separation guide plate 52 from the below to create great gap between the guide plate and he original tray 4.

When the sheet feeding is started, since the sheet feeding roller 5 is lowered until it abuts against the original, upon abutting against the original P, the roller is bounded as is well known. When a plurality of sheet feeding rollers 5 are arranged along the width-wise direction of the original (FIG. 7), pressure balance (pressure balance with respect to the original P) between the plurality of sheet feeding rollers 5 is lost. In such a bounded condition, if the sheet feeding is started, possibility of occurrence of skew-feed of the original will be increased.

However, in the illustrated embodiment, since the sheet feeding rollers 5 have independent suspension structures to easily equalize to each other with respect to the original P, the sheet feeding ability can be improved.

A separation conveying roller 8 is rotatably supported at the rotation center c1 of the lift/lower arm 51, and a known separating belt 6 is rotatably disposed below the roller 8 (the separation conveying roller 8 and the separating belt 6 are referred to as "separating portion S" hereinafter). The separation conveying roller 8 and the separating belt 6 are rotated in directions shown by the arrows in FIG. 4 by a separating motor 100 (described later) so that, if a plurality of originals are simultaneously fed by the sheet feeding roller 5, the separation conveying roller 8 conveys only a single original toward a downstream direction and the separating belt 6 returns the remaining originals toward the original tray 4 (that is to say, the plural originals simultaneously supplied are separated and conveyed). The separation conveying roller 8 has a one-way mechanism to reduce conveying load when the original is drawn from the separating portion S by a first feeding roller 16 (described below).

Figure 42:
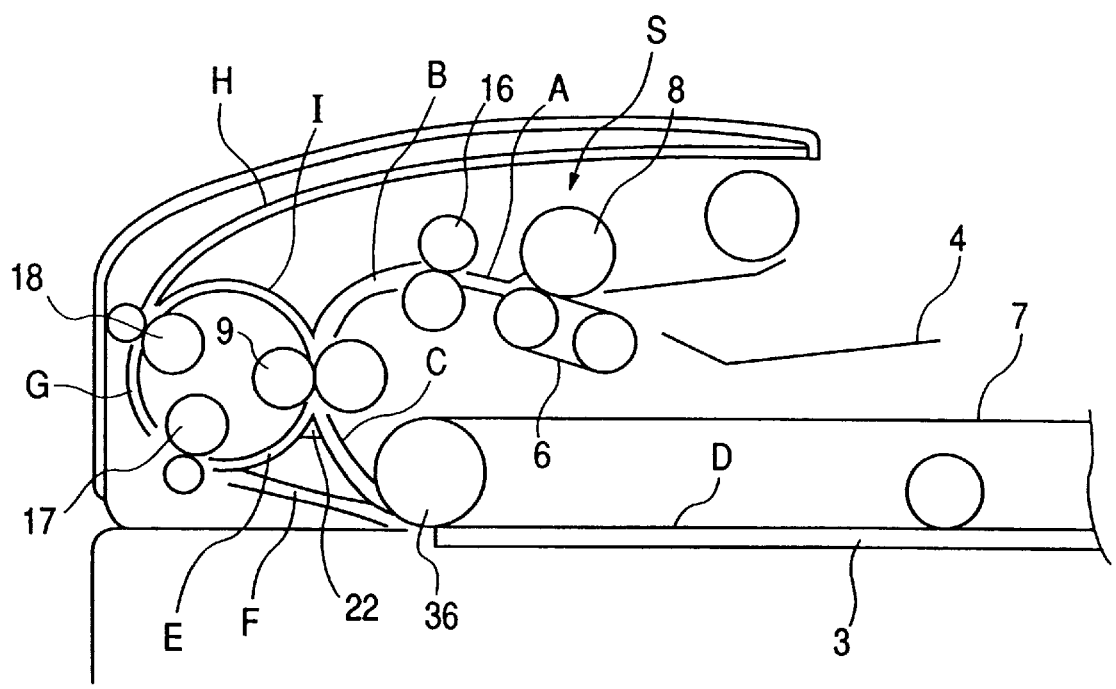
FIG. 42 is a view for explaining a convey path and so on for the original.

As shown in FIG. 42, the first feeding roller 16 is rotatably disposed at a downstream side (left) of the separating portion S to further convey the original sent from the separating portion S toward the downstream direction. An original convey path between the separating portion S and the first feeding roller 16 is designated by a symbol "A".

An original convey path B at the downstream side of the first feeding roller 16 is curved leftward and downwardly and includes a rotatable second feeding roller (conveying means) 9. The second feeding roller 9 serves to convey the plural originals successively toward the downstream direction. The second feeding roller 9 is stopped while the original is being conveyed by the first feeding roller 16, so that a loop is formed in the original to correct the skew-feed of the original.

Further, an original convey path C is formed at a downstream side of the second feeding roller 9 in the original conveying direction (extending from a position below the second feeding roller 9, to a position leftwardly and upwardly of the platen 3), and a driving roller 36 is rotatably supported leftwardly and upwardly of the platen 3. A turn roller 37 is rotatably supported rightwardly and upwardly of the platen 3 (FIG. 1), and a wide belt (conveying means) 7 is mounted around these rollers 36, 37. The wide belt 7 has a width equal to or greater than a width of the original and is disposed along the platen 3 to cooperate with the platen 3 to define an original convey path D therebetween. The wide belt 7 is rotated reversibly by the driving roller 36 to further convey the originals conveyed by the second feeding roller 9 in the same direction and to return the original toward the second feeding roller 9.

That is to say, in the illustrated embodiment, the original convey paths A, B, C are formed in a curved fashion from the original tray 4 to the platen 3, so that the originals P on the original tray are successively separated and conveyed to the platen 3 by the actions of the sheet feeding roller 5, the separating portion S, the first feeding roller 16 and the second feeding roller 9.

The original convey path C is curved rightward and the downwardly from the second feeding roller 9 toward the platen 3, and a surface-reverse feed path E is curved leftwardly and downwardly from the second feeding roller 9. A first surface-reversing roller 17 is rotatably supported at the left end of the surface-reverse feed path E. The surface-reverse feed path E is communicated to the original convey path D through a surface-reverse feeding/discharging path F.

A surface-reverse feed path G from the first surface-reversing roller 17 extends leftwardly and upwardly, and a second surface-reversing roller 18 is rotatably supported at an upper end of the feed path G.

Above the second surface-reversing roller 18, the surface-reverse feed path G is branched into two surface-reverse feed paths H, I. The surface-reverse feed path H extends rightwardly and upwardly from the second surface-reversing roller 18 and the surface-reverse feed path I extends toward the original convey path B to communicate the surface-reverse feed path G to the original convey path B. Namely, in the illustrated embodiment, the surface-reverse feed paths F, G, H, I are communicated to the original convey path D, i.e., the original reading position. The first and second surface-reversing rollers 17, 18 serve to reverse a front surface and a rear surface of the original by conveying the original along the surface-reverse feed paths G, H, I.

In the illustrated embodiment, when the original is surface-reversed before it is conveyed to the platen 3 (pre-surface reverse process), the original is conveyed through the paths A→B→E→G→H→F→D (which will be described later fully).

On the other hand, when the original is surface-reversed after the original was conveyed to the platen 3 and the image on the original was read, the original is conveyed through the paths F→G→I→C→D (which will be described later fully).

An original discharge path J and a sheet discharge tray 10 are disposed at the right of the wide belt 7, and the original discharge path J includes a pair of sheet discharging rollers 12 and a pair of conveying rollers 19 so that the original P (image of which was read) on the platen 3 is discharged onto the sheet discharge tray 10.

An open/close manual insertion original tray 14 is disposed above the sheet discharge tray 10, and a manual insertion sheet feeding roller 13 is disposed at the left end of the tray 14. An original (single original) P set on the manual insertion original tray 14 is fed into a manual insertion convey path K by the sheet feeding roller 13 and the conveying rollers 19.

The manual insertion convey path K includes a pair of manual insertion registration rollers 11 to convey the fed original onto the platen 3. Similar to the second feeding roller 9, the pair of manual insertion registration rollers 11 are stopped while the original is being conveyed to form a loop in the original, thereby correcting the skew-feed of the original. The pair of manual insertion registration rollers 11 also serve to discharge the original discharged from the platen 3 onto the discharge tray 10.

A manual insertion shutter 28 is rotatably supported at a downstream side off the manual insertion sheet feeding roller 13. The manual insertion shutter 28 can selectively be shifted between a position (shown by the two dot and chain line) where the manual insertion convey path K is blocked by the shutter to prevent the feeding of the original (manual insertion original set on the manual insertion original tray 14) and a position (shown by the solid line) where the shutter is retracted not to prevent the feeding of the original. Accordingly, when the manual insertion shutter 28 is in the two dot and chain line position, while the original (image of which was read) is being conveyed from the platen 3 to the discharge tray 10, a next original set on the manual insertion tray 14 is prevented from entering into the manual insertion convey path K. While the feeding of the original is prevented by the manual insertion shutter 28, although the manual insertion sheet feeding roller 13 continues to be rotated, a conveying force of the roller 13 is selected to be smaller so that the roller 13 can slip with respect to the original.

Explanation of Flappers

Next, flappers disposed in the original convey paths will be explained with reference to FIG. 3.

A surface-reverse sheet feeding flapper 22 is rockably disposed at a junction between the original convey path C and the surface-reverse feed path E. When the flapper 22 is rocked in a position shown by the solid line, the original convey path C is blocked or closed and the surface-reverse feed path E is opened. On the other hand, when the flapper 22 is rocked in a position shown by the two dot and chain line, the surface-reverse feed path E is closed and the original convey path C is opened.

A surface-reversing flapper 23 is rockably disposed at a junction between the surface-reverse feed path H and the surface-reverse feed path I (at a downstream side of the second surface-reversing roller 18 in the conveying direction). When the flapper 23 is rocked in a position shown by the solid line, the surface-reverse feed path I is closed and the surface-reverse feed path H is opened. On the other hand, when the flapper 23 is rocked in a position shown by the two dot and chain line, the surface-reverse feed path H is closed and the surface-reverse feed path I is opened.

A one-way flapper (to which Mylar is adhered) 24 is rockably disposed at a junction between the surface-reverse feed path E and the surface-reverse feeding/discharging path F. The flapper 24 serves as a guide when the original P is conveyed from the surface-reverse feed path E to the surface-reverse feed path G and also serves to prevent the returning of the original P back to the surface-reverse feed path E when the original P is conveyed from the surface-reverse feed paths I, G to the platen 3 through the surface-reverse feeding/discharging path F.

A feeding/discharging flapper 25 driven in association with the surface-reverse feeding flapper 22 is rockably disposed in the surface-reverse feeding/discharging path F near the platen 3. When the original P is conveyed from the surface-reverse feeding/discharging path F to the platen 3, the flapper 25 is rocked in a position shown by the solid line to prevent the leading end of the original P entering onto the platen 3 from striking against the end of the platen 3, and, when the original P is conveyed from the platen 3 to the surface-reverse feeding/discharging path F, the flapper 25 is rocked in a position shown by the two dot and chain line to permit smooth conveyance of the original P.

A sheet discharging flapper 26 is rockably disposed between the right end of the platen 3 and the pair of manual insertion registration rollers 11. When the original P is conveyed from the manual insertion convey path K to the platen 3, the flapper 26 is rocked in a position shown by the solid line to prevent the leading end of the original P entering onto the platen 3 from striking against the end of the platen 3, and, when the original P is discharged from the platen 3 into the original discharging path J, the flapper 26 is rocked in a position shown by the two dot and chain line to permit smooth discharging of the original P.

A one-way manual insertion flapper 27 is rockably disposed at a junction between the original discharge path J and the manual insertion convey path K. The flapper 27 serves to prevent the original P to be discharged from the platen 3 onto the discharge tray 10 from entering into the manual insertion convey path K.

Explanation of Driving Systems

Next, driving systems for driving the rollers and the flappers will be described with reference to FIG. 3.

The separation conveying roller 8, the separating belt 6 and the sheet feeding roller 5 are rotatingly driven by a DC brush motor (referred to as "separating motor" hereinafter) 100 PLL-controlled. A separating clutch 106 is disposed between the separating motor 100 and the separation conveying roller 8, separating belt 6 and sheet feeding roller 5 so that driving force transmission is turned ON/OFF by the separating clutch 106. A clock plate 100a having a plurality of slits is secured to a motor shaft of the separating motor 100, and a separation clock sensor 100b which is a light sensor of light permeable type is disposed opposite to the clock plate 100a. When the separating motor 100 is rotated, the separation clock sensor 100b generates clock pulses proportional to the number of revolutions of the motor. Thus, by counting the number of clock pulses, the original feeding amount of the separating motor 100 can be detected. At the same time when the leading end of the original is detected by a separation sensor 30 (described later), the counting of the clock pulses is started, thereby detecting the conveying position of the original.

The second feeding roller 9, the first surface-reversing roller 17 and the second surface-reversing roller 18 are rotatingly driven by a reversible stepping motor (referred to as "conveying motor" hereinafter) 101. A clock plate 101a having a plurality of slits is secured to a driven roller shaft of the second feeding roller 9, and a surface-reverse clock sensor 101b which is a light sensor of light permeable type is disposed opposite to the clock plate 101a. The surface-reverse clock sensor 101b generates clock pulses proportional to the number of revolutions of the driven roller. While the original P is being conveyed by the second feeding roller 9, if slip is generated, an amount of the slip can be measured on the basis of the number of clock pulses and the number of driving clock of the conveying, motor 101.

The driving roller 36 (and therefore wide belt 7) are rotatingly driven by a reversible stepping motor (referred to as "belt motor" hereinafter) 102. The number of revolutions of the belt motor 102 can also be detected by a clock plate having a plurality of slits and a clock sensor which is a light sensor of light permeable type.

The rotation of the driving roller 36 is transmitted to the turn roller 37 through the wide belt 7, and a driving force of the turn roller 37 is transmitted to the pair of manual insertion registration rollers 11 so that the conveying speed of the original on the platen 3 becomes equal to the conveying speed of the manual insertion registration roller pair 11.

The lift/lower arm 51 is rocked by a reversible stepping motor (referred to as "rocking motor" hereinafter) 103. The number of revolutions of the rocking motor 103 can also be detected by a clock plate having a plurality of slits and a clock sensor which is a light sensor of light permeable type. The rocking motor 103 can stop the lift/lower arm 51 at any position (shown in FIG. 16) between the position shown in FIG. 4 and the position shown in FIG. 5.

The sheet discharging roller 12 and the manual insertion sheet feeding roller 13 are rotatingly driven by a DC motor of FC-servo control type (referred to as "discharging motor" hereinafter) 104. A clock plate 104a having a plurality of slits is secured to a motor shaft of the sheet discharging motor 104, and a sheet discharging clock sensor 104b which is a light sensor of light permeable type is disposed opposite to the clock plate 104a. When the sheet discharging motor 104 is rotated, the sheet discharging clock sensor 104b generates clock pulses proportional to the number of revolutions of the motor.

The stopper 21 is driven by a stopper solenoid 105. More specifically, when the stopper solenoid 105 is in an OFF condition, the stopper is located at a position shown by the solid line, and, when the stopper solenoid 105 is turned ON, the stopper is rocked at a position shown by the two dot sand chain line.

The surface-reverse sheet feeding flapper 22 and the feeding/discharging flapper 25 are driven by a path switching solenoid 107. More specifically, when the solenoid 107 is in an OFF condition, the flappers 22, 25 are located at positions shown by the solid lines, and, when the stopper solenoid 107 is turned ON, the flappers are rocked at positions shown by the two dot and chain lines.

The surface-reverse flapper 23 is driven by a surface-reverse flapper solenoid 108. More specifically, when the solenoid 108 is in an OFF condition, the flapper is located at a position shown by the solid line, and, when the solenoid 108 is turned ON, the flapper is rocked at a position shown by the two dot and chain line.

The sheet discharging flapper 23 and the manual insertion shutter 28 are driven by a sheet discharging flapper solenoid 109. More specifically, when the solenoid 109 is in an OFF condition, they are located at positions shown by the two dot and chain lines, and, when the-stopper solenoid 109 is turned ON, they are rocked at positions shown by the solid lines.

Explanation of Sensors

Next, the sensors will be explained.

As best seen in FIG. 4, the lift/lower arm 51 has a lift/lower arm flag 51d, and a sheet feeding roller home sensor 45 which is a light sensor of light permeable type is attached to a fixed support plate 56 and opposite to the flag 51d (above the separating portion S). When the lift/lower arm 51 is lifted to block a sensor optical path of the sheet feeding roller home sensor 45 by the lift/lower arm flag 51d as shown in FIG. 4, the fact that the lift/lower arm 51 is in a waiting position as a home position can be detected.

Figure 18:
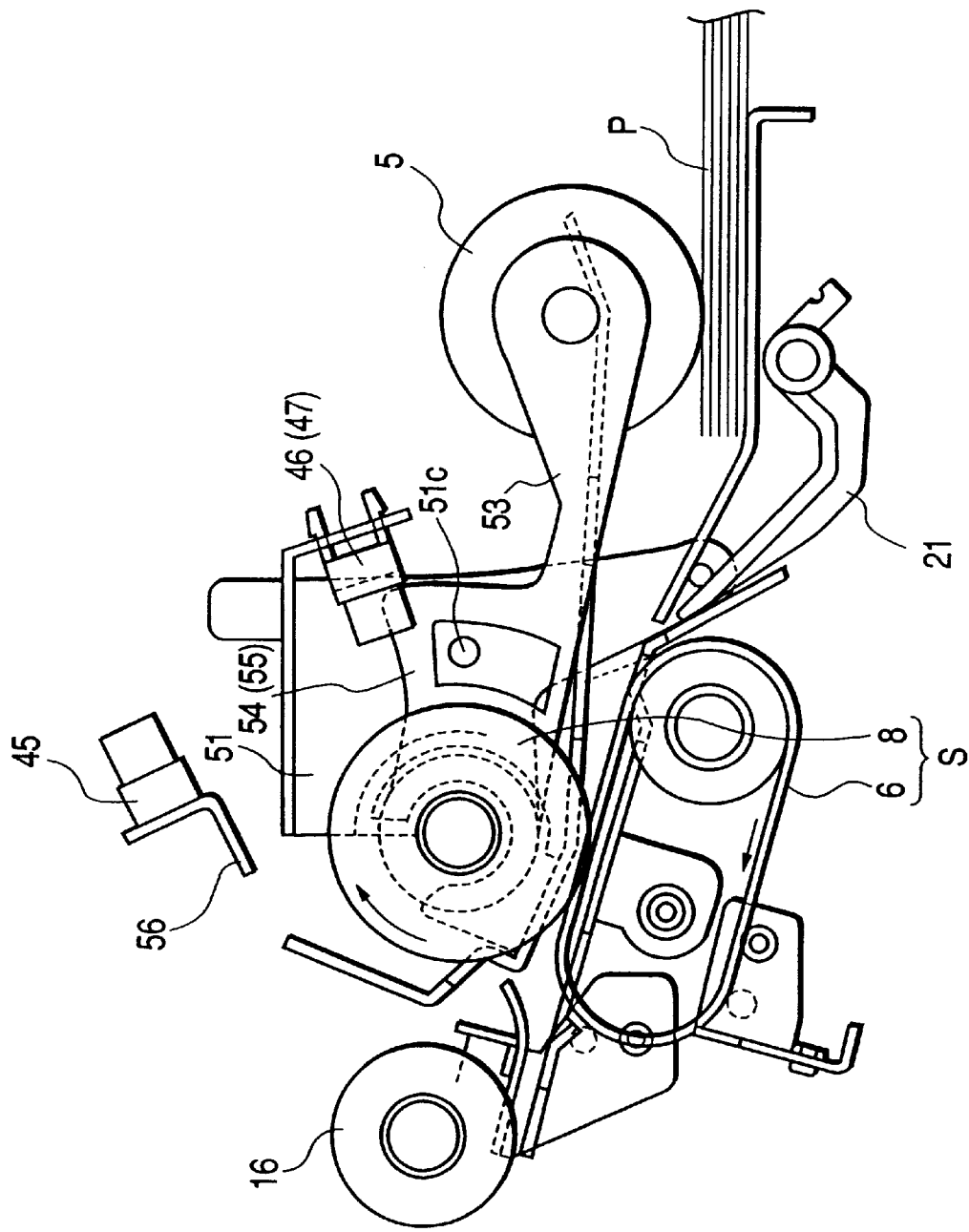
FIG. 18 is a view showing a condition that the sheet feeding roller abuts against the original.

As best seen in FIG. 4, the rocking arm 53 is provided with first and second rocking arm flags 54, 55, and first and second rocking position sensors 46, 47 are attached to the lift/lower arm 51, so that a relative position between the rocking arm 53 and the lift/lower arm 51 is detected by detecting positions of the arm flags 54, 55 by means of the sensors 46, 47. As shown in FIG. 18, when the sheet feeding roller 5 is contacted with the uppermost original, the rocking position sensors 46, 47 are blocked by the rocking arm flags 54, 55, thereby generating ON signals. On the basis of detection results from the rocking position sensors 46, 47, the sheet feeding roller 5 can be shifted between the abutting position and the separating position (spacing position).

As shown in FIG. 3, original set detecting sensors 40a, 40b which are light sensors of light permeable type are disposed in the vicinity of the stopper 21 at an upstream side thereof so that the fact that the originals P are set on the original tray 4 can be detected. When the fact that the originals P are set on the original tray 4 is detected by the original set detecting sensors 40a, 40b, the sheet feeding roller 5 is shifted to the abutting position.

Further, an original trailing end detecting sensor 41 which is a light sensor of light reflection type is disposed at a middle position of the original tray 4 (spaced apart from the stopper 21 by 225 mm). The original trailing end detecting sensor 41 is turned ON when the originals having large size are set, so that it can be detected whether the originals having large size or the originals having small size are set.

A final original detecting sensor 43 which is a light sensor of light reflection type is disposed at a middle position between the original set detecting sensors 40a, 40b and the original trailing end detecting sensor 41, so that it can be detected whether the original being conveyed is a final original or not.

A sheet width detecting sensor 44 is disposed at a lower part of the original tray 4. The sheet width detecting sensor 44 serves to detect a width of the original P set on the original tray 4 by detecting the width regulating plate and acts as a size judging means for judging whether the original has a fixed size or a non-fixed size. The judgement of fixed size or non-fixed size may be effected by detecting the length of the original in the conveying direction by means of another sensor.

A separation sensor 30 which is a light sensor of light permeable type is disposed in the original convey path between the separation conveying roller 8 and the first feeding roller 16, so that the passage of the original P being conveyed by the separation conveying roller 8 can be detected.

A skew-feed detecting sensor 31 which is a light sensor of light permeable type is disposed at a position same as the separation sensor 30 in the conveying direction but spaced apart from the separation sensor 30 by a predetermined distance in a thrust direction (width-wise direction of the original) and cooperates with the separation sensor 30 to detect a skew-feed amount of the original being fed.

A mixed-loading detecting sensor 32 for detecting originals P on the basis of movement of a flag is disposed in the vicinity of the first feeding roller 16 at a downstream side thereof, so that the fact that originals having different sizes are set on the original tray 4 can be detected during the conveyance of the original by judging detection results from respective sensors on the original tray 4.

A sheet feeding sensor (sheet detecting means) 35 which is a light sensor of light permeable type is disposed in the vicinity of the second feeding roller 9 at an upstream side thereof to detect passage timings of the leading and trailing ends of the original P, thereby outputting signals.

A registration sensor (sheet detecting means) 39 which is a light sensor of light permeable type is disposed at a downstream side of the second feeding roller 9 to control the stop position of the original P by detecting the leading end of the original P.

A surface-reverse sensor 38 which is a light sensor of light permeable type is disposed in the surface-reverse feeding/discharging path F to detect the original P discharged from the platen 3 or the original P entering onto the platen 3.

A surface-reverse detecting sensor 33 which is a light sensor of light permeable type is disposed in the surface-reverse feed path H to detect the flag shifted by the switching of the surface-reverse flapper 23, thereby detecting the fact that the original P is directed into the surface-reverse feed path H.

A manual insertion registration sensor 34 which is a light sensor of light permeable type is disposed at a downstream side of the manual insertion registration roller pair 11 in a sheet discharging direction to detect the original P from the manual insertion convey path K and to detect the original P discharged from the platen 3 to the original discharge path J.

A manually-inserted-original sensor 370 for detecting the original P by movement of a flag is disposed in the manual insertion original tray 14 side of the manual insertion sheet feeding roller 13 to detect the fact that the original is set on the manual insertion original tray 14.

Positional Relationship Between Original and Scanner in Image Reading

Figure 8:
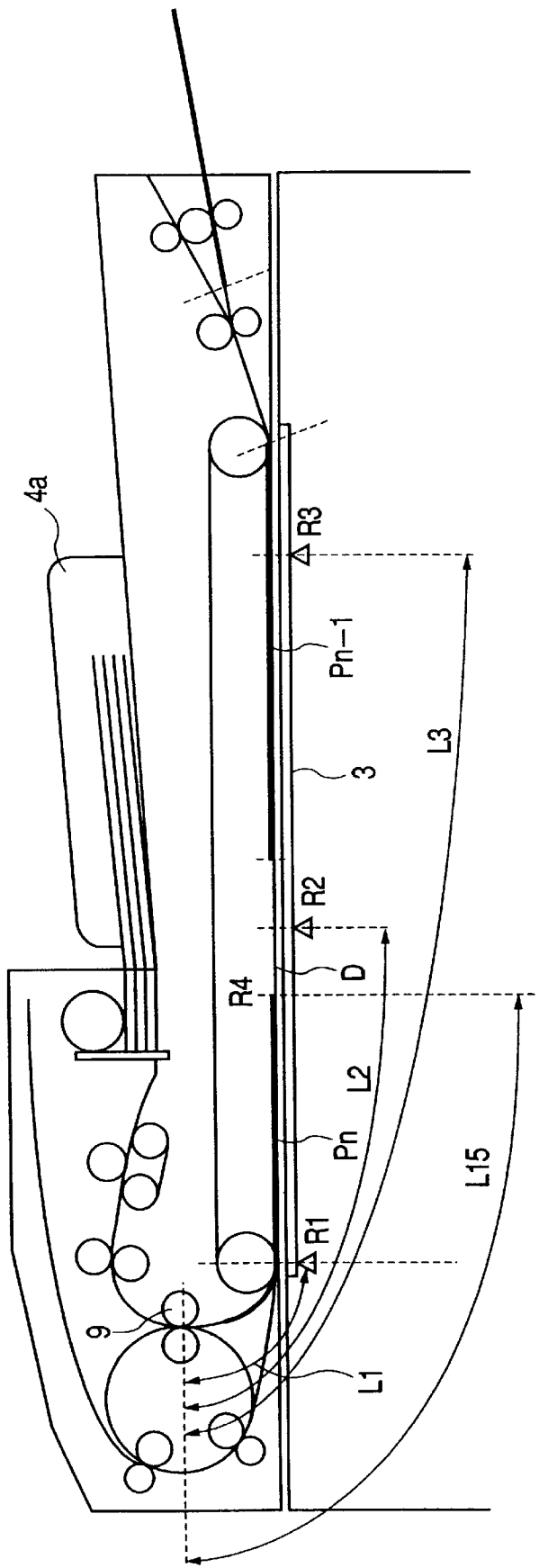
FIG. 8 is a view showing a positional relationship between an original and a scanner during image reading.
Figure 9:
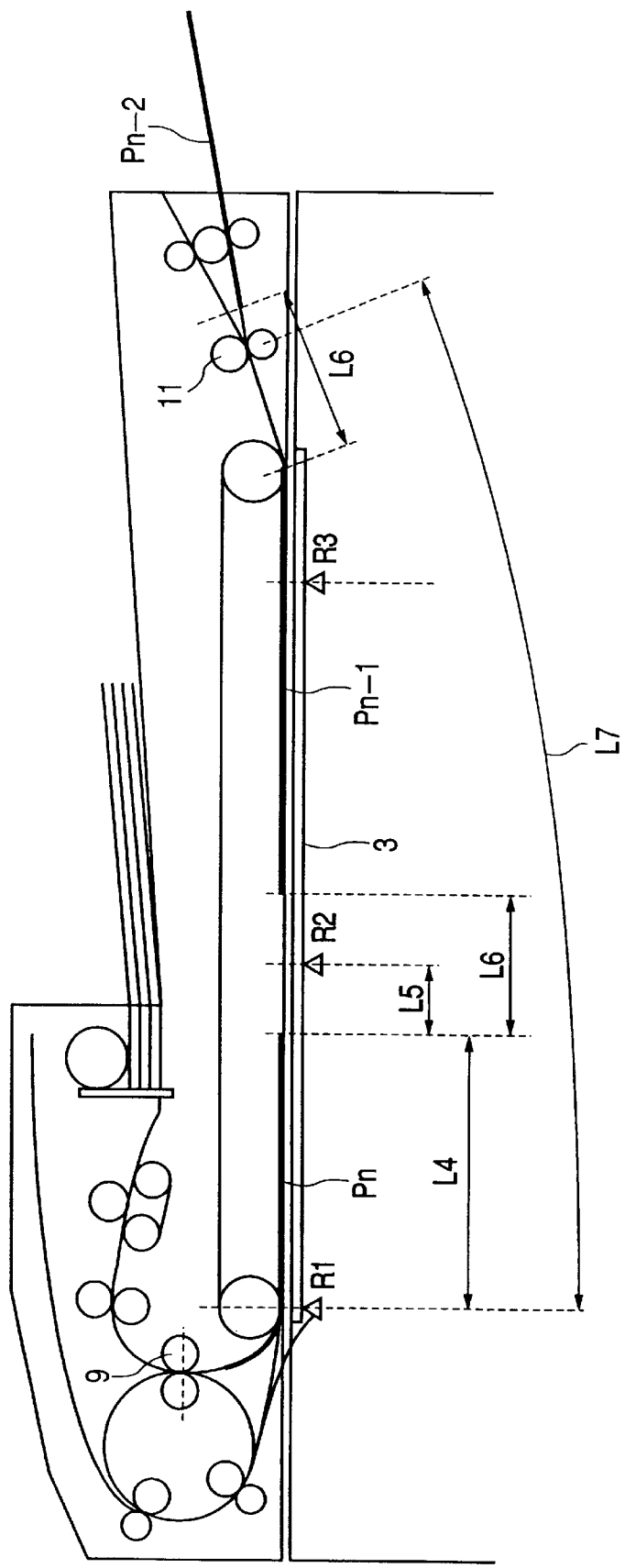
FIG. 9 is a view showing a positional relationship between an original and a scanner during image reading.

Next, a positional relationship between the original and the scanner in the image reading will be explained with reference to FIGS. 8 and 9. FIGS. 8 and 9 are views showing the positional relationship between the original and the scanner in the image reading.

In the image forming apparatus 1000, as mentioned above, a fixed-reading mode (in which the image is read by shifting the scanner 204 while the original is fixed at a predetermined position) or a flow-reading mode (in which the image is read by shifting the original by the wide belt 7 while the scanner 204 is stopped at a predetermined position) can be selected. In FIGS. 8 and 9, a symbol "R1" indicates a home position of the scanner 204 (i.e., a trailing end position of the original rested on the image reading position) in the fixed-reading mode. The fixed-reading mode is carried out in the both-face original mode.

A symbol "R2" indicates a stop position of the scanner 204 (i.e., a position of the leading end of the original at the time when the image reading is started (referred to as "second original end position R2" hereinafter)) in the half size one-face original conveying mode (flow-reading mode), and a symbol "R3" indicates a stop position of the scanner 204 (i.e., a position of the leading end of the original at the time when the image reading is started (referred to as "third original end position R3" hereinafter)) in the large size one-face original conveying mode and when the original having half size is fed longitudinally (flow-reading mode).

In FIG. 8, "L1" indicates a distance from the nip of the second feeding roller 9 to the first original end position R1; "L2" indicates a distance from the nip of the second feeding roller 9 to the second original end position R2; and "L3" indicates a distance from the nip of the second feeding roller 9 to the third original end position R3. In FIG. 9, "L4" indicates a distance between the first original end position R1 and the leading end of the half size original $P_n$ stopped on the platen 3 before the image is read; "L5" indicates a distance between the second original end position R2 and the leading end of the half size origianl $P_n$ stopped; "L6" indicates a distance (sheet-to-sheet distance) between a trailing end of a preceding original $P_{n-1}$ and a leading end of a succeeding original $P_n$; and "L7" indicates a distance from the first original end position R1 to the manual insertion registration roller pair 11.

On the other hand, in the illustrated embodiment, the distances L4, L6 and L7 are selected to satisfy the following relationship:

$L7 < L4 + 2 \times L6 + L_{ph}$ (Numerical Expression 1)

Where, $L_{ph}$ is a length of the half size original in the conveying direction.

Accordingly, in a condition that two originals ($P_n$, $P_{n-1}$) are stopped on the platen 3, a trailing end of a further preceding original $P_{n-2}$ has already left the nip of the manual insertion registration roller pair 11.

Explanation of Control Circuit

Next, a control circuit of the ADF 2 will be explained with reference to FIGS. 10A and 10B.

Figure 10B:
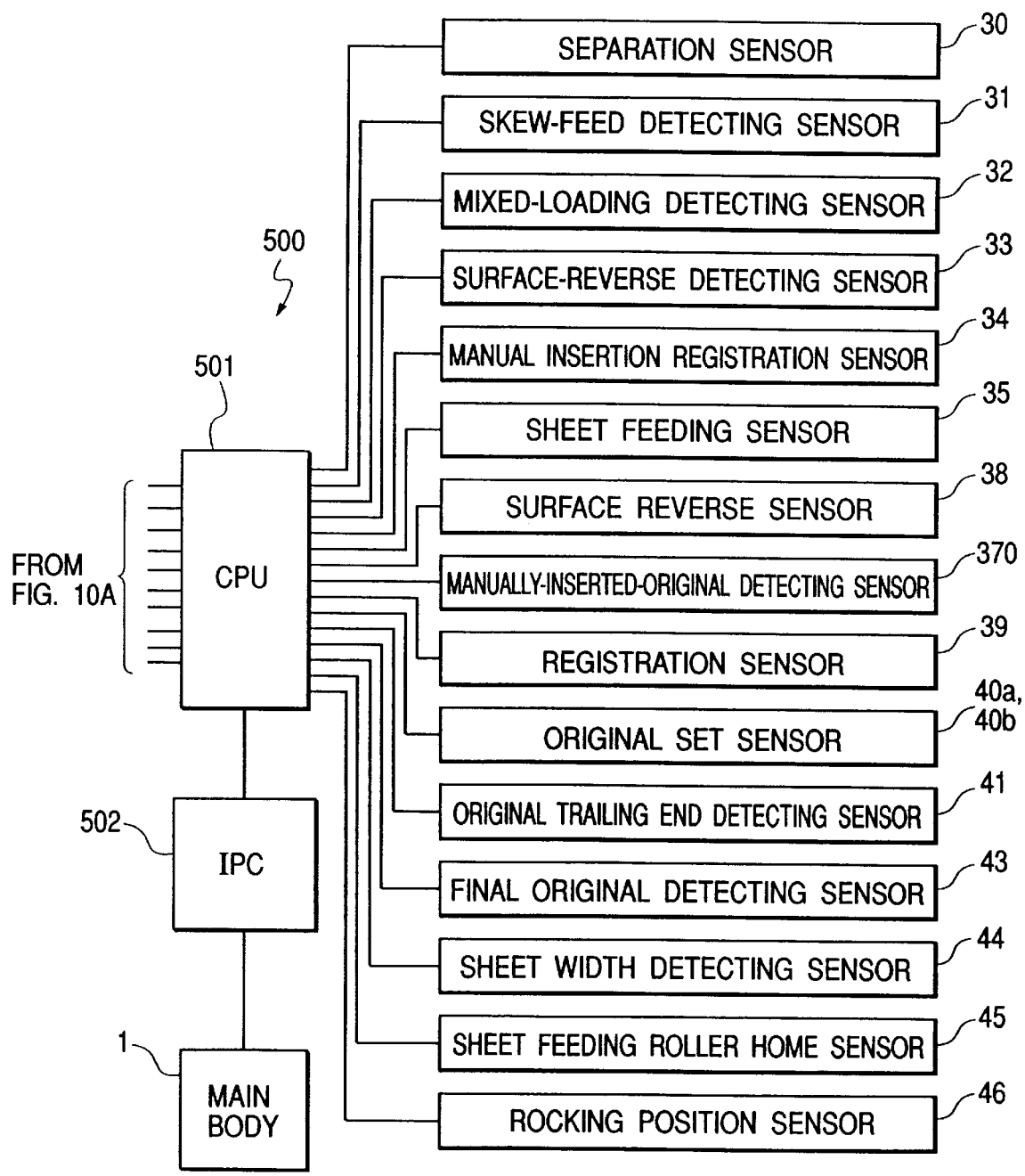
FIG. 10 which comprised of FIGS. 10A and 10B is a block diagram showing a control circuit.

FIGS. 10A and 10B are block diagrams showing a circuit arrangement of the control circuit 500 according to the illustrated embodiment. The control circuit 500 mainly includes a microprocessor (referred to as "CPU" hereinafter) 501 having a RAM (not shown) backed-up by a battery and a ROM (not shown) for storing control sequence software. A communication IC 502 serves to control data communication between the CPU 501 and the main body 1.

Various sensors such as the separation sensor 30, the skew-feed detecting sensor 31, the mixed-loading detecting sensor 32, the surface-reverse detecting sensor 33, the manual insertion registration sensor 34, the sheet feeding sensor 35, the surface-reverse sensor 38, the manually-inserted-original detecting sensor 370, the registration sensor 39, the original set detecting sensors 40a, 40b, the original trailing end detecting sensor 41, the final original detecting sensor 43, the sheet width detecting sensor 44, the sheet feeding roller home sensor 45, and the rocking position sensors 46, 47 are connected to input ports of the CPU 501, thereby monitoring movement of the originals and moving loads in the apparatus.

Further, the motors 100 to 109 are connected to output ports of the CPU 501 through driver circuits 504 to 513.

That is to say, the separating motor (DC brush motor) 100 is connected to the CPU 501 through the driver 504 and a controller 504a to be controlled by the driver 504 and the controller 504a. The controller 504a receives reference clock, ON/OFF signals used as reference of the numbers of rotations of the motor from the CPU 501.

The conveying motor (stepping motor) 101 is connected to the CPU 501 through the stepping motor driver 505 to be controlled by the stepping motor driver 505. The belt motor (stepping motor) 102 is connected to the CPU 501 through the stepping motor driver 506 to be controlled with constant current by the stepping motor driver 506. The drivers 505, 506 receive a phase exciting signal and a motor current control signal from the CPU 501.

The rocking motor (stepping motor) 103 is connected to the CPU 501 through the driver 507 to be controlled with constant voltage by the driver 507.

The sheet discharging motor (DC brush motor) 104 is connected to the CPU 501 through the driver 508 and an FG servo controller 508a to be controlled by the driver 508 and the FG servo controller 508a.

The stopper solenoid 105 is connected to the CPU 501 through the driver 509 to be controlled by the driver 509.

The separating clutch 166 is connected to the CPU 501 through the driver 510 to be controlled by the driver 510.

The path switching solenoid 107 is connected to the CPU 501 through the driver 511 to be controlled by the driver 511.

The surface-reverse flapper solenoid 108 is connected to the CPU 501 through the driver 512 to be controlled by the driver 512.

The sheet discharging flapper solenoid 109 is connected to the CPU 501 through the driver 513 to be controlled by the driver 513.

All of the drivers 504 to 513 are controlled by signals inputted to the CPU 501.

Next, a function of the illustrated embodiment will be described.

[1] Brief Explanation of Function

Figure 11:
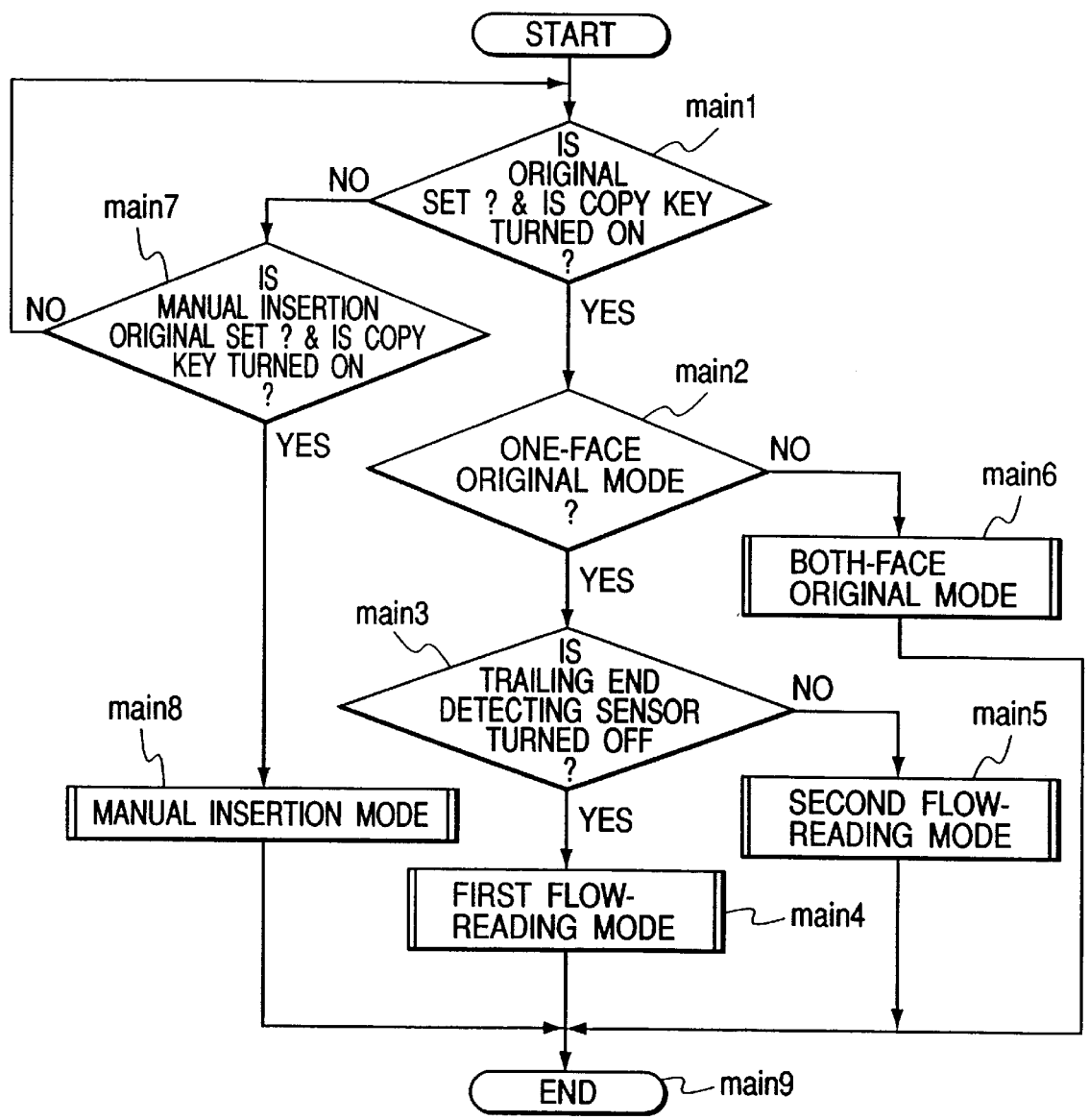
FIG. 11 is a flowchart schematically showing an operation of the image forming apparatus.

First of all, the function of the illustrated embodiment will be briefly explained with reference to FIG. 11.

When the fact that the originals P are set on the original tray 4 is detected by the original set detecting sensor 40 and a start key (copy key) on the operation portion of the main body 1 is depressed by the operator (main1), a copy mode sent from the main body 1 is judged (main2).

When the copy mode is the one-face original mode, on the basis of the signal from the original trailing end detecting sensor 41, it is judged whether the original P has half size or large size (main3). If such a signal is OFF (i.e., the original P has half size), a series of copying processes are executed under a first flow-reading mode (described later) and then the programs is ended (main4, main9). On the other hand, if such a signal is ON (i.e., the original P has large size), a series of copying processes are executed under a second flow-reading mode (described later) and then the program is ended (main5, main9).

When the copy mode sent from the main body 1 is the both-face original mode (main2), a series of copying processes are executed under the both-face original mode and then the program is ended (main6, main9).

On the other hand, even if the originals P are set on the original tray 4 is not detected by the original set detecting sensor 40, when the fact that the original is set on the manual insertion original tray 14 by the manually-inserted-original detecting sensor 370 and the start key (copy key) on the operation portion of the main body 1 is depressed by the operator (main7), a series of copying processes are executed under a manual insertion mode (described later) and then the program is ended (main8, main9).

[2] One-face Original Conveying Mode

First of all, a function in the one-face original conveying mode will be explained regarding the half size one-face original conveying mode and the large size one-face original conveying mode.

[2-1] Half Size One-face Original Conveying Mode

Now, a function for conveying the one-face original having the half size will be briefly described with reference to FIG. 12.

Figure 12:
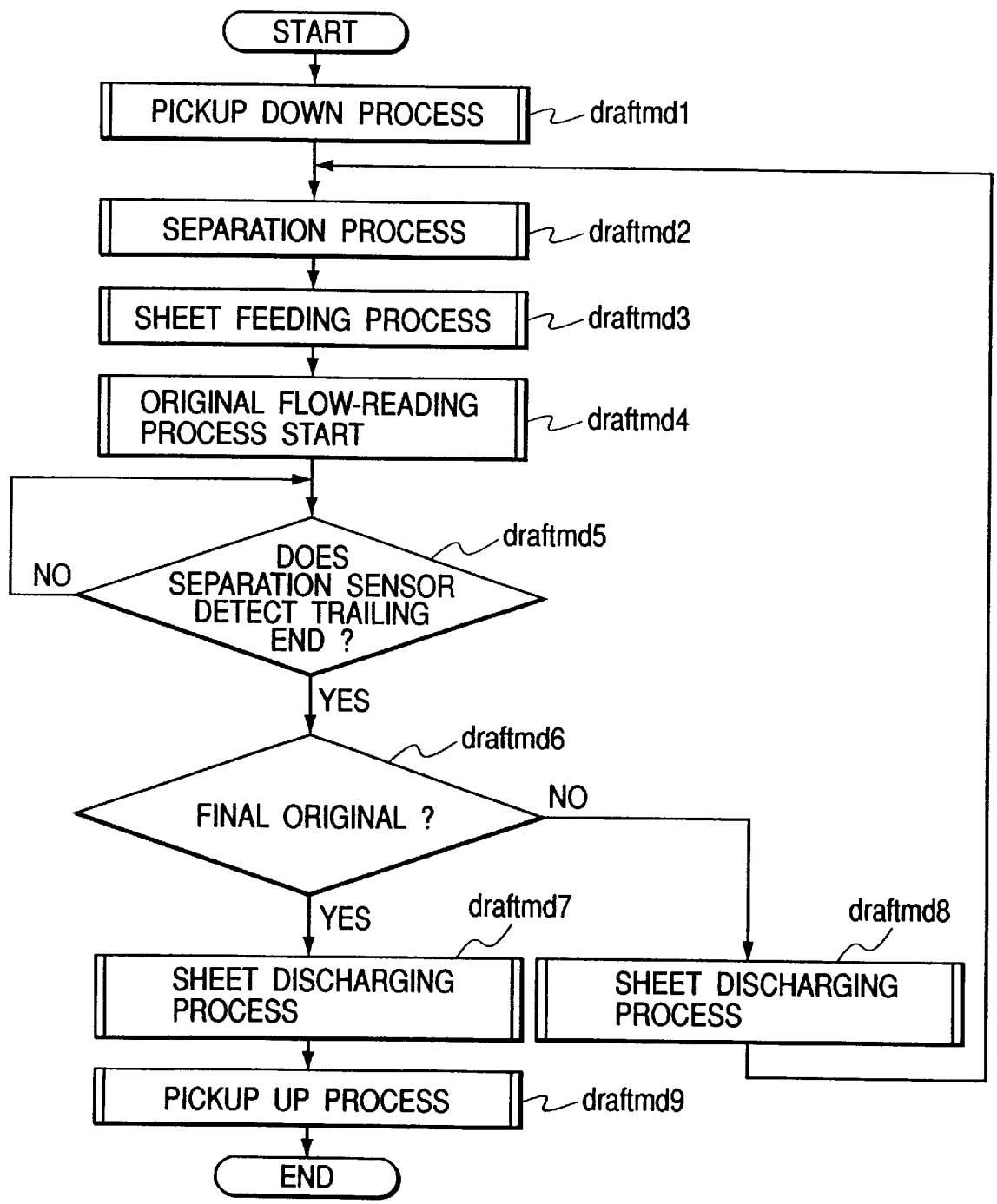
FIG. 12 is a flowchart schematically showing an operation for conveying a one-face original having a half size.

FIG. 12 is a flowchart schematically showing such a function.

When the one-face original having the half size is conveyed, a pickup DOWN process (described later fully) is firstly executed, so that the sheet feeding roller 5 is lowered to be contacted with the original P1 (draftmd1 in FIG. 12).

Thereafter, a separating process (described later fully) is effected, so that only the uppermost original P1 is separated (draftmd2 in FIG. 12), and then, a sheet feeding process is executed (draftmd3 in FIG. 12).

When the original P1 is conveyed to the predetermined position on the platen 3, the original flow-reading process (flow-reading mode) is executed, that is to say, the image on the original is read in a condition that the scanner 204 of the main body 1 is fixed at a predetermined position (draftmd4 in FIG. 12).

Thereafter, it is waiting for the fact that the trailing end of the original is detected by the separation sensor 30 (draftmd5 in FIG. 12). When the trailing end is detected, it is judged whether the original being conveyed is a final original or not by the original set detecting sensor 40 (draftmd6 in FIG. 12).

If not the final original, the sheet discharging process (described later fully) for discharging the original P1 onto the sheet discharge tray 10 is effected (draftmd8 in FIG. 12). The above-mentioned processes are repeated (drafttmd2–draftmd6 in FIG. 12).

If the original being conveyed is the final original, the sheet discharging process is executed (draftmd7 in FIG. 12), and then, a pickup-UP process (described later fully) is effected to return the sheet feeding roller 5 to the upper limit position (draftmd9 in FIG. 12), and then the program is ended.

Next, the function carried out when the half size one-face original is conveyed will be fully explained with reference to FIGS. 13A to 13C, 14A, 14B, 15A and 15B.

Figure 13A:
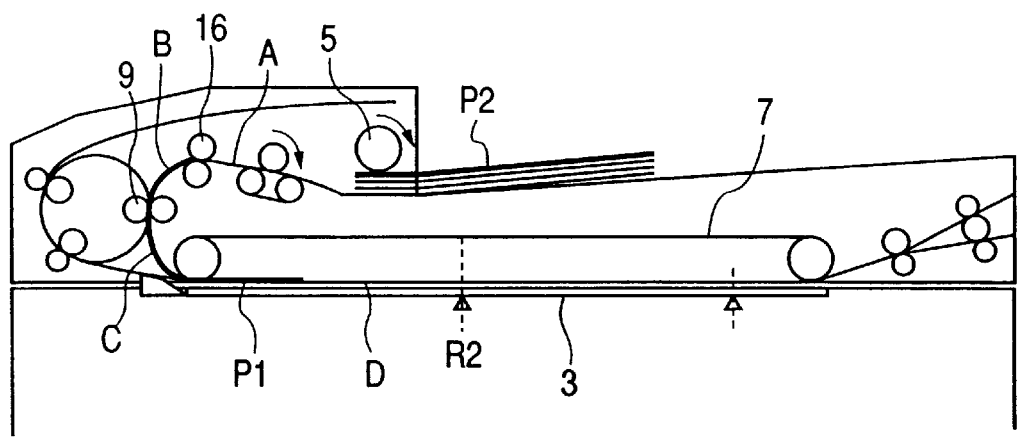
FIGS. 13A, 13B and 13C are schematic views showing a flow of the original when the one-face original having the half size is conveyed.
Figure 13B:
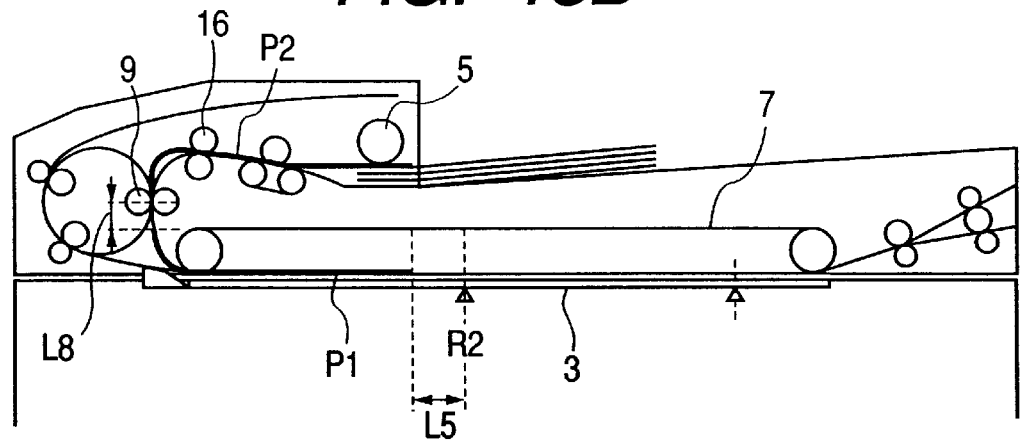
Figure 13C:
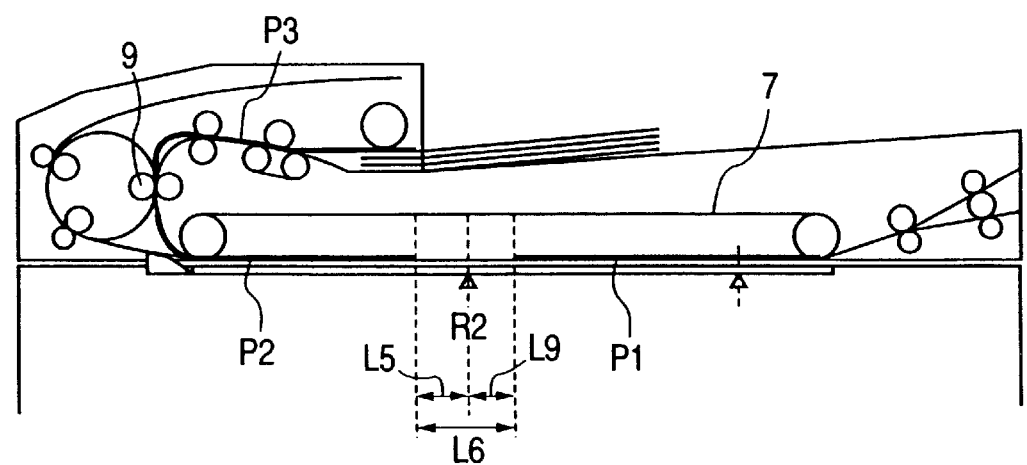
Figure 14A:
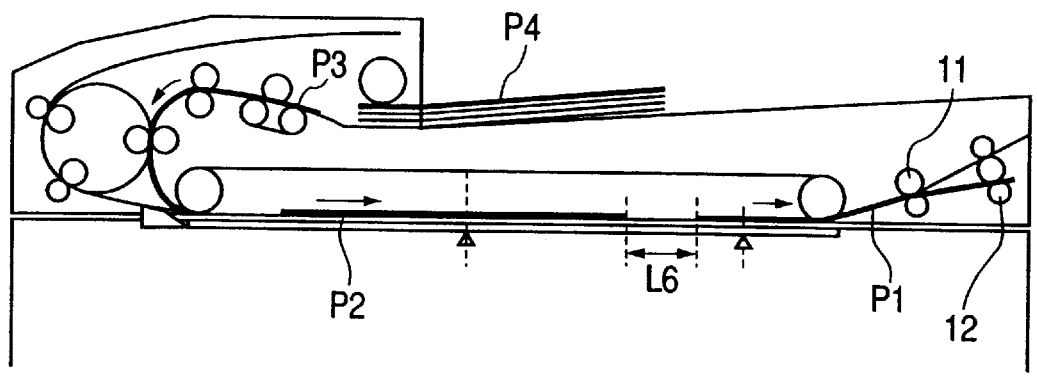
FIGS. 14A and 14B are schematic views showing a flow of the original when the one-face original having the half size is conveyed.
Figure 14B:
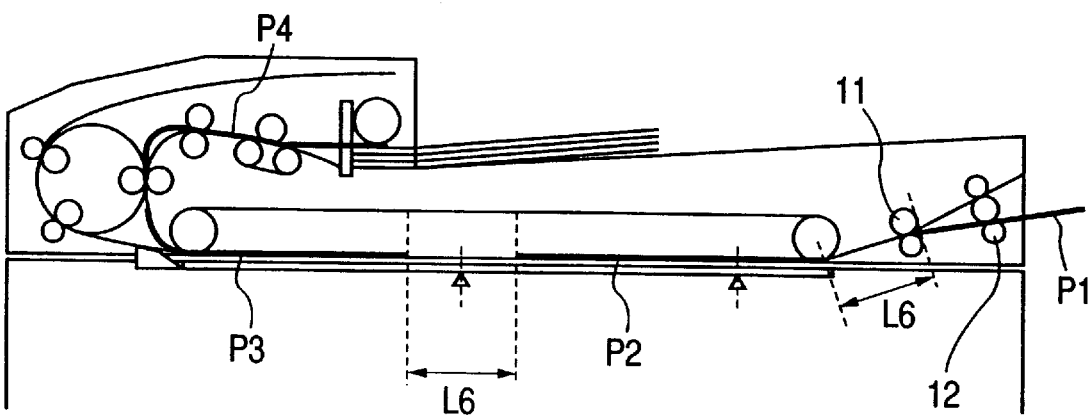
Figure 15B:
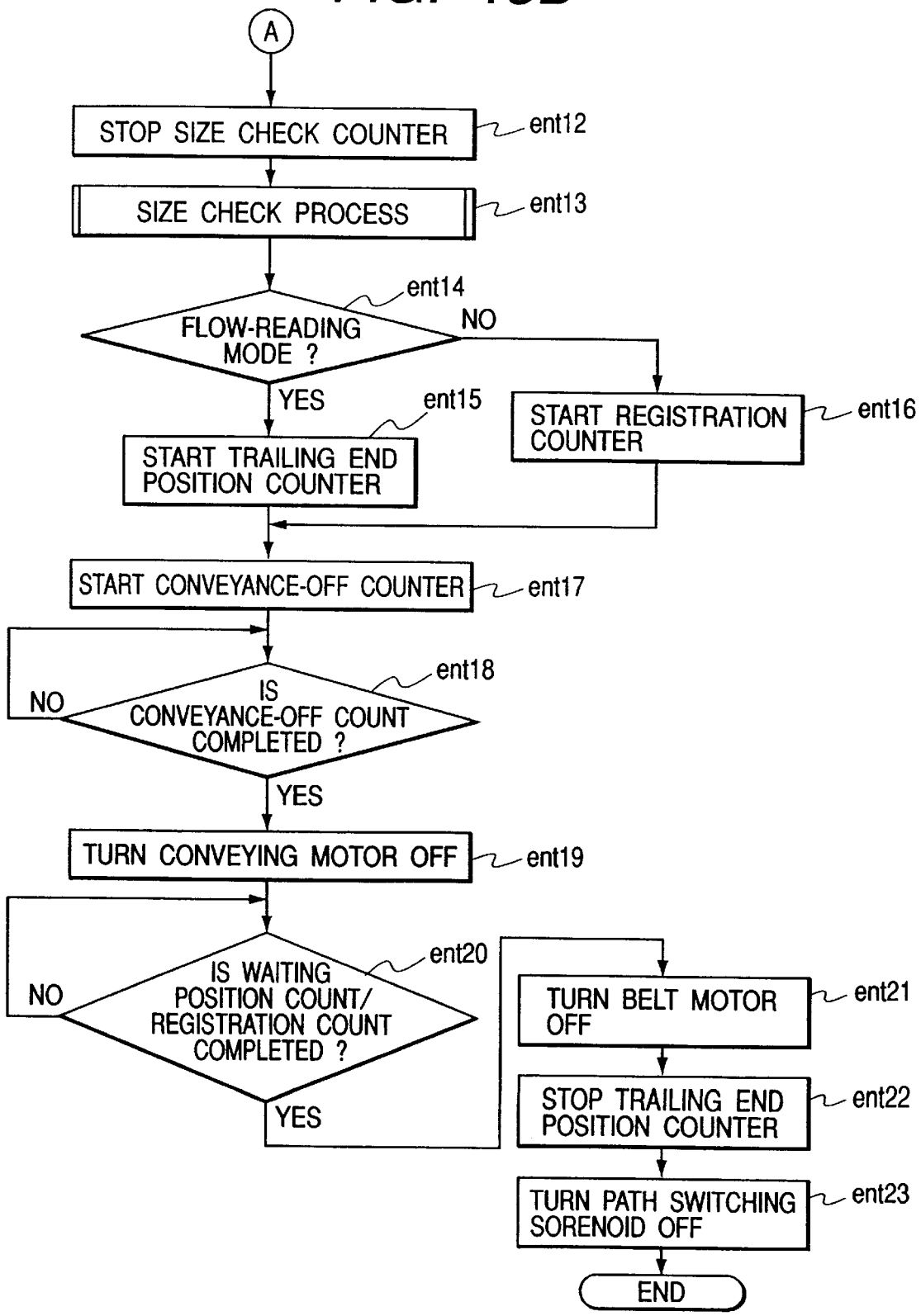
FIG. 15 which comprised of FIGS. 15A and 15B is a flowchart showing a detailed operation when the one-face original having the half size is conveyed.

FIGS. 13A to 13C, 14A and 14B are schematic views showing a flow of the original when the half size one-face original is conveyed, and FIGS. 15A and 15B are flowcharts showing the function carried out when the half size one-face original is conveyed in detail.

Normally, as shown in FIG. 4, since the sheet feeding roller 5 is retracted at the upper position (home position) than the upper separation guide plate 52, the operator can set the original bundle without being abstracted by the sheet feeding roller 5. When the originals are set, the original set detecting sensor 40 emits the signal, and, in response to this signal, the rocking motor 103 is driven to shift the sheet feeding roller 5 to the abutting position. On the basis of the signals from the rocking position sensors 46, 47, it is judged whether the sheet feeding roller 5 reaches the abutting position or not. When it is judged that the sheet feeding roller 5 reaches the abutting position, the rocking motor 103 is stopped.

Incidentally, in the following explanation, the originals stacked on the original tray 4 are designated, from the uppermost one, by "original P1", "original P2" and "original P3" in order. When the order or sequence of the originals are not specified, the original(s) is designated by "original P".

When the operator inputs the copying condition on the operation portion of the image forming apparatus and depresses the start key (copy key), the size of the original is detected by the sheet width detecting sensor 44. Then, the conveyance of the original is effected by the sheet feeding roller 5 and the sheet separation (described later fully) is effected by the separating portion S, with the result that the uppermost original P1 is conveyed through the original convey paths A, B and the leading end of the original is maintained in an abutting condition against the nip of the second feeding roller 9.

The skew-feed of the original P1 passed through the separating portion S is detected by the separation sensor 30 and the skew-feed detecting sensor 31 before the original is conveyed by the first feeding roller 16, and, thereafter, the original is conveyed at a high speed by the first feeding roller 16.

On the basis of the signals from the separation sensor 30 and the separation clock sensor 100b, it is judged whether or not the original conveyed by the separation conveying roller 8 reaches the first feeding roller 16. When this judgment is effected, the sheet feeding roller 5 is lifted to the spacing position where the original is spaced apart from the sheet feeding roller 5.

In case of the continuous sheet feeding, the sheet feeding roller 5 is not lifted up to the home position shown in FIG. 4 and is controlled so that the sheet feeding roller 5 is stopped at an intermediate position (a retraction position shown in FIG. 16) where the sheet feeding roller is spaced apart from the uppermost original P1 by about 3 to 5 mm. Thus, the shifting amount of the sheet feeding roller 5 is minimized, with the result that the touchdown vibration of the sheet feeding roller 5 against the uppermost original P1 is reduced, thereby improving the sheet feeding ability and reducing the start time of conveyance of the succeeding original.

When the sheet feeding roller 5 is lifted as mentioned above, the separating clutch 106 is turned OFF to stop the separating belt 6 and the separation conveying roller 8. Incidentally, since the separation conveying roller 8 is constituted by the one-way roller, this roller is rotated by the movement of the original P1 being conveyed.

Figure 43:
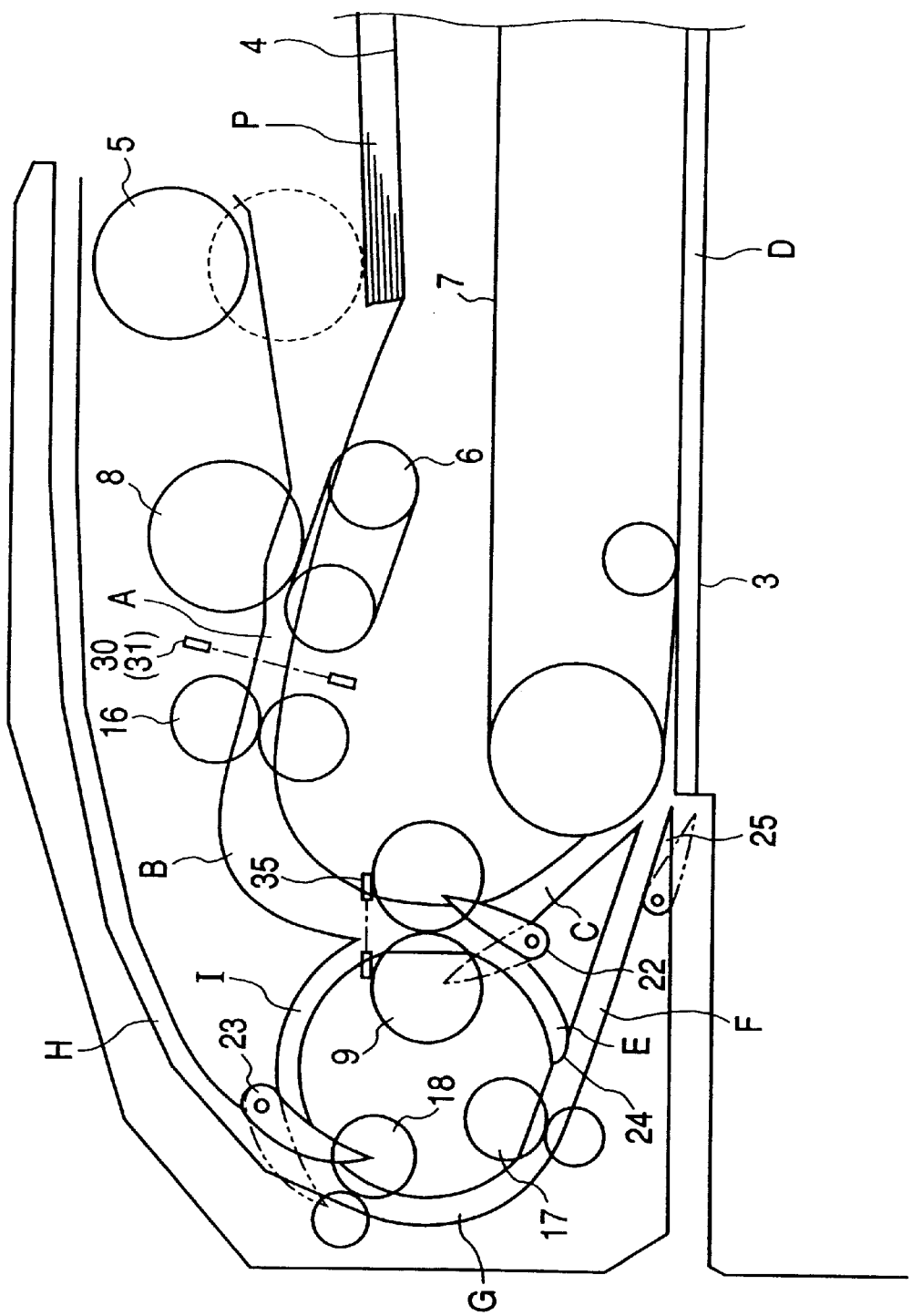
FIG. 43 is a view showing a separating/feeding portion of the ADF.

On the other hand, the path switching solenoid 107 is turned OFF to hold the sur face-reverse sheet feeding flapper 22 to the solid line position in FIG. 43, with the result that the original convey path C is closed and the surface-reverse feed path E is opened. However, in this mode, the path switching solenoid 107 is ON-controlled (ent1 in FIGS. 15A and 15B) to shift the surface-reverse sheet feeding flapper 22 to the two dot and chain line position in FIG. 43, thereby closing the surface-reverse feed path E and opening the original convey path C.

Then, the separating motor 100, the conveying motor 101 and the belt motor 102 are driven (ent2 in FIGS. 15A and 15B) to rotate the first feeding roller 16, the second feeding roller 9 and the wide belt 7. As a result, the original P1 is conveyed through the original convey paths B, C by the first feeding roller 16 and the second feeding roller 9 (refer to FIG. 13A). Incidentally, the first feeding roller 16 and the second feeding roller 9 are controlled so that the conveying speeds of these rollers become the same as each other. Further, the original conveying speed of the second feeding roller 9 and the original conveying speed of the wide belt 7 are controlled so that they become the same as each other at the time when the original P1 enters into the convey path D.

On the other hand, at the same time when the conveying motor 101 is driven (ent2 in FIGS. 15A and 15B), a size check counter for counting clock signals from surface-reverse clock is started (ent3 in FIGS. 15A and 15B).

When the original P1 is conveyed to the original convey path C, the leading end of the original is detected by the registration sensor 39 to output the ON signal (ent4 in FIGS. 15A and 15B). In response to this ON signal, it is judged whether the first flow-reading mode or the second flow-reading mode is selected (ent5 in FIGS. 15A and 15B). In case of the flow-reading mode, a waiting position counter for counting clock signals from a belt exciting clock is started (ent6 in FIGS. 15A and 15B).

When the passage of the trailing end of the original is detected by the separation sensor 30 (ent7 in FIGS. 15A and 15B), a separation-off counter for counting clock signals from a separation clock is started (ent8 in FIGS. 15A and 15B). When the count corresponding to the distance between the first feeding roller 16 and the separation sensor 30 is completed (ent9 in FIGS. 15A and 15B), since the trailing end of the original P1 has already left the first feeding roller 16, the separating motor, 100 is turned OFF to stop the first feeding roller 16 (ent10 in FIGS. 15A and 15B).

When the passage of the trailing end of the original is detected by the sheet feeding sensor 35 (ent11 in FIGS. 15A and 15B), the size check counter is stopped (ent12 in FIGS. 15A and 15B), and, on the basis of data from this counter, the size check process (described later fully) is effected (ent13 in FIGS. 15A and 15B).

Then, a conveyance-off counter for counting clock signals from the surface-reverse clock is started (ent17 in FIGS. 15A and 15B). At the time when this counter counts the clock signals corresponding to the distance between the sheet feeding sensor 35 and the second feeding roller 9, the conveying motor 101 is turned OFF (ent18, ent19 in FIGS. 15A and 15B). As a result, the rotation of the second feeding roller 9 is stopped at the time when the trailing end of the preceding original P1 leaves the nip of the second feeding roller 9. Incidentally, since the preceding original P1 has already entered into the original convey path D on the platen 3, the original is conveyed by the wide belt 7 alone.

On the other hand, the sheet feeding roller 5 is retracted to the retraction position shown in FIG. 16. When the trailing end of the preceding original P1 conveyed by the separation conveying roller 8 leaves the nip of the sheet feeding roller 5, the sheet feeding roller 5 is lowered to the abutting position again for preparing for the supplying of the succeeding original P2. When the trailing end of the preceding original P1 leaves the nip of the first feeding roller 16, the separating clutch 106 is turned ON to start the feeding of the succeeding original P2 effected by the sheet feeding roller 5 (refer to FIG. 13A). Incidentally, on the basis of the signals from the separation sensor 30 and the separation clock sensor 100b, it is judged whether or not the trailing end of the preceding original P1 leaves the nip of the sheet feeding roller 5.

As mentioned above, although the rotation of the second feeding roller 9 is stopped when the trailing end of the preceding original P1 leaves the nip of the second feeding roller 9, since the succeeding original P2 is fed at a high speed by the sheet feeding roller 5, at the time when the rotation of the second feeding roller 9 is stopped, the succeeding original P2 has already been conveyed to a position where the leading end of the succeeding original P2 reaches the upstream vicinity position of the second feeding roller 9 (where the sheet feeding sensor 35 is disposed). When the leading end of the succeeding original P2 is detected by the sheet feeding sensor 35, the skew-feed correcting control is effected in the same manner as the preceding original P1.

At the same time when the size check process for the preceding original P1 is finished, it is judged whether or not the flow-reading mode is selected (ent14 in FIGS. 15A and 15B). In case of the first or second flow-reading mode, a trailing lend position counter is started (ent15 in FIGS. 15A and 15B); whereas, if not the flow-reading mode, a registration counter is started (ent16 in FIGS. 15A and 15B). The trailing end position counter and the registration counter serve to count clock signals from the belt exciting clock.

In case of the flow-reading mode, it is waiting for completion of the counting of the waiting position counter; whereas, if not the flow-reading mode, it is waiting for completion of the counting of the registration counter (ent20 in FIGS. 15A and 15B). When the counting of the counter is completed, the belt motor 102 is stopped (ent21 in FIGS. 15A and 15B). As a result, the preceding original P1 is temporarily stopped at a position spaced apart, by a predetermined distance L8, from a position where the trailing end of the original leaves the sheet feeding sensor 35 and the nip of the second feeding roller 9 (refer to FIG. 13B).

That is to say, when the distance between the trailing end of the preceding original P1 and the nip of the second feeding roller 9 is L8 and the length of the original P1 in the conveying direction is $L_{ph}$, the following relationship is satisfied:

$$L8=L2-L5-L_{ph}>0 \qquad \text{(Numerical Expression 2)}$$

Where, L2 is a distance from the second original end position R2 to the nip of the,second feeding roller 9, and L5 is a distance from the second original end position R2 to the leading end of the preceding original P1.

Namely, the trailing end position counter serves to calculate an output timing of the original end signal in the original flow-reading process (described later) under the first or second flow-reading mode, and the registration counter serves to stop the original at the predetermined position on the platen 3 in case of non-flow-reading mode.

At the same time when the belt motor 102 is stopped to stop the original at the waiting position (ent21 in FIGS. 15A and 15B), the trailing end position counter starting the counting in the flow-reading mode is stopped (ent22 in FIGS. 15A and 15B), and the path switching solenoid 107 is turned OFF (ent23 in FIGS. 15A and 15B).

When the original P1 is temporarily stopped in this way, the control circuit 500 outputs a conveyance completion signal to the main body 1 and is waiting for a conveyance start signal from the main body 1.

When the skew-feed correcting control for the succeeding original P2 is completed and the control circuit 500 receives the conveyance start signal from the main body 1 (i.e., from the scanner 204), the control circuit 500 drives the wide belt 7 to convey the preceding original P1 at the image forming speed.

Meanwhile, the second feeding roller 9 is still stopped and the succeeding original P2 is in the waiting condition. When the distance (referred to as "sheet-to-sheet distance" hereinafter) between the trailing end of the preceding original P1 and the leading end of the succeeding original P2 reaches the predetermined distance (L8a), the second feeding roller 9 is driven to convey the succeeding original P2 at the same image forming speed as the preceding original P1. The driving and the conveying speed of the second feeding roller 9 are controlled so that the conveying speed of the wide belt 7 becomes equal to the conveying speed of the second feeding roller 9 at the time when the sheet-to-sheet distance reaches L6. Since the timing for driving the second feeding roller 9 is later than the timing for driving the wide belt 7, it is greater than the distance L8a (a distance between the trailing end of the preceding original P1 and the leading end of the succeeding original P2 at the moment when the second feeding roller 9 is driven) and is smaller than the distance L6. incidentally, in consideration of the loss of the original P2 at the acceleration of the second feeding roller 9, the timing for driving the second feeding roller 9 is selected to a timing when the sheet-to-sheet distance between the succeeding original and the preceding original P1 (final sheet-to-sheet distance) becomes L6.

When the preceding original P1 reaches the second original end position R2, the control circuit 500 outputs an original end reach signal to the main body 1. Upon receipt of this signal, the main body 1 starts the image reading (flow-reading mode) for the preceding original P1. In this half size one-face original conveying mode, the scanner 204, is kept stationary at the second original end position R2 to read the image on the original disengaged from the second feeding roller 9 and conveyed by the wide belt 7.

When the image reading is finished, the original P2 is stopped at a position where a distance between the trailing end of the original and the second original end position R2 becomes a predetermined distance L9 (refer to FIG. 13C). In this case, the succeeding original P2 is stopped at a position where a distance between the leading end of the original and the second original end position R2 becomes a predetermined distance L5, and a further succeeding original P3 is waiting in a condition that a loop for correcting the skew-feed is formed in this original by the stopped second feeding roller 9.

In this condition, when the conveyance start signal is inputted from the main body 1, the control circuit 500 drives the wide belt 7 (belt motor 102) to start the conveyance of the succeeding original P2. When the original P2 reaches the second original end position R2, the main body 1 effects the image reading for the original P2.

Thereafter, the discharging process (described later fully) for the preceding original P1 is effected to discharge the original onto the distance tray 10 (refer to FIGS. 14A and 14B).

Next, the above-mentioned processes will be fully described.

Pickup DOWN Process

Figure 17:
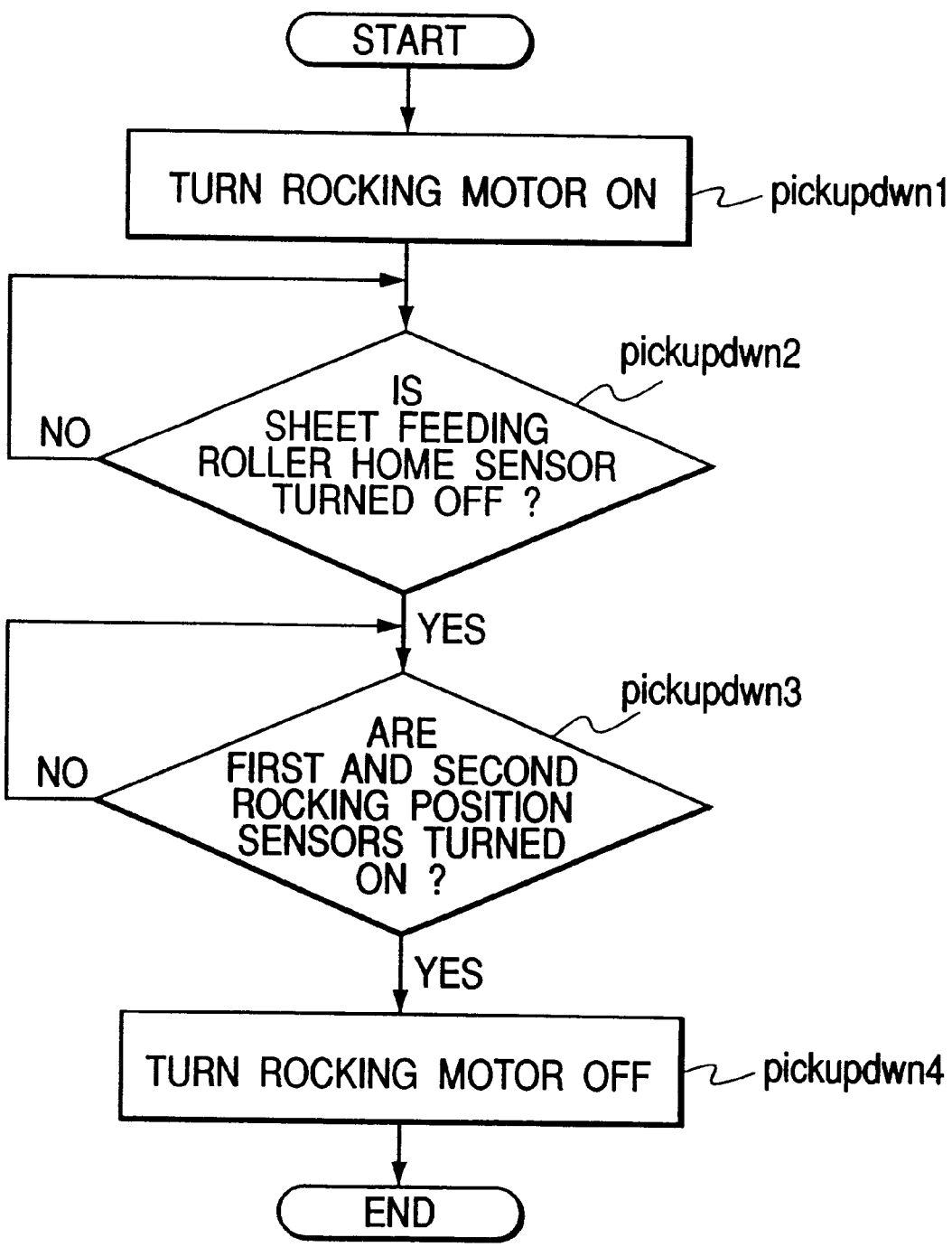
FIG. 17 is a flowchart for explaining a pickup-DOWN process of the sheet feeding roller.

Now, the pickup DOWN process will be explained with reference to FIG. 17.

When the sheet feeding roller 5 is in the home position (FIG. 4), the sheet feeding roller home sensor 45 is in the ON condition. In this condition, when the rocking motor 103 is driven to lower the lift/lower arm 51 and the rocking arm 53 (pickupdwn1), the sheet feeding roller home sensor 45 is turned OFF (pickupdwn2). When the lift/lower arm 51 and the rocking arm 53 are further lowered, in the condition that the sheet feeding roller 5 is contacted with the uppermost original P1, the rocking position sensors 46, 47 are blocked by the rocking arm flags 54, 55 to output ON signals (pickupdwn3), and, in response to the ON signals, the rocking motor 103 is stopped (pickupdwn4). In this condition, the sheet feeding roller 5 is contacted with the original P1 by its own weight to always afford the stable feeding force to the original P1 (refer to FIG. 18).

After the sheet feeding roller home sensor 45 is turned OFF (pickupdwn2), if the lift/lower arm 51 is lowered, the positioning pin 51c is disengaged from the rocking arm 53 to generate relative positional deviation between the rocking arm 53 and the lift/lower arm 51. However, since the lift/lower arm 51 is stopped on the basis of the ON signals from the rocking position sensors 46, 47, the deviation amount becomes constant (refer to FIG. 18).

Separating Process and Skew-feed Correction

Next, the separating process and the skew-feed correction will be explained with reference to FIG. 19.

When the separating motor 100 is driven as mentioned above (sepa1 in FIG. 19), the separating belt 6 and the separation conveying roller 8 are rotated in directions indicated by the arrows, respectively, with the result that the originals P conveyed from the original tray 4 are separated one by one and the separated original is conveyed into the downstream original convey path B. When the leading end of the original P1 reaches a predetermined position at the downstream side of the separation conveying roller 8, the separation sensor 30 is turned ON (sepa2 in FIG. 19), and the speed of the separating motor 100 is controlled on the basis of the remaining conveying distance for forming the loop in the original by abutting the leading end of the original against the second feeding roller 9 and a lapse time till the separation sensor 30 is turned ON, so that the separating process is finished within a predetermined time period (sepa3 n FIG. 19).

Figure 19:
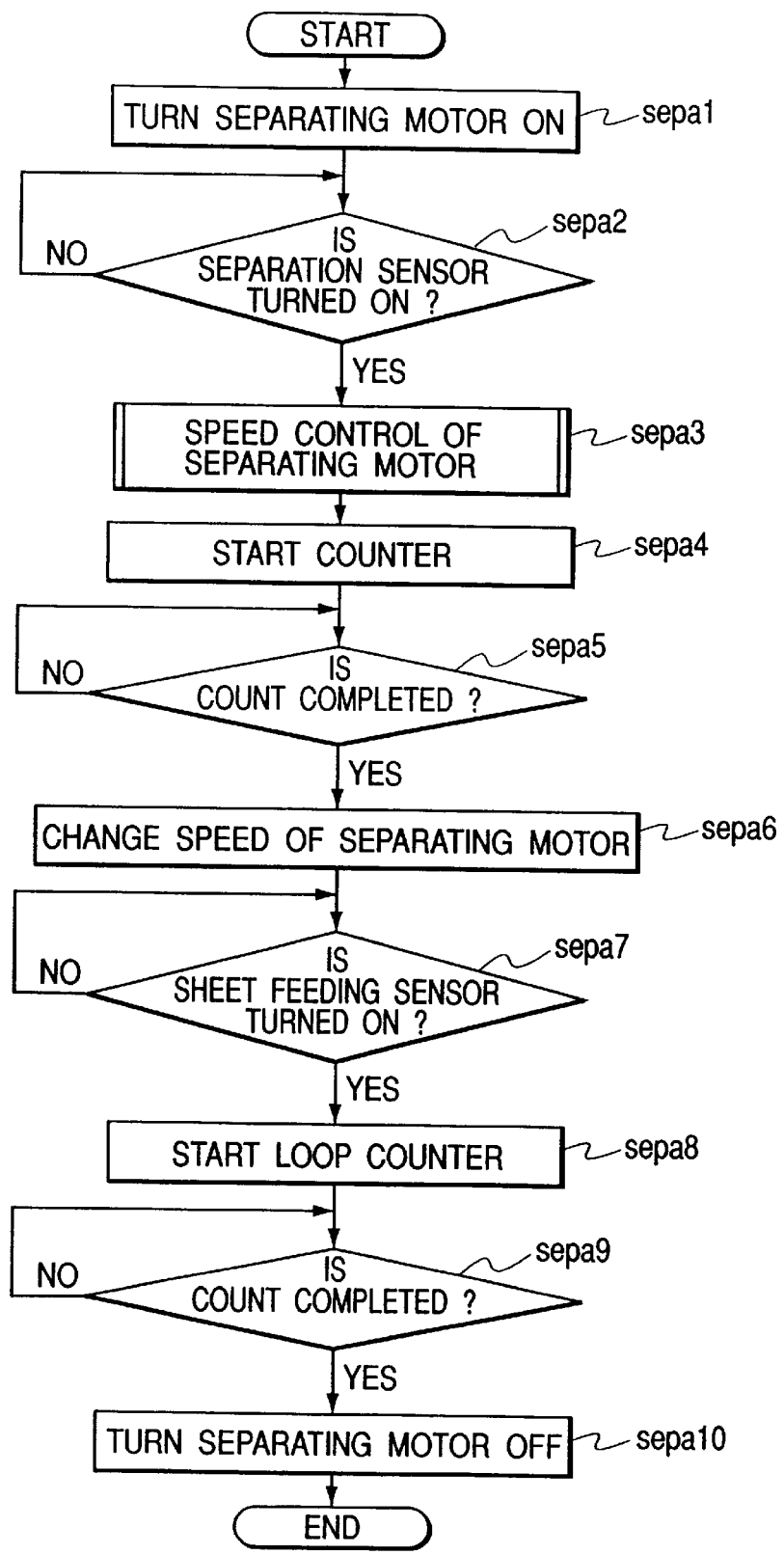
FIG. 19 is a flowchart for explaining a separating process.

At the same time, a separating motor speed counter for counting clock signals from the separation clock is started at a predetermined position (sepa4 in FIG. 19). When the counting of the counter is finished (sepa5 in FIG. 19), the speed of the separating motor is increased (or decreased) to a predetermined speed (sepa6 in FIG. 19).

When the leading end of the original P1 is detected by the sheet feeding sensor 35 disposed in the vicinity of the second feeding roller 9 at the upstream side thereof (sepa7 in FIG. 19), a separation loop counter for counting clock signals from the separation clock is started (sepa8 in FIG. 19). After the counting of this counter is finished, the driving of the separating motor 100 (driving of the first feeding roller 16) is stopped (sepa9, sepa10 in FIG. 19). As a result, after the leading end of the original P1 abuts against the stopped second feeding roller 9, the original is stopped in a condition that a predetermined loop is formed in the original, thereby correcting the skew-feed as is well known.

If the double feed of originals occurs, although a lowermost original is returned toward the original tray 4 by the separating belt 6, before this original reaches the sheet feeding roller 5, the sheet feeding roller 5 may be shifted to the spacing position.

Size Check Process

Next, the size check process will be explained with reference to FIG. 20.

Figure 20:
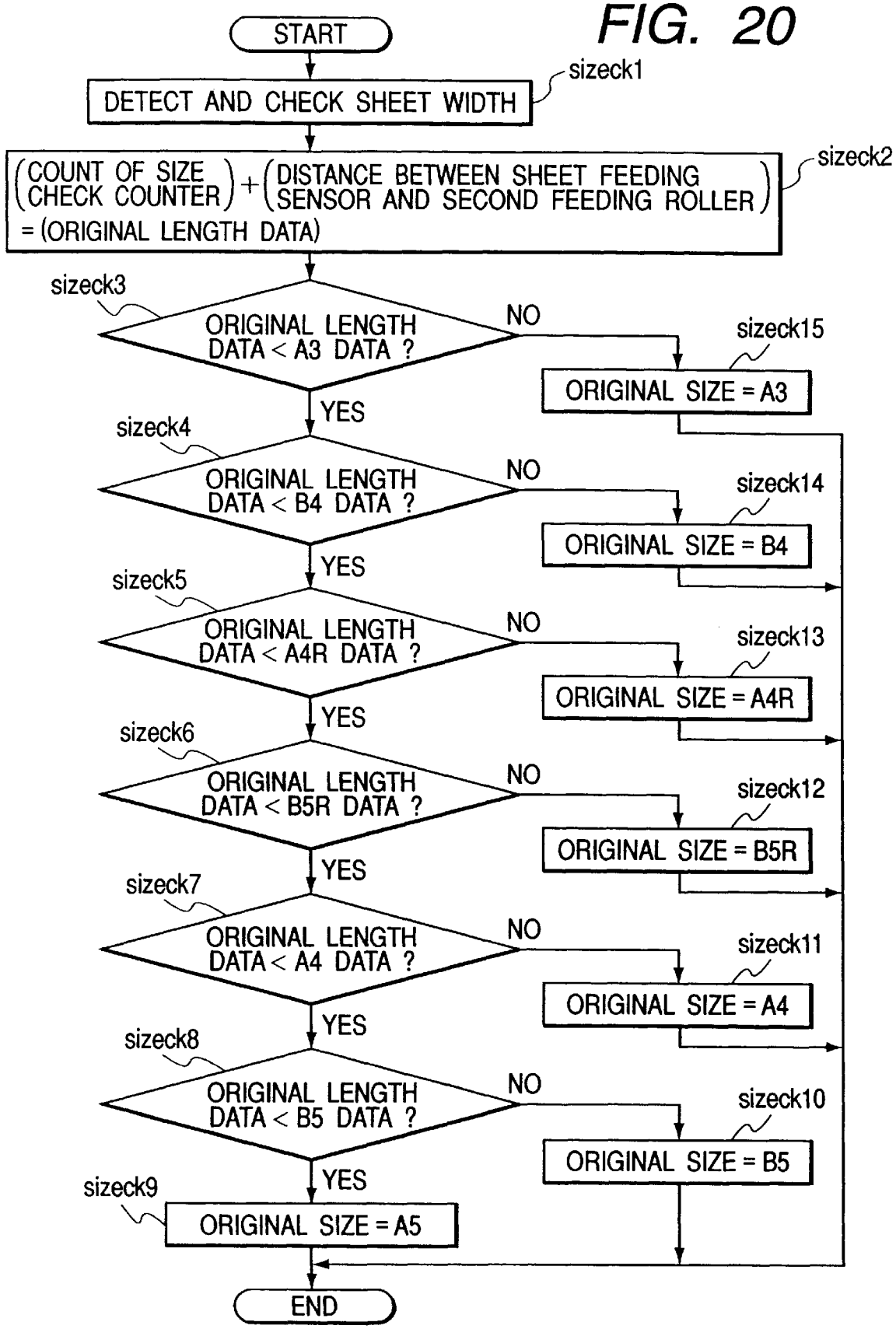
FIG. 20 is a flowchart for explaining a size check process.

In the size check process, it is judged whether the original has the fixed size or the non-fixed size, by the sheet width detecting sensor (size judging means) 44 provided on the original tray 4 (sizeck1 in FIG. 20).

Then, the value of the distance between the sheet feeding sensor 35 and the second feeding roller 9 is added to the count value of the size check counter (i.e., a count value which is obtained by a manner in which the counting is started at the same time when the leading end of the original is fed from the second feeding roller 9 (ent3 in FIGS. 15A and 15B) and the counting is stopped at the time when the passage of the trailing end of the original is detected by the sheet feeding sensor 35 (ent12 in FIGS. 15A and 15B)) (referred to as "size check counter data" hereinafter), thereby obtaining the length of the original in the conveying direction (sizeck2 in FIG. 20). In this case, the original has been conveyed by the second feeding roller 9 and the wide belt 7, and the conveying amount surely coincides with the count value of the belt exciting clock.

Thereafter, the size of the original is judged (sizeck3–8 in FIG. 20). Then, on the basis of the judged result, it is determined whether the original has A5 size, B5 size, A4 size, B5R size, A4R size, B4 size or A3 size (sizeck9–15 in FIG. 20).

Original flow-reading process

Next, the original flow-reading process will be explained with reference to FIG. 21.

Figure 21:
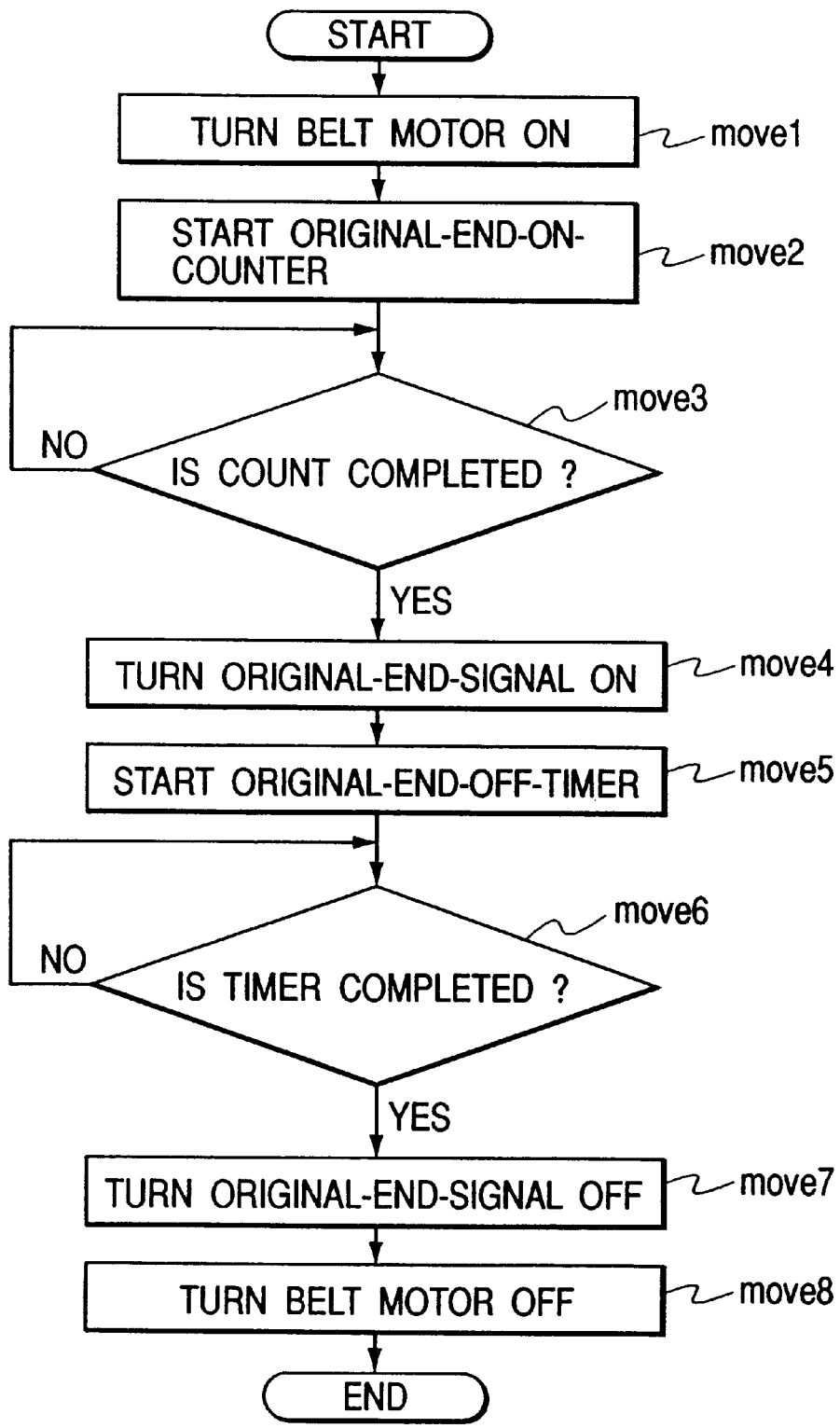
FIG. 21 is a flowchart for explaining an original flow-reading process.

First of all, the belt motor 102 is driven (move1 in FIG. 21). As a result, the wide belt 7 is driven to convey the original P1 along the platen 3 as mentioned above. At the same time when the belt motor 102 is driven, an original-end-on-counter for counting clock signals from the belt exciting clock is started (move2 in FIG. 21). Incidentally, in this case, the exciting clock signals on the basis of the flow-reading speed data (V) from the main body 1 are inputted to the belt motor 102, thereby controlling the belt motor 102 with constant speed.

A value counted by the original-end-on-counter (referred to as "original-end-on-counter value" hereinafter) serves to define a distance from the waiting position of the original (more correctly, the leading end position of the original in the waiting position) to the optical system fixing position (R2) (in other words, a conveying amount of the original from the leading end position to the optical system fixing position (R2)).

In case of the original having fixed size, the waiting position of the original (the leading end position of the original in the waiting position) is determined by the result from the trailing end position counter (i.e., result of the counter in which the counting is started at the time when the trailing end of the original is passed by the sheet feeding sensor 35 and is stopped at the time when the original is stopped at the waiting position (ent15, ent22 in FIGS. 15A and 15B); this result represents the distance from the trailing end of the original in the waiting position to the sheet feeding sensor 35) and the rated length of the original obtained from the size check process.

Namely, in the illustrated embodiment, the trailing end position counter acts as a conveying amount detecting means and serves to calculate the conveying amount of the original after the trailing end of the original passes by the sheet feeding sensor. The size check counter acts as a length detecting means and serves to detect the length of the original in the conveying direction. Further, a conveying position calculating means serves to calculate the leading end position of the original in the waiting position on the basis of the result from the trailing end position counter and the result from the size check counter.

On the other hand, in case of the original having non-fixed size, the waiting position of the original (the leading end position of the original in the waiting position) is determined by the result from the waiting position counter (i.e., result of the counter in which the counting is started at the time when the leading end of the original is passed by the registration sensor 39 and is stopped at the time when the original is stopped at the waiting position (ent6, ent20 in FIGS. 15A and 15B); this result represents the distance from the leading end of the original in the waiting position to the registration sensor 39).

Namely, in the illustrated embodiment, the waiting position counter acts as a conveying amount detecting means and serves to calculate the conveying amount of the original after the leading end of the original passes by the registration sensor. Further, the conveying position calculating means serves to calculate the leading end position of the original in the waiting position on the basis of the result from the waiting position counter.

Thereafter, at the time when the counting of the original-end-on-counter is finished (move3 in FIG. 21), the original-end-signal is sent to the main body 1 (move4 in FIG. 21).

In the main body 1, in the flow-reading mode, the scanner 204 is fixed at the optical system fixing position (R2) and a time period till the leading end of the original reaches the fixing position (R2) is calculated. When the calculated time period is elapsed after receipt of the original-end-signal, the main body 1 drives the scanner 204 to read the image on the original.

The original-end-signal is turned OFF after the predetermined time period is elapsed (move5, move6, move7 in FIG. 21), thereby finishing the image reading. When the trailing end of the original passes through the reading position (R2), the belt motor 102 is stopped (move8 in FIG. 21).

The flow-reading speed data (V) may be equal to or may be different from the reading speed (V1) during the movement of the optical system., Particularly when V>V1 is set, since the original image reading is finished for a shorter time than the normal reading effected by moving the optical system, the copying speed is improved.

Pickup UP Process

Figure 22:
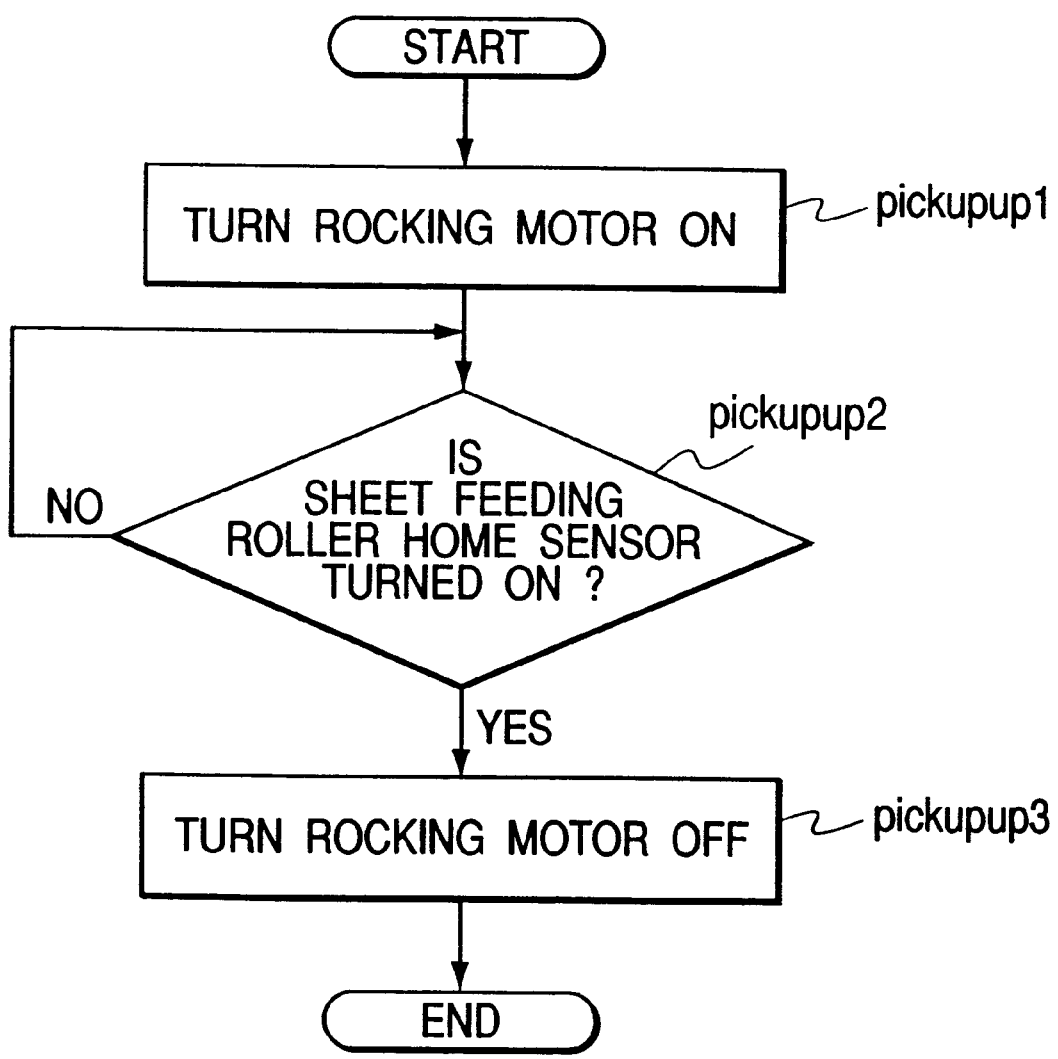
FIG. 22 is a flowchart for explaining a pickup-UP process of the sheet feeding roller.

Next, the pickup UP process will be explained with reference to FIG. 22.

In the pickup UP process, the rocking motor 103 is driven in a direction opposite to the direction in the pickup DOWN process (pickupup1 in FIG. 22) to lift the sheet feeding roller 5 together with the lift/lower arm 51 and the rocking arm 53. When the sheet feeding roller home sensor 45 is turned ON, the rocking motor 103 is stopped (pickupup2, pickupup3 in FIG. 22), thereby holding the sheet feeding roller 5 at the upper limit position.

Discharging Process

Next, the sheet discharging process will be explained with reference to FIG. 23.

When the belt motor 102 is driven as mentioned above, the wide belt 7 and the manual insertion registration roller pair 11 are rotated. The manual insertion registration roller pair 11 is driven at the same conveying speed as that of the wide belt 7 so that the original P1 and the original P2 are conveyed in the condition that the sheet-to-sheet distance is maintained to L6. At the same time when the belt motor 102 is driven, the sheet discharging motor 104 is driven (ejct1 in FIG. 23) to rotate the sheet discharging roller 12 and the manual insertion sheet feeding roller 13. The sheet discharging roller 12 is driven at a conveying speed equal to or slightly greater than the conveying speed of the wide belt 7.

On the other hand, the sheet discharging flapper solenoid 109 is in the OFF condition so that the tip end of the sheet discharging flapper 26 is located below the platen 3 as shown by the two dot and chain line in FIG. 3. Accordingly, the preceding original P1 on the platen 3 is conveyed from the original convey path D through the original discharge path J by the wide belt 7, the manual insertion registration roller pair 11 and the sheet discharging roller 12, thereby discharging onto the discharge tray 10.

Figure 23:
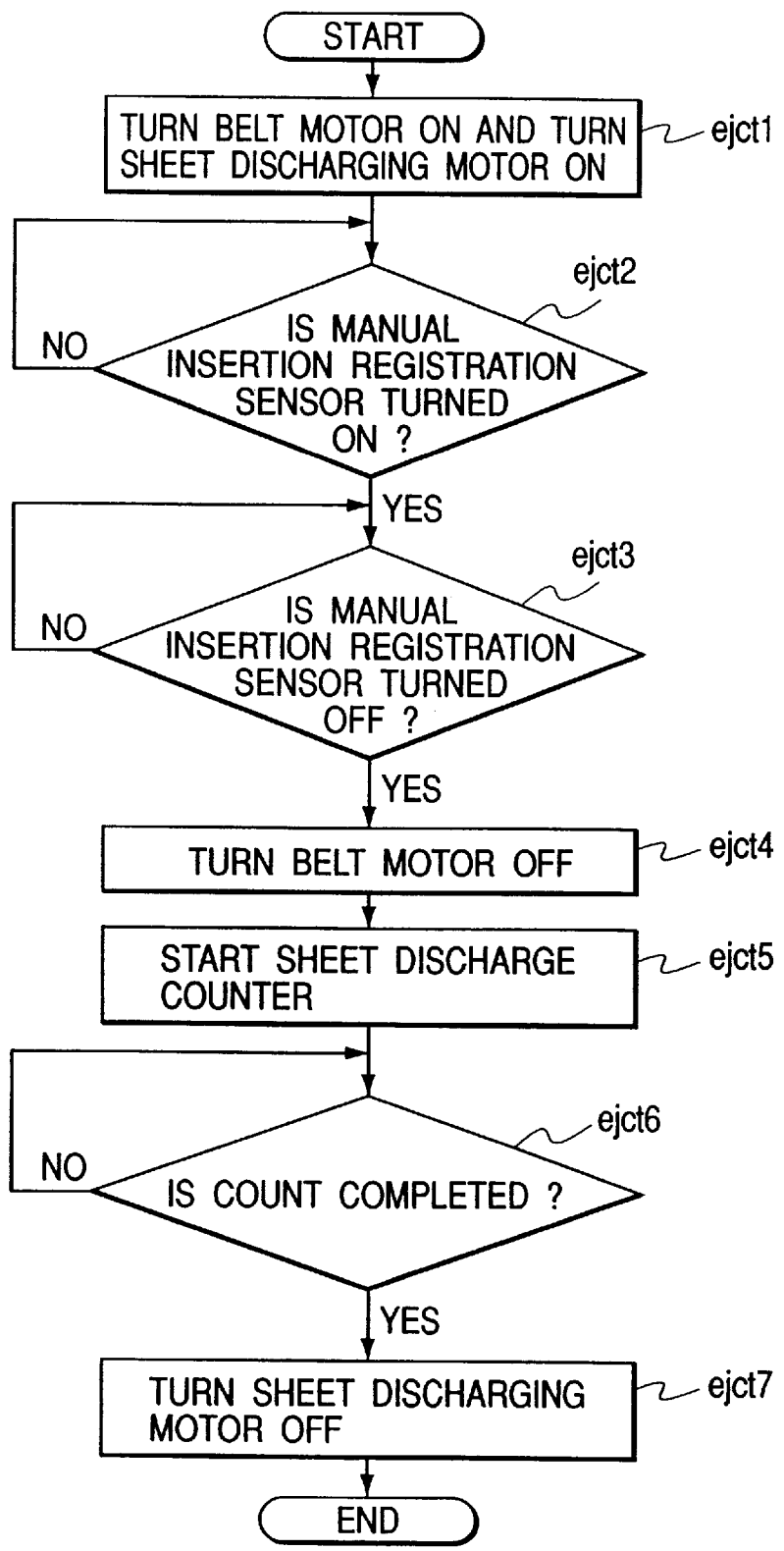
FIG. 23 is a flowchart for explaining a sheet discharging process.

When it is ascertained that the original P1 is being conveyed through the original discharge path J by detecting the leading end of the discharged original P1 by means of the manual insertion, registration sensor 34 (ejct2 in FIG. 23) and when it is ascertained that the trailing end of the preceding original P1 leaves the nip of the manual insertion registration roller pair 11 by detecting the trailing end of the original P1 by means of the sensor 34 (ejct3 in FIG. 23), the belt motor 102 is stopped (ejct4 in FIG. 23). As a result, although the wide belt 7 and the manual insertion registration roller pair 11 area stopped, since the trailing end of the preceding original P1 leaves the nip of the manual insertion registration roller pair 11, the original P1 is alone conveyed by the sheet discharging roller 12 and so on. The succeeding original P2 which was read is stopped on the platen 3 together with the further succeeding original P3 which is not yet read (refer to FIG. 14B).

At the same time when the belt motor 102 is stopped, a sheet discharging counter for counting clock signals from a sheet discharging clock is started (ejct5 in FIG. 23). After the set counting is finished (ejct6 in FIG. 23), the sheet discharging motor 104 is stopped (ejct7 in FIG. 23). As a result, the sheet discharging roller 12 and the manual insertion sheet feeding roller 13 are stopped. However, at this point, the original P1 has already passed through the original discharge path J and has left the sheet discharging roller 12 and has been discharged on the discharge tray 10.

[2-2] Large Size One-face Original Conveying Mode

Now, a function for conveying the large size one-face original will be explained briefly with reference to FIG. 24.

Figure 24:
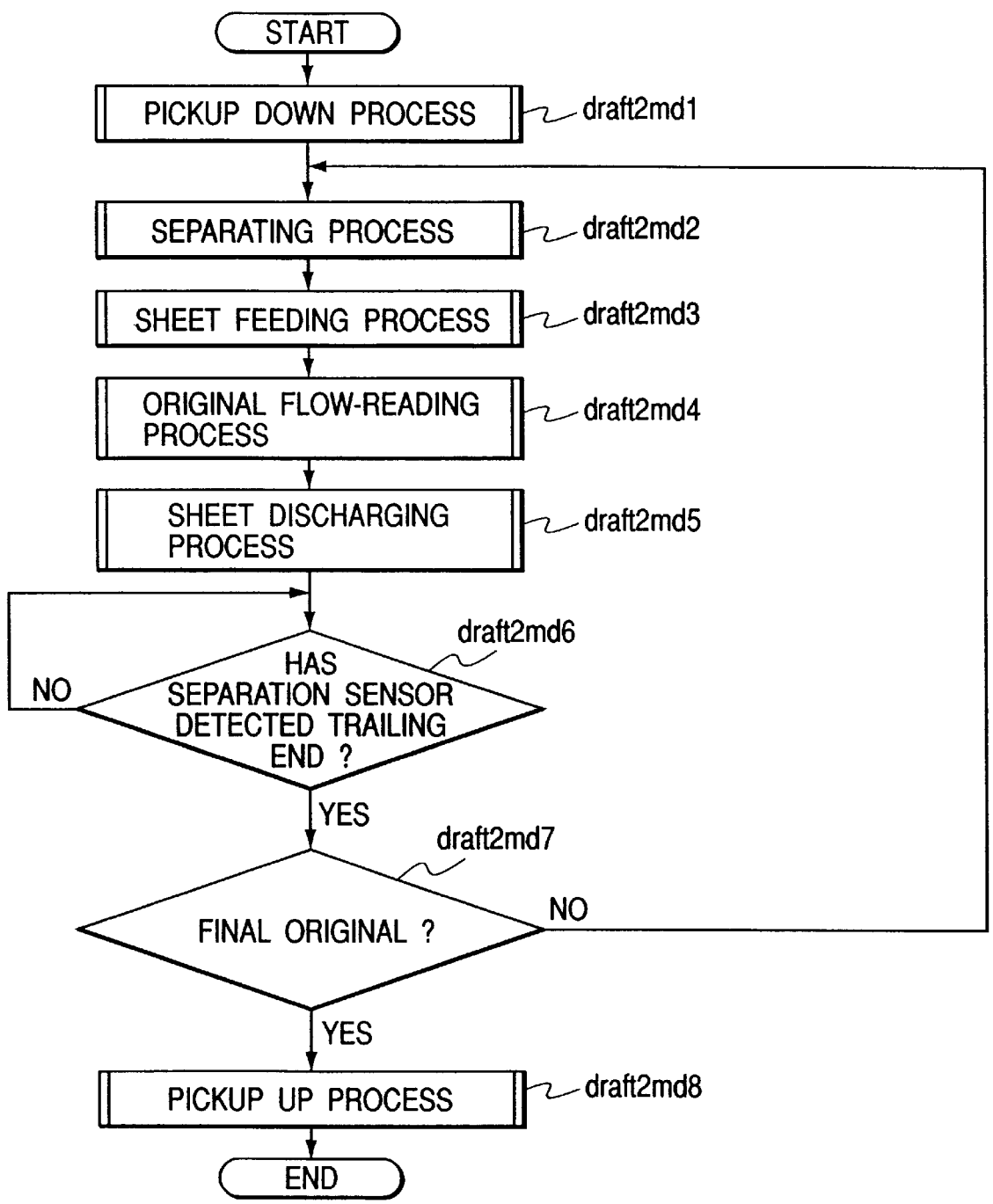
FIG. 24 is a flowchart schematically showing an operation when a one-face original having a large size is conveyed.

FIG. 24 is a flowchart schematically showing such a function.

When the large size one-face original is conveyed, the pickup DOWN process is firstly effected to lower the sheet feeding roller 5, thereby abutting the sheet feeding roller 5 against the original P1 (draft2md1 in FIG. 24).

Thereafter, the separating, process is executed to separate only the uppermost original P1 (draft2md2 in FIG. 24), and then, the sheet feeding process is executed (draft2md3 in FIG. 24.). Till now, the function is the same as that in the half size one-face original conveying mode.

When the original P1 is conveyed to the predetermined position on the platen 3, the original flow-reading process (flow-reading mode) is effected to read the image on the original while stopping the scanner 204 of the main body 1 at the third original end position R3 (draft2md4 in FIG. 24). Incidentally, since the third original end position R3 is located in the vicinity of the discharge tray 10, the original flow-reading process is effected in continuous with the sheet discharging process (draft2md5 in FIG. 24), and the read original P1 is discharged onto the discharge tray 10.

Thereafter, it is waiting for detection of the trailing end of the original by means of the separation sensor 30 (draft2md6 in FIG. 24). When the trailing end is detected, it is judged whether the original being conveyed is the final original or not, on the basis of the original set detecting sensor 40 (draft2md7 in FIG. 24).

If not the final original, the above-mentioned operations are repeated (draft2md2 to draft2md7 in FIG. 24). If the final original, the pickup UP process is executed to return the sheet feeding roller 5 to the upper limit position, and a series of processes are finished (draft2md8 in FIG. 24).

Next, the function effected when the large size one-face original is conveyed will be fully described with reference to FIGS. 25A, 25B, 26A and 26B.

FIGS. 25A, 25B, 26A and 26B are schematic views showing a flow of the original when the large size one-face original is conveyed.

The function from the pickup DOWN process to the sheet feeding process (draft2md1 to draft2md3 in FIG. 24) is the same as that in the half size one-face original conveying mode.

That is, to say, also in this mode, as is in the half size one-face original conveying mode, the path switching solenoid 107 is ON-controlled to close the surface-reverse feed path G and to open the original convey path C. The wide belt 7 is driven when the preceding original P1 is conveyed and the conveying speed of the wide belt 7 becomes equal to the conveying speed of the second feeding roller 9 before the preceding original P1 enters onto the platen 3. Accordingly, the preceding original P1 is conveyed to the platen 3 through the original convey path C by the two rollers 16, 9 and the wide belt 7 (refer to FIG. 25A).

Figure 25A:
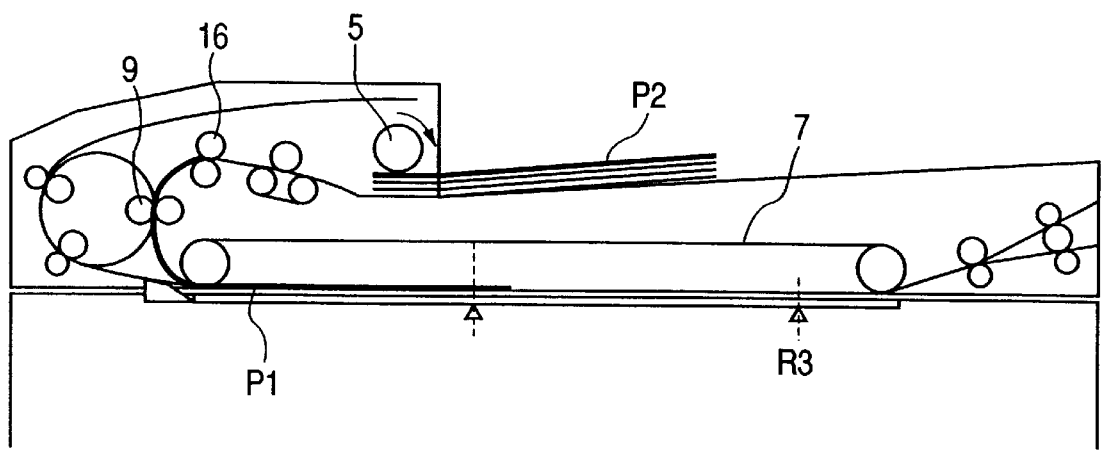
FIGS. 25A and 25B are schematic views showing a flow of an original when the one-face original having the large size is conveyed.
Figure 25B:
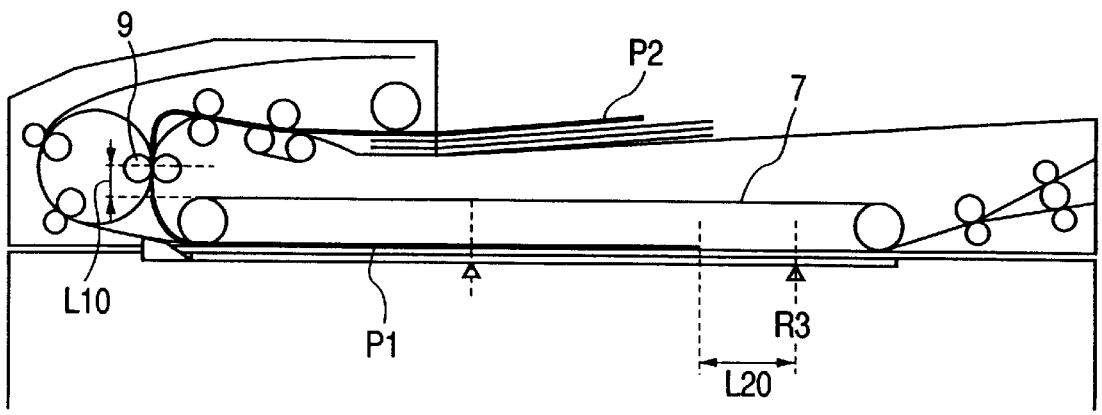

The rotation of the second feeding roller 9 is stopped when the trailing end of the preceding original P1 leaves the nip of the second feeding roller 9 (refer to FIG. 25B).

On the other hand, the sheet feeding roller 5 is retracted to the retraction position after the preceding original P1 is fed. However, when the trailing end of the preceding original P1 passes through the nip of the sheet feeding roller 5, the sheet feeding roller 5 is lowered again for preparing for the feeding of the succeeding original P2. When the trailing end of the preceding original P1 leaves the nip of the first feeding roller 16, the separating clutch 106 is turned ON to start the feeding of the succeeding original P2 effected by the sheet feeding roller 5.

As mentioned above, although the rotation of the second feeding roller 9 is stopped when the trailing end of the preceding original P1 leaves the nip of the second feeding roller 9, since the feeding of the succeeding original P2 is effected at a high speed by the sheet feeding roller 5, at the time when the rotation of the second feeding roller 9 is stopped, the leading end of the succeeding original P2 up to a position (where the sheet feeding sensor 35 is disposed) in the vicinity of the second feeding roller 9 at the upstream side thereof. When the leading end of the succeeding original P2 is detected by the sheet feeding sensor 35, the skew-feed correcting control is effected, as is in the preceding original P1.

On the other hand, the preceding original P1 has already entered into the original convey path D and is conveyed by the wide belt 7 alone, and then is temporarily stopped at a position spaced apart from the nip of the second feeding roller 9 and the sheet feeding sensor 35 by a predetermined distance (refer to FIG. 25B).

That is to say, when a distance between the trailing end of the preceding original P1 and the nip of the second feeding roller 9 is L10 and a length of the original P1 in the conveying direction is $L_{ph}$, the following relationship is satisfied:

$$L10=L3-L20-L_{ph}>0 \qquad \text{(Numerical Expression 3)}$$

Where L3 is a distance from the third original end position R3 to the nip of the second feeding roller 9 and L20 is a distance from the third original end position R3 to the leading end of the preceding original P1.

When the original P1 is temporarily stopped in this way, the control circuit 500 outputs the conveyance completion signal to the main body 1 and is waiting for receipt of the conveyance start signal from the main body 1.

When the skew-feed correcting control for the succeeding original P2 is finished and the control circuit 500 receives the conveyance start signal from the main body 1, the control circuit 500 drives the wide belt 7 to convey the preceding original P1 at the image forming speed.

Meanwhile, the second feeding roller 9 is kept stationary and the succeeding original P2 is waiting. When the distance (sheet-to-sheet distance) between the trailing end of the preceding original P1 and the leading end of the succeeding original P2 reaches a predetermined value, the second feeding roller 9 is driven to convey the succeeding original P2 at the same image forming speed as the preceding original P1. Incidentally, the driving and the conveying speed of the second feeding roller 9 are controlled so that the conveying speed of the wide belt 7 coincides with the conveying speed of the second feeding roller 9 at the time when the sheet-to-sheet distance becomes L11.

When the preceding original P1 reaches the third original end position R3, the control circuit 500 outputs the original end reach signal to the main body 1. In response to this signal, the main body 1 starts the image reading of the preceding original P1 (refer to FIG. 26A).

Figure 26A:
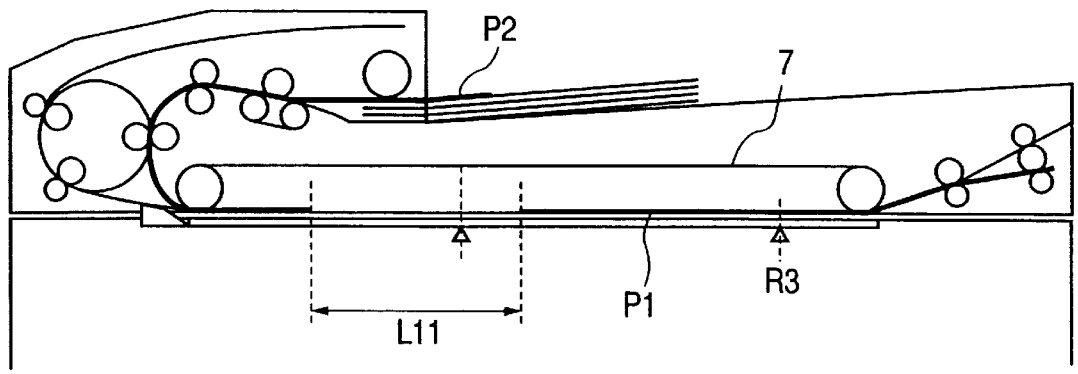
FIGS. 26A and 26B are schematic views showing a flow of an original when the one-face original having the large size is conveyed.
Figure 26B:
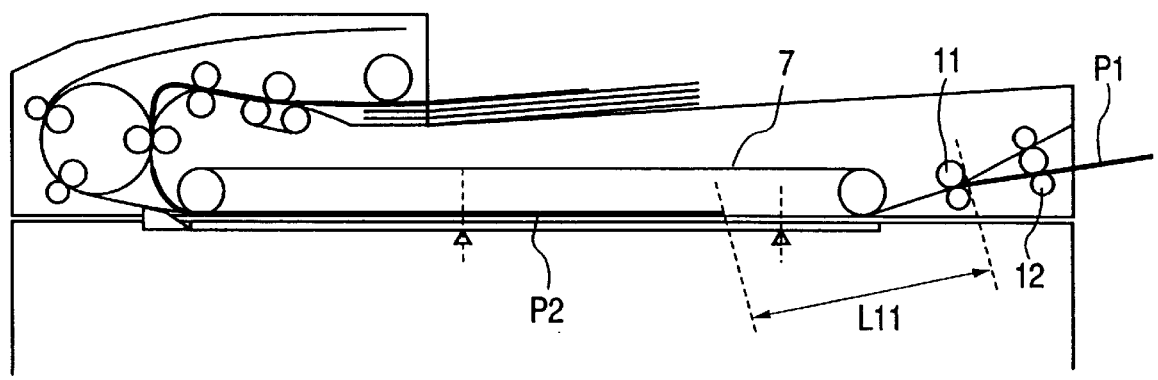

When the image reading of the preceding original P1 is finished, the wide belt 7 is driven by a predetermined time period and then is stopped, so that the succeeding original P2 is conveyed to a position shown in FIG. 26B and is stopped there. Since the sheet-to-sheet distance L11 is selected to be greater than the distance from the leading end of the succeeding original P2 to the hip of the manual insertion registration roller pair 11, at the time when the succeeding original P2 is stopped, the trailing end of the preceding original P1 has already left the nip of the manual insertion registration roller pair 11, and the original P1 is conveyed by the sheet discharge roller 12 alone and is discharged on the discharge tray 10.

[3] Both-face Original Conveying Mode

Next, a function performed in the both-face original conveying mode will be explained in connection with a half size both-face original conveying mode and a large size both-face original conveying mode

[3-1] Half size both-face original conveying mode.

Figure 27:
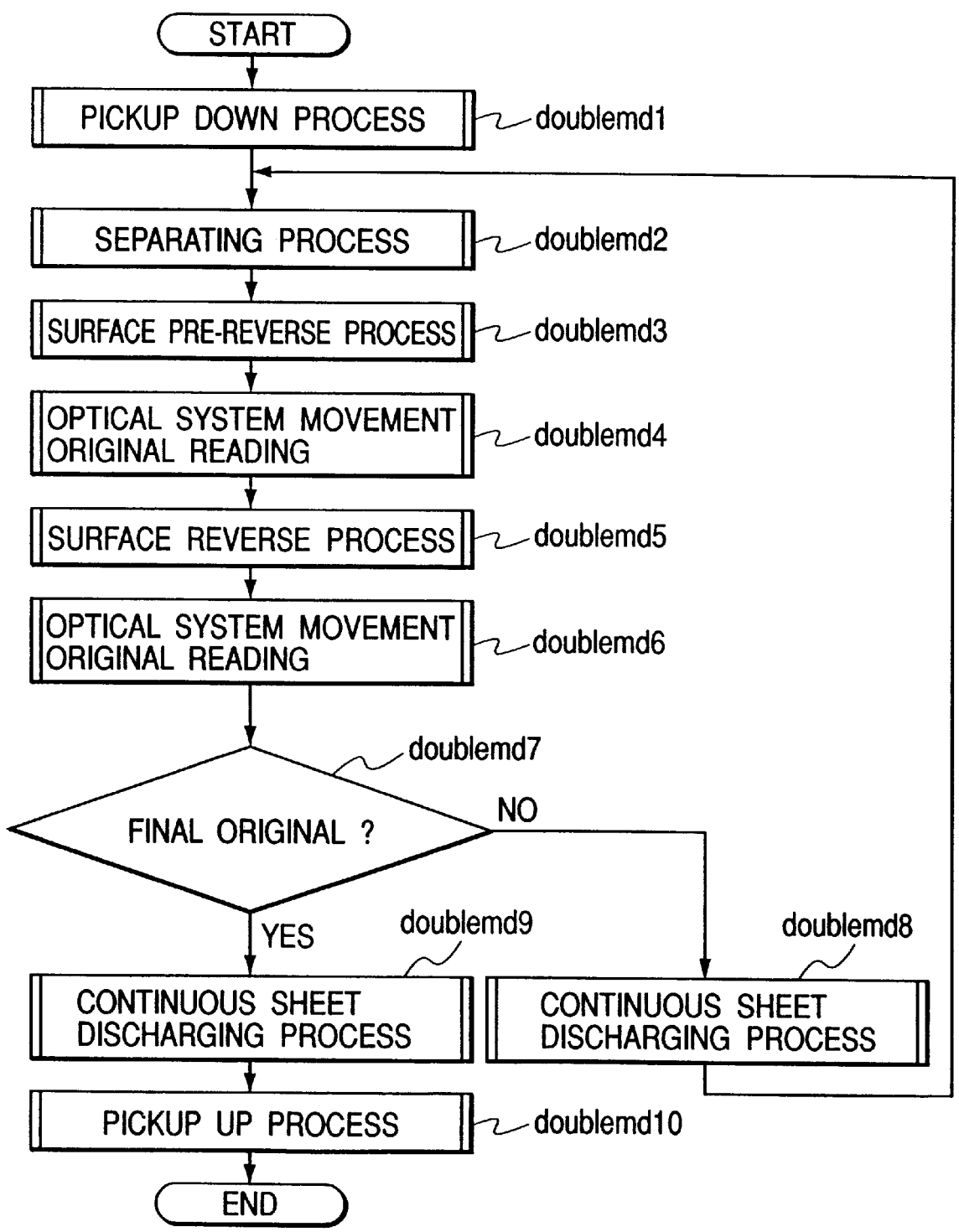
FIG. 27 is a flowchart schematically showing an operation when a both-face original having a half size is conveyed.
Figure 28A:
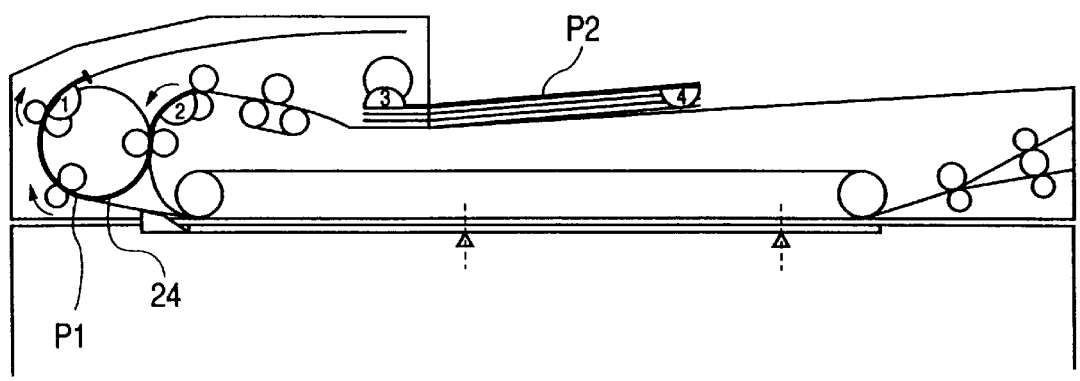
FIGS. 28A and 28B are schematic views showing a flow of an original when the both-face original having the half size is conveyed.
Figure 28B:
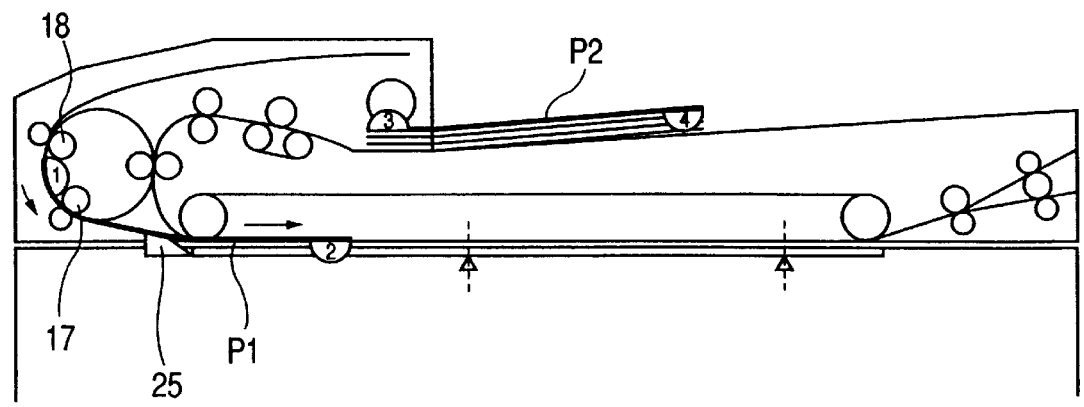
Figure 29A:
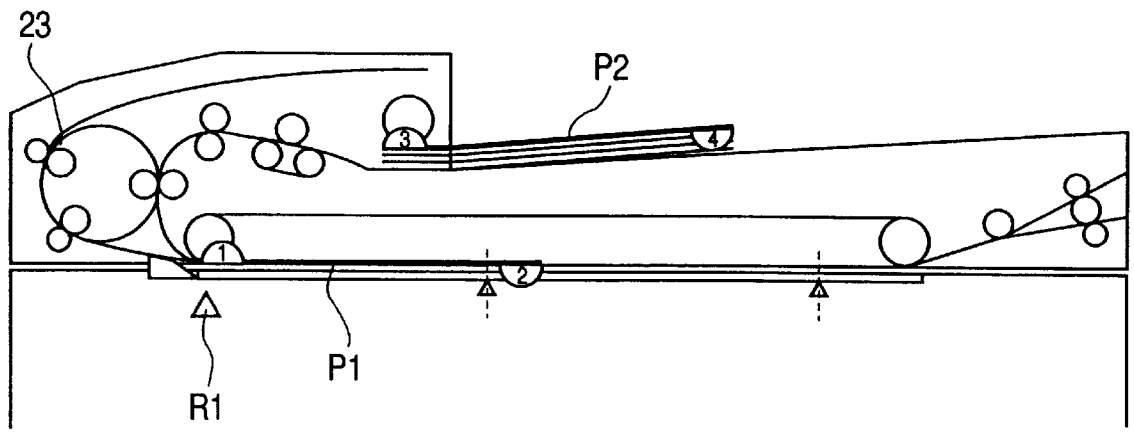
FIGS. 29A and 29B are schematic views showing a flow of an original when the both-face original having the half size is conveyed.
Figure 29B:
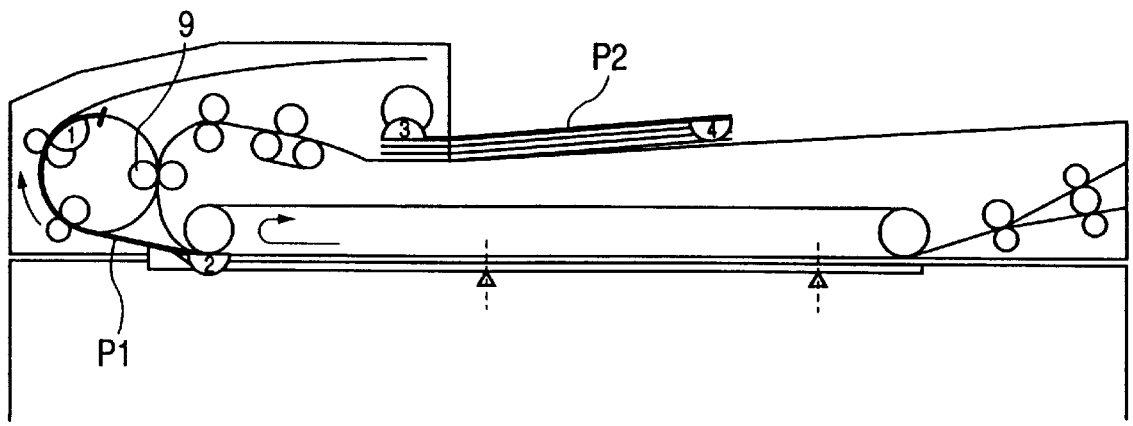

First of all, the function performed when the half size both-face original is conveyed will be described with reference to FIG. 27.

When the half size both-face original is conveyed, the pickup DOWN process is executed to lower the sheet feeding roller 5 to abut the sheet feeding roller 5 against the original P1 (doublemd1). Thereafter, the separating process is effected to separate only the uppermost original P1 and to feed the separated original P1 (doublemd2). Till now, the function is the same as that in the one-face original conveying mode.

Then, a surface pre-reverse process is effected to reverse a front surface and a rear surface of the original (doublemd3), and the surface-reversed original P1 is rested on the platen 3 with a second surface thereof facing downwardly (at the left end position). Then, the image reading is effected by moving the optical system (doublemd4) to read the image on the second surface while moving the scanner 204 of the main body 1.

When the original reading is finished, a surface reverse process is effected by utilizing the surface-reverse feeding/discharging path F, the surface-reverse feed path I and the original convey path C (doublemd5), and, thereafter, similar to the above, the scanner 204 is moved to effect the image reading of the first surface (doublemd6).

While such image reading is being effected, it is judged whether the original is the final original or not by the original set detecting sensor 40 (doublemd7). If not the final original, the sheet discharging process for discharging the original P1 onto the discharge tray 10 is effected (doublemd8), and the above-mentioned function is repeated (doublemd2 to doublemd7). On the other hand, if the final original, the sheet discharging process is effected (doublemd9) and the pickup UP process is executed to return the sheet feeding roller 5 to the upper limit position (doublemd10), and a series of processes are finished.

Next, the function for conveying the half size both-face original will be described with reference to FIGS. 28A and 28B to 32A and 32B.

Figure 30A:
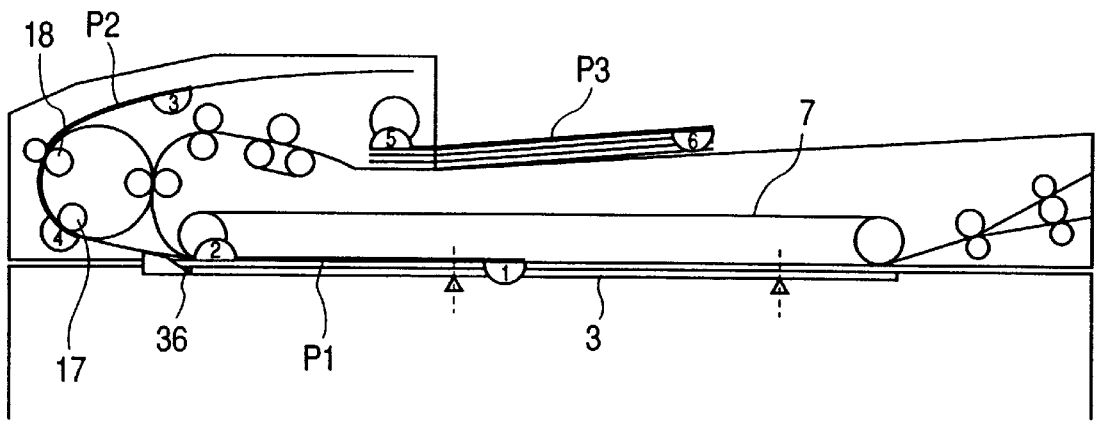
FIGS. 30A and 30B are schematic views showing a flow of an original when the both-face original having the half size is conveyed.
Figure 30B:
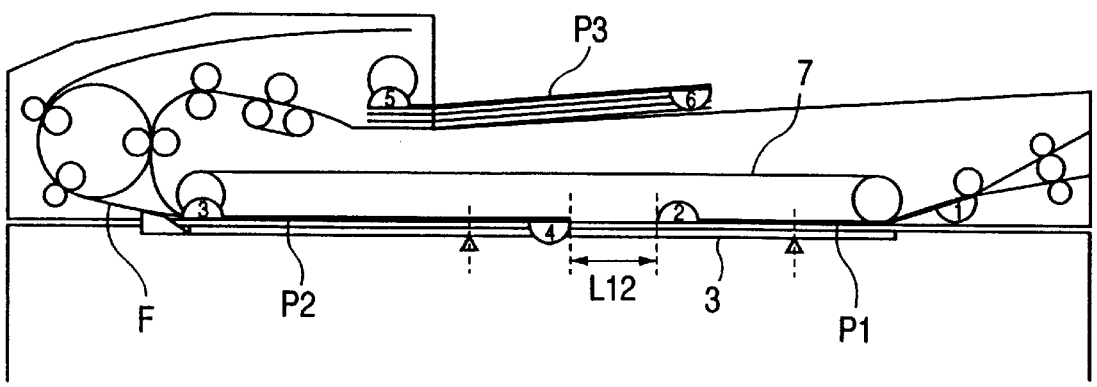
Figure 31A:
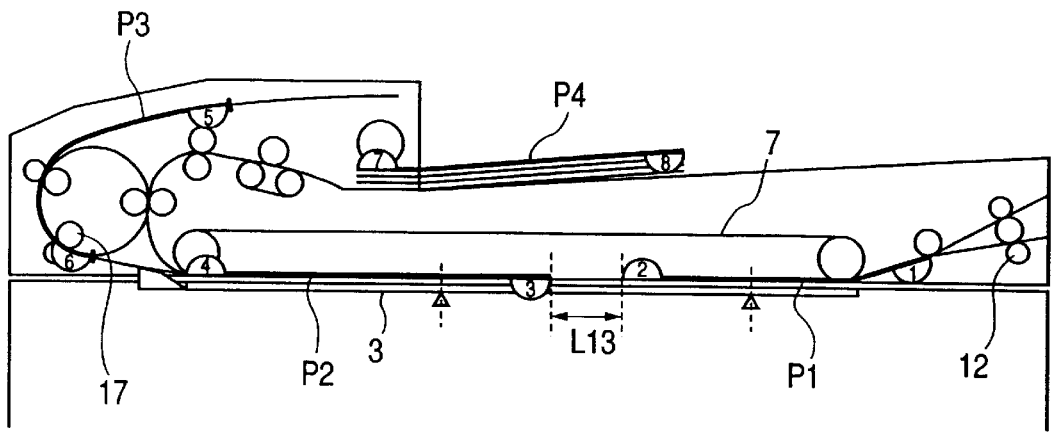
FIGS. 31A and 31B are schematic views showing a flow of an original when the both-face original having the half size is conveyed.
Figure 31B:
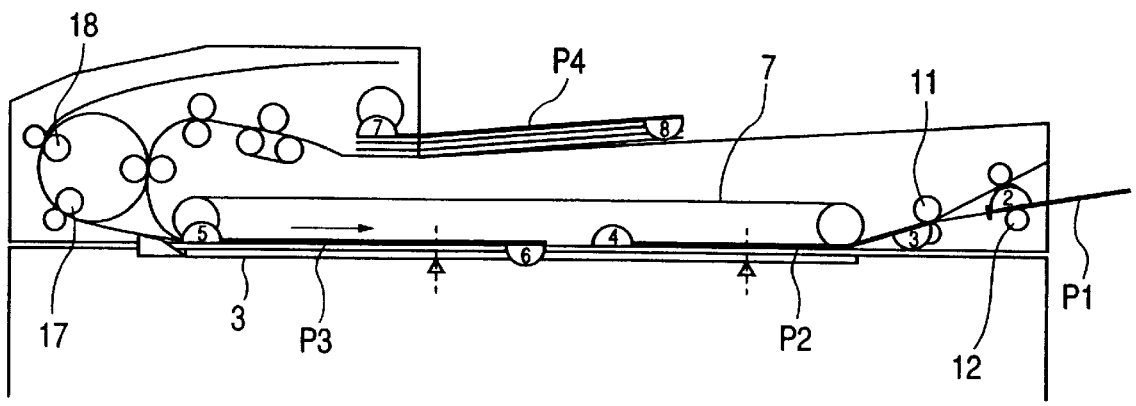
Figure 32B:
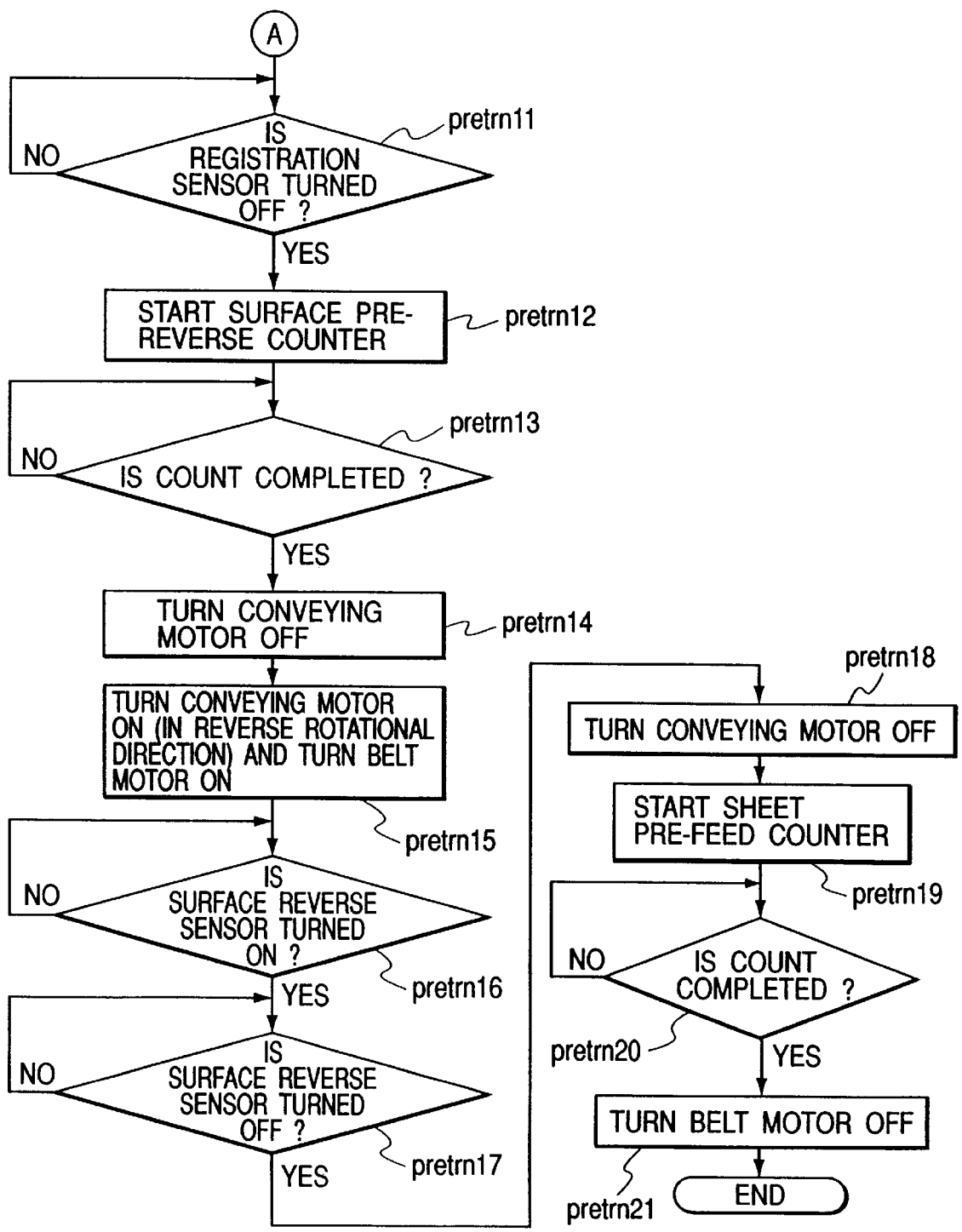
FIG. 32 which comprised of FIGS. 32A and 32B is a flowchart schematically showing an operation when the both-face original having the half size is conveyed.

FIGS. 28A and 28B to 31A and 31B are schematic views showing a flow of the original when the half size both-face original is conveyed, and FIGS. 32A and 32B is a flowchart showing a function effected when the half size both-face original is conveyed.

When the operator inputs the copying conditions on the operation portion and depresses the start key (copy key), the separating motor 100 and the conveying motor 101 are driven (pretrn1 in FIGS. 32A and 32B). As a result, the first feeding roller 16, the second feeding roller 9, the first surface-reversing roller 17 and the second surface-reversing roller 18 are rotated to perform the separating process and the skew-feed correcting process.

At the same time when the separating motor 100 is driven, the size check counter for counting the clock signals from the surface-reverse clock is started (pretrn2 in FIGS. 32A and 32B).

On the other hand, in this mode, the path switching solenoid 107 is in the OFF condition so that the surface-reverse sheet feeding flapper 22 is held at a solid line position in FIG. 43 to close the original convey path C and open the surface-reverse feed path E. Further, surface-reverse flapper solenoid 108 is in the OFF condition so that the surface-reverse flapper 23 is held at a solid line position in FIG. 43 to close the surface-reverse feed path I and open the surface-reverse feed path H. Accordingly, by rotating the second feeding roller 9, the original P1 the leading end of which abutted against the second feeding roller 9 is directed toward the surface-reverse feed paths E, G, H, thereby effecting a surface pre-reverse process (refer to FIG. 28A). By detecting the leading end of the original P1 by means of the registration sensor 39, it is ascertained whether the original P1 enters into the surface-reverse feed path E (pretrn3 in FIGS. 32A and 32B).

On the other hand, when the passage of the trailing end of the original is detected by the separation sensor 30 (pretrn4 in FIGS. 32A and 32B), a separation-off counter for counting the clock signals from the separation clock is started (pretrn5 in FIGS. 32A and 32B). When the counting corresponding to the distance from the first feeding roller 16 to the separation sensor 30 is finished (pretrn6 in FIGS. 32A and 32B), since the trailing end of the original leaves the first feeding roller 16, the separating motor 100 is turned OFF to stop the first feeding roller 16 (pretrn7 in FIGS. 32A and 32B).

When the passage of the trailing end of the original is detected by the sheet feeding sensor 35 (pretrn8 in FIGS. 32A and 32B), the size check counter is stopped (pretrn9 in FIGS. 32A and 32B), and, on the basis of the data from this counter, the size check process is executed (pretrn10 in FIGS. 32A and 32B).

When the passage of the trailing end of the original is detected by the registration sensor 39 (pretrn11 in FIGS. 32A and 32B), a surface pre-reverse counter for counting the clock signals from the surface-reverse exciting clock is started (pretrn12 in FIGS. 32A and 32B). At the time when the counting of the surface pre-reverse counter is finished (pretrn13 in FIGS. 32A and 32B), the conveying motor 101 is turned OFF (pretrn14 in FIGS. 32A and 32B). As a result, the original P1 is stopped at a predetermined position where the trailing end thereof leaves the surface-reverse feed path E.

When a predetermined time period is elapse after the conveying motor 101 was turned OFF, the conveying motor 101 is rotated in the reverse direction to rotate the first and second surface-reversing rollers 17, 18 in the reverse directions, and the belt motor 102 is driven to rotate the wide belt 7 in the normal direction (pretrn15 in FIGS. 32A and 32B). As a result, the original P1 is directed into the original convey path D through the surface-reverse feeding/discharging path F (refer to FIG. 28B).

In the case where the original P1 is conveyed from the original convey path B toward the surface-reverse feed paths E, G, H, when the trailing end of the original P1 passes by the one-way flapper 24, the sheet discharging flapper 25 is shifted to a solid line position in FIG. 43. Accordingly, when the surface pre-reversed original P1 conveyed into the original convey path D through the surface-reverse feeding/discharging path F, the leading end of the original P1 is prevented from striking against the end of the platen 3. The conveying speeds of the first surface-reversing roller 17 and the like and the wide belt 7 are controlled to be equal to each other, except for special cases.

On the basis of the detection of the passage of the leading end of the original by the surface-reverse sensor 38, it is ascertained that the original P1 was conveyed to the surface-reverse feeding/discharging path F (pretrn16 in FIGS. 32A and 32B), and, when the passage of the trailing end of the original is detected by the surface-reverse sensor 38 (pretrn17 in FIGS. 32A and 32B), the conveying motor 101 is stopped (pretrn18 in FIGS. 32A and 32B).

In response to the detection signal from the surface-reverse sensor 38 (signal representative of detection of the trailing end of the original), a sheet pre-feeding counter for counting the clock signals from the belt exciting clock is started (pretrn19 in FIGS. 32A and 32B). At the time when the counting of the sheet pre-feeding counter is finished (pretrn20 in FIGS. 32A and 32B), the belt motor 102 is stopped (pretrn21 in FIGS. 32A and 32B). As a result, the wide belt 7 is stopped and the original P1 is stopped at a predetermined position on the platen 3 with a second surface thereof facing downwardly (refer to FIG. 29A).

In this condition, the scanning of the scanner 204 of the main body 1 is effected to read the image on the second surface of the original P1.

When the image reading of the second surface of the original P1 is finished, the surface-reverse process for the original is effected. Now, the surface-reverse process will be described with reference to FIG. 33.

As mentioned above, although the surface-reverse flapper 23 is held at a solid line position in FIG. 43 to close the surface-reverse feed path I and open the surface-reverse feed path H, when the surface-reverse process is executed, the surface-reverse flapper solenoid 108 is turned ON (trn1 in FIG. 33) to switch the surface-reverse flapper 23 to a two dot and chain line position in FIG. 43, thereby opening the surface-reverse feed path I and closing the surface-reverse feed path H.

Further, the path switching solenoid 107 is turned ON (trn1 in FIG. 33) to hold the surface-reverse sheet feeding flapper 22 at a two dot, and chain line position in FIG. 43, thereby opening the original convey path C and closing the surface-reverse feed path E, and the feeding/discharging flapper 25 is held at a two dot and chain line position in FIG. 43.

Then, the belt motor 102 is driven to rotate the wide belt 7 in the clockwise direction (trn2 in FIG. 33) to convey the original P1 from the reading position to the surface-reverse feeding/discharging path F. Further, the conveying motor 101 is driven to rotate the second feeding roller 9, the first surface-reversing roller 17 and the second surface-reversing roller 18 in the clockwise directions (trn2 in FIG. 33) to convey the original P1 along the surface-reverse feed paths G, I and the original convey path C (refer to FIG. 29B).

Figure 33:
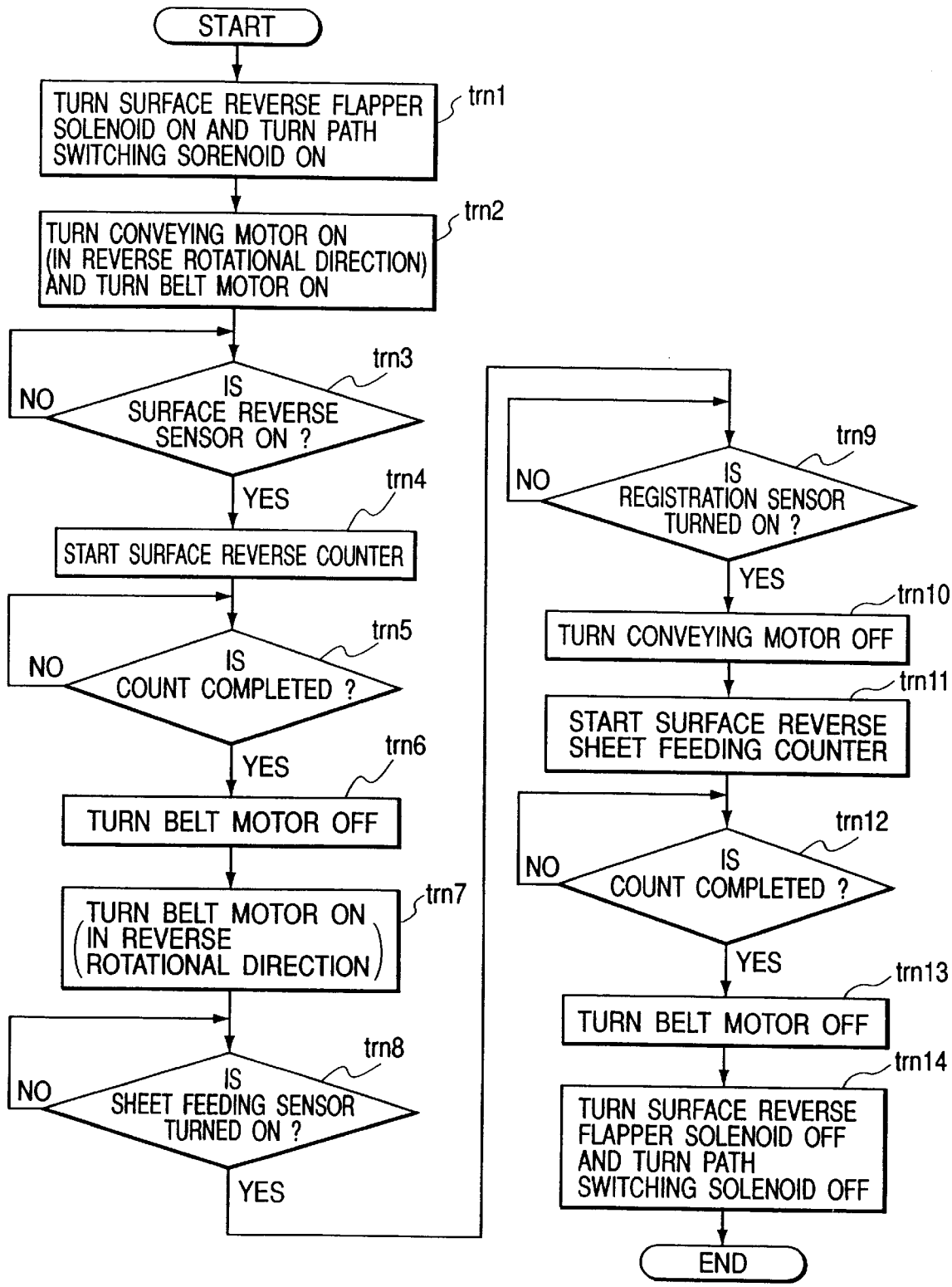
FIG. 33 is a flowchart for explaining a surface reversing process in a both-face original conveying mode.

When the original P1 on the platen 3 is discharged into the surface-reverse feeding/discharging path F, the leading end of the original is detected by the surface-reverse sensor 38 (trn3 in FIG. 33). Simultaneously, a surface-reverse counter for counting the clock signals from the belt exciting clock is started (trn4 in FIG. 33). When the counting of this counter is finished, the belt motor 102 is turned OFF (trn5, trn6 in FIG. 33). And, after a predetermined time period is elapsed, the belt motor is rotated in an anti-clockwise direction (trn7 in FIG. 33). Accordingly, the original P1 which has been conveyed to the original convey path C is directed to the original convey path D by the wide belt 7. Incidentally, such stopping and reverse rotation of the wide belt 7 are performed while the original P1 is being conveyed by the first and second surface-reversing rollers 17, 18. Accordingly, the original P1 is conveyed to the reading position in the original convey path D without stoppage. The conveying speed of the wide belt 7 is controlled so that it coincides with the conveying speed of the second feeding roller 9 till the leading end of the original P1 enters into the original convey path D.

On the basis of the detection of the passage of the leading end of the original P1 by the sheet feeding sensor 35, it is ascertained that the original P1 is conveyed into the surface-reverse feed path I (trn8 in FIG. 33). When the passage of the trailing end of the original is detected by the registration sensor 39 (trn9 in FIG. 33), the conveying motor 101 is turned OFF (trn10 in FIG. 33). As a result, when the trailing end of the preceding original P1 leaves the nip of the second feeding roller 9, the second feeding roller 9 is stopped. Accordingly, the preceding original P1 entered into the original convey path D is conveyed by the wide belt 7 alone.

At the same time when the trailing end of the original is detected by the sheet feeding sensor 35, a surface-reverse sheet feeding counter for counting the clock signal from the belt exciting clock is started (trn11 in FIG. 33). At the time when the counting of the surface-reverse sheet feeding counter is finished (trn12 in FIG. 33), the belt motor 102 is turned OFF (trn13 in FIG. 33). As a result, the wide belt 7 is stopped to stop the original P1 at a predetermined position on the platen 3.

In this position, the scanning of the scanner 204 of the main body 1 is effected to read the image on the first surface of the original P1.

Thereafter, the surface-reverse flapper solenoid 108 is turned OFF to switch the surface-reverse flapper 23 to a solid line position in FIG. 43. And, the path switching solenoid 107 is turned OFF to switch the surface-reverse sheet feeding flapper 22 and the feeding/discharging flapper 25 to solid line positions in FIG. 43 (trn14 in FIG. 33).

In the surface-reverse process, since the wide belt 7 is reversed in the forward direction (trn7 in FIG. 33), although the original P1 is pulled in opposite directions by the first surface-reversing roller 17 and the wide belt 7, because a force of the nip of the first surface-reversing roller 17 is greater than a force of the wide belt 7, the original P1 is conveyed by the first surface-reversing roller 17. However, in case of the large size original (having greater length in the conveying direction), the conveying force of the wide belt 7 may be greater than the force of the nip of the first surface-reversing roller 17 to prevent smooth conveyance of the original. Accordingly, in such a case, the wide belt 7 is rotated in the opposite direction at a timing based on the detection result of the original trailing end detecting sensor 41.

After or before the trailing end of the preceding original P1 is detected by the sheet feeding sensor 35, the sheet feeding roller 5 and the separating portion S are driven to separate the succeeding original P2 from the original tray 4, and the skew-feed of the original P2 is corrected by the second feeding roller 9. Then, the second feeding roller 9, the first surface-reversing roller 17 and the second surface-reversing roller 18 are driven to effect the surface pre-reverse process for the succeeding original P2 (refer to FIG. 30A). While the image of the preceding original P1 is being read, the surface pre-reverse process of the succeeding original P2 has been finished so that the succeeding original P2 is waiting in a condition that the leading end thereof is held in the nip of the first surface-reversing roller 17.

When the image reading of the preceding original P1 is finished, the reverse rotations of the first and second surface-reverse rollers 17, 18 and the normal rotation of the wide belt 7 are started so that the preceding original P1 and the succeeding original P2 are rested on the platen 3 with a predetermined sheet-to-sheet distance L12 therebetween (refer to FIG. 30B).

In this condition, the scanning of the scanner 204 of the main body 1 is effected to read the image on the second surface of the succeeding original P2.

When the image reading is finished in the same manner as the preceding original P1, the surface-reverse process for the succeeding original P2 is started to discharge the succeeding original P2 into the surface-reverse feeding/discharging path F. Incidentally, during this surface-reverse process, although the preceding original P1 is conveyed toward the surface-reverse feeding/discharging path F, since the sheet-to-sheet distance L12 is selected to the proper value, the preceding original P1 is still rested on the platen 3 without being discharged into the surface-reverse feeding/discharging path F.

Thereafter, the wide belt 17 is rotated in the reverse direction to direct the succeeding original P2 into the original convey path D through the surface-reverse feeding/discharging path F, the surface-reverse feed path G, the surface-reverse feed path I and the original convey path C.

The wide belt 7 is stopped in a condition shown in FIG. 31A. In this condition, the image on the first surface of the succeeding original P2 is read. In this case, the sheet-to-sheet distance between the original P1 and the original P2 becomes L13. The further succeeding original P3 was supplied from the original tray 4 and is waiting in a condition that it is held in the nip of the first surface-reversing roller 17.

When the image reading of the first surface of the succeeding original P2 is finished, the reverse rotations of the first and second surface-reversing rollers 17, 18, the forward rotation of the wide belt 7 and the rotation of the sheet discharging roller 12 are started so that the succeeding originals P3, P2 and the preceding original P1 are conveyed toward the discharge tray 10 simultaneously.

At the time when the further succeeding original P3 is rested on the platen 3, the wide belt 7 is stopped, and the image reading of the succeeding original P3 is effected (refer to FIG. 31B). At this point, since the trailing end off the preceding original P1 leaves the nip of the manual insertion registration roller pair 11, the preceding original P1 is alone conveyed by the sheet discharge roller 12 and so on to be discharged onto the discharge tray 10.

When a plurality of originals are subjected to the image reading, the above-mentioned function is repeated. At the time when the final image reading (image reading of the first surface of the final original $P_n$) finished, only two originals (final original $P_n$ and last but one original $P_{n-1}$) are rested on the platen 3. These originals $P_n$, $P_{n-1}$ are successively discharged onto the discharge tray 10 by the wide belt 7.

[3-2] Large Size Both-face Original Conveying Mode

Next, the function for conveying the large size both-face original will be described with reference to FIGS. 34A and 34B to 37.

FIGS. 34A and 34B to 37 are schematic views showing a flow of the original when the large size both-face original is conveyed.

Also in this mode, as is in the half size original, the surface-reverse sheet feeding flapper 22 is held at the solid line position in FIG. 43 to close the original convey path C and open the surface-reverse feed path E, and the surface-reverse flapper 23 is held at the solid line position in FIG. 43 to close the surface-reverse feed path I and-open the surface-reverse feed path H.

When the operator inputs the copying conditions on the operation portion and depresses the start key (copy key), as is in the half size original, the separating motor 100 and the conveying motor 101 are driven to execute the separating process and the skew-feed correcting process.

Figure 34A:
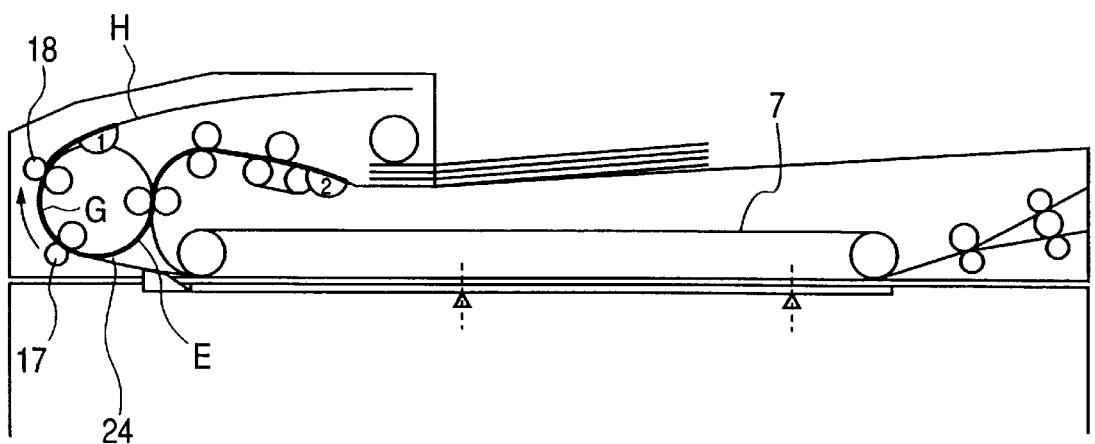
FIGS. 34A and 34B are schematic views showing a flow of an original when the both-face original having a large size is conveyed.
Figure 34B:
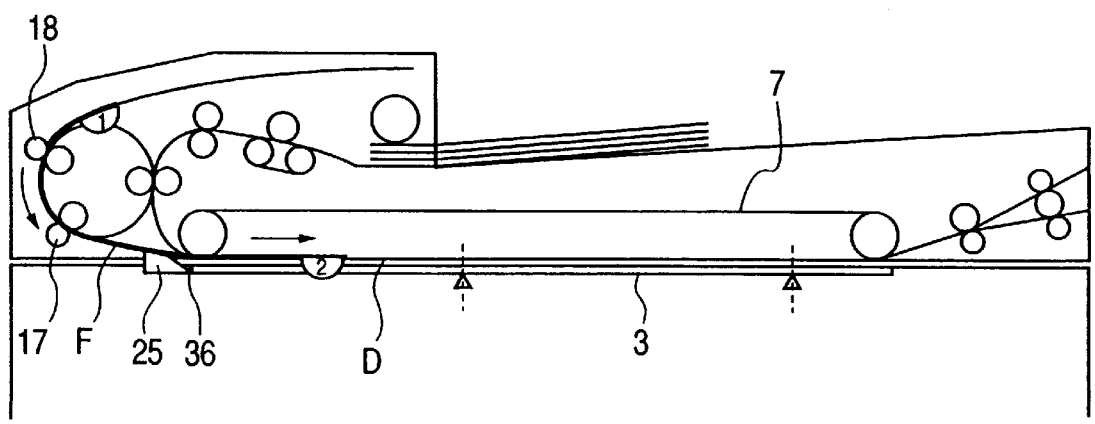

The original P1 is directed toward the surface-reverse feed paths E, G, H and the surface pre-reverse process is effected (refer to FIG. 34A). By stopping the conveying motor 101, the original P1 is stopped at a predetermined position where the trailing end of the original has already left the surface-reverse feed path E.

Then, when a predetermined time period is elapsed after the conveying motor 101 was stopped, the motor 101 is driven in the reverse direction to rotate the first and second surface-reversing rollers 17, 18 in the reverse directions, and the belt motor 102 is driven to rotate the wide belt 7 in the forward direction. As a result, the original P1 is directed to the original convey path D on the platen 3 through the surface-reverse feeding/discharging path F (refer to FIG. 34B). In this case, since the feeding/discharging flapper 25 is moved to the solid line position in FIG. 43, the leading end of the original P1 is prevented from striking against the end of the platen 3. The conveying speeds of the first surface-reversing roller 17 and so on and the wide belt 7 are controlled to be equal to each other, except for special cases.

Figure 35A:
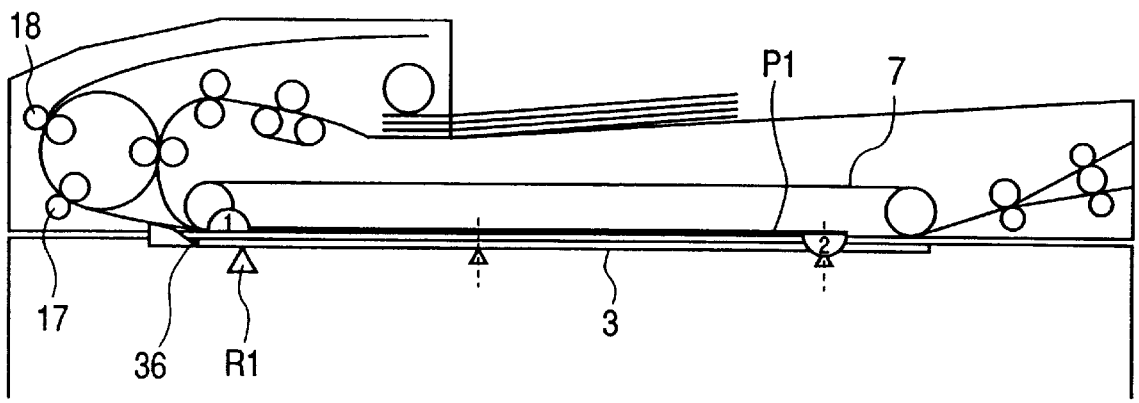
FIGS. 35A and 35B are schematic views showing a flow of an original when the both-face original having a large size is conveyed.
Figure 35B:
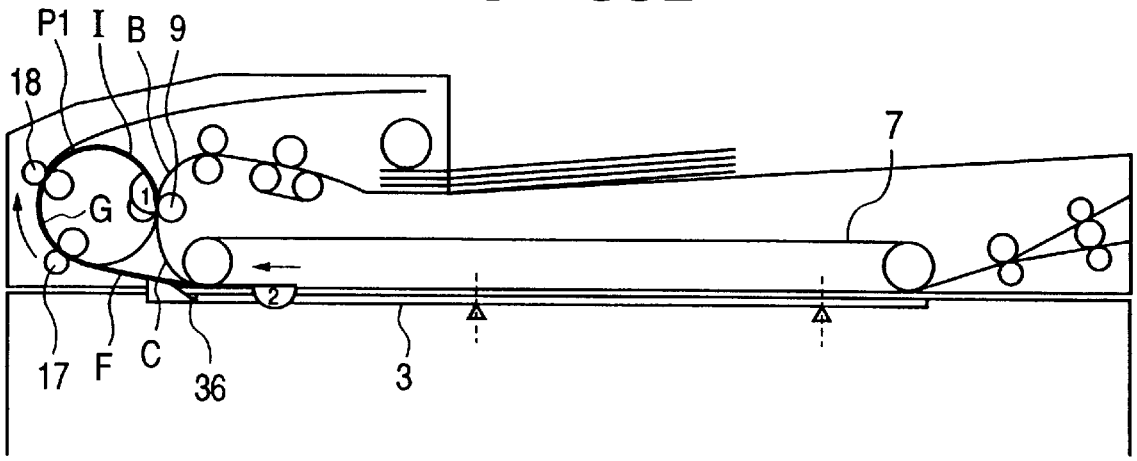
Figure 36A:
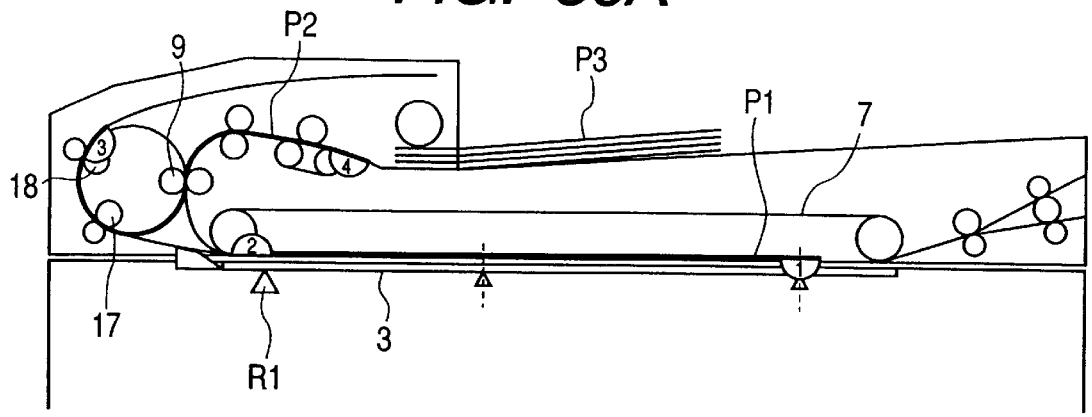
FIGS. 36A and 36B are schematic views showing a flow of an original when the both-face original having a large size is conveyed.
Figure 36B:
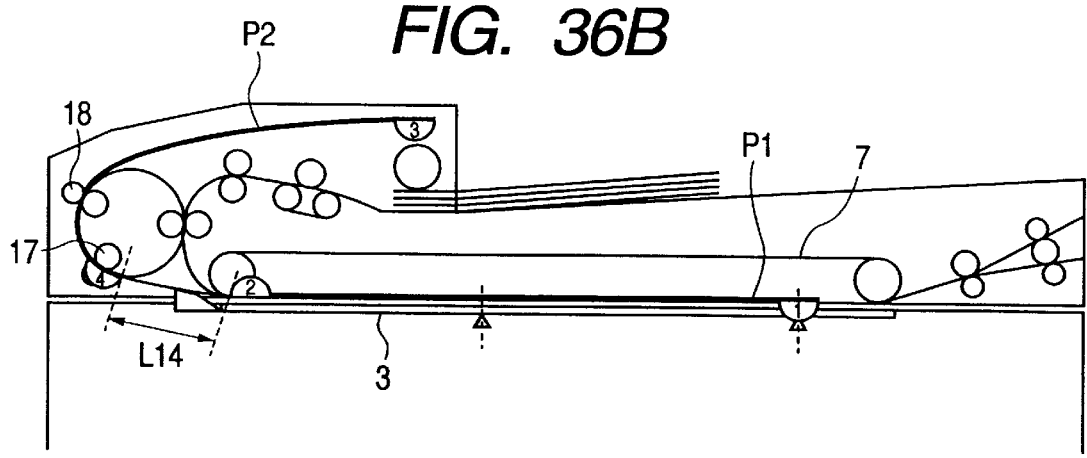

When the trailing end of the original P1 is detected by the surface-reverse sensor 38, after a predetermined time period is elapsed, the wide belt 7 is stopped, and the original P1 is rested at the original end position for the fixed-reading mode (refer to FIG. 35A).

In this condition, by scanning the scanner 2–4 of the main body 1, the image on the second surface of the original P1 is read.

When the image reading of the second surface of the original P1 is finished, the original surface-reverse process is executed.

That is to say, the surface-reverse flapper 23 is switched to the two dot and chain position in FIG. 43 to open the surface-reverse feed path I and close the surface-reverse feed path H, and the surface-reverse sheet feeding flapper 22 is held at the two dot and chain position in FIG. 43 to open the original convey path C and close the surface-reverse feed path E. The feeding/discharging flapper 25 is held at the two dot and chain position in FIG. 43.

On the other hand, when the above-mentioned image reading is finished, the belt motor 102 and the conveying motor 101 are driven to rotate the wide belt 7, the second feeding roller 9 and the first and second surface-reversing rollers 17, 18 in the reverse direction. As a result, the original P1 is conveyed through the surface-reverse feeding/discharging path F→the surface-reverse feed paths G to I→the original convey path C (refer to FIG. 35B). Thereafter, the original P1 is directed into the original convey path D through the original convey path C.

When the original P1 on the platen 3 is discharged into the surface-reverse feeding/discharging path F, the leading end of the original is detected by the surface-reverse sensor 38. When a predetermined time period is elapsed after such detection, the wide belt 7 is stopped, and, thereafter, the wide belt 7 is rotated in the forward direction. Accordingly, the original P1 conveyed up to the original convey path C is directed into the original convey path by the wide belt 7. The conveying speed of the wide belt 7 is controlled to become equal to the conveying speed of the second feeding roller 9 before the leading end of the original P1 enters into the original convey path D.

The rotation of the second feeding roller 9 is stopped when the trailing end of the preceding original P1 leaves the nip of the second feeding roller 9.

The preceding original P1, entered to the original convey path D is conveyed by the wide belt 7 alone. When the original is conveyed by a predetermined distance after the trailing end of the original was detected by the sheet feeding sensor 35, the wide belt 7 is stopped. As a result, the preceding original P1 is stopped at the predetermined position (original end position in the fixed-reading mode) on the platen 3 with the first surface thereof facing downwardly.

At this position, by scanning the scanner 204 of the main body 1, the image on the first surface of the original P1 is read.

Before or after the trailing end of the preceding original P1 is detected by the sheet feeding sensor 35, the sheet feeding roller 5 and the separating portion S are driven to supply and separate the succeeding original P2 from the original tray 4, and the skew-feed correction of this original is effected by the second feeding roller 9. The second feeding roller 9 and the first and second surface-reversing rollers 17, 18 are driven to execute the surface pre-reverse process for the succeeding original P2 (refer to FIG. 36A). While the image reading of the preceding original P1 is being performed, the surface pre-reverse process for the succeeding original P2 is completed and is waiting in a condition that the leading end thereof is held in the nip of the first surface-reversing roller 17 (refer to FIG. 36B). In this case, a sheet-to-sheet distance between the preceding original P1 and the waiting succeeding original P2 is controlled to become L14.

Figure 37:
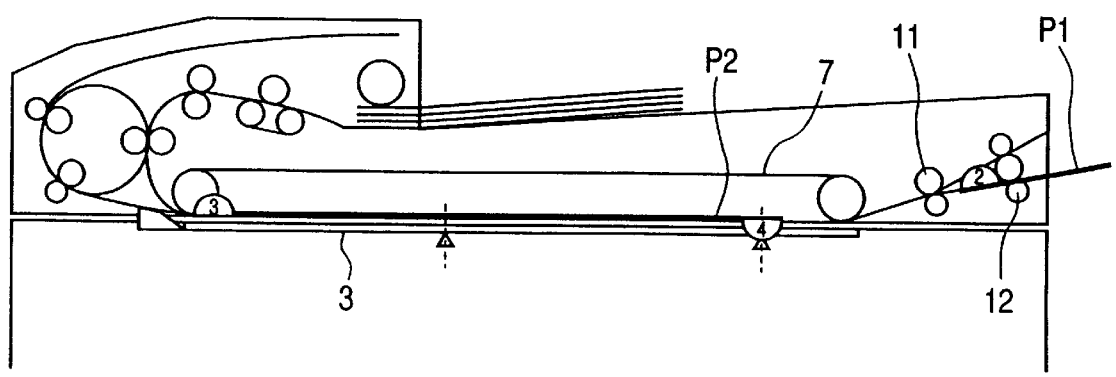
FIG. 37 is a schematic view showing a flow of an original when the both-face original having a large size is conveyed.

When the image reading of the preceding original P1 is finished, the reverse rotations of the first and second surface-reversing rollers 17, 18 and the forward rotation of the wide belt 7 are started to convey the succeeding original P2 onto the platen 3 and stop the original at that position (refer to FIG. 37). In this case, the trailing end of the preceding original P1 leaves the nip of the manual insertion registration roller pair 11.

In this condition, by scanning the scanner 204 of the main body 1, the image on the second surface of the succeeding original P2 is read.

Thereafter, the same functions are repeated up to the final original $P_n$.

[4] Manual Insertion Mode

Next, the function in the manual insertion mode will be described with reference to FIGS. 38 to 41.

Figure 38:
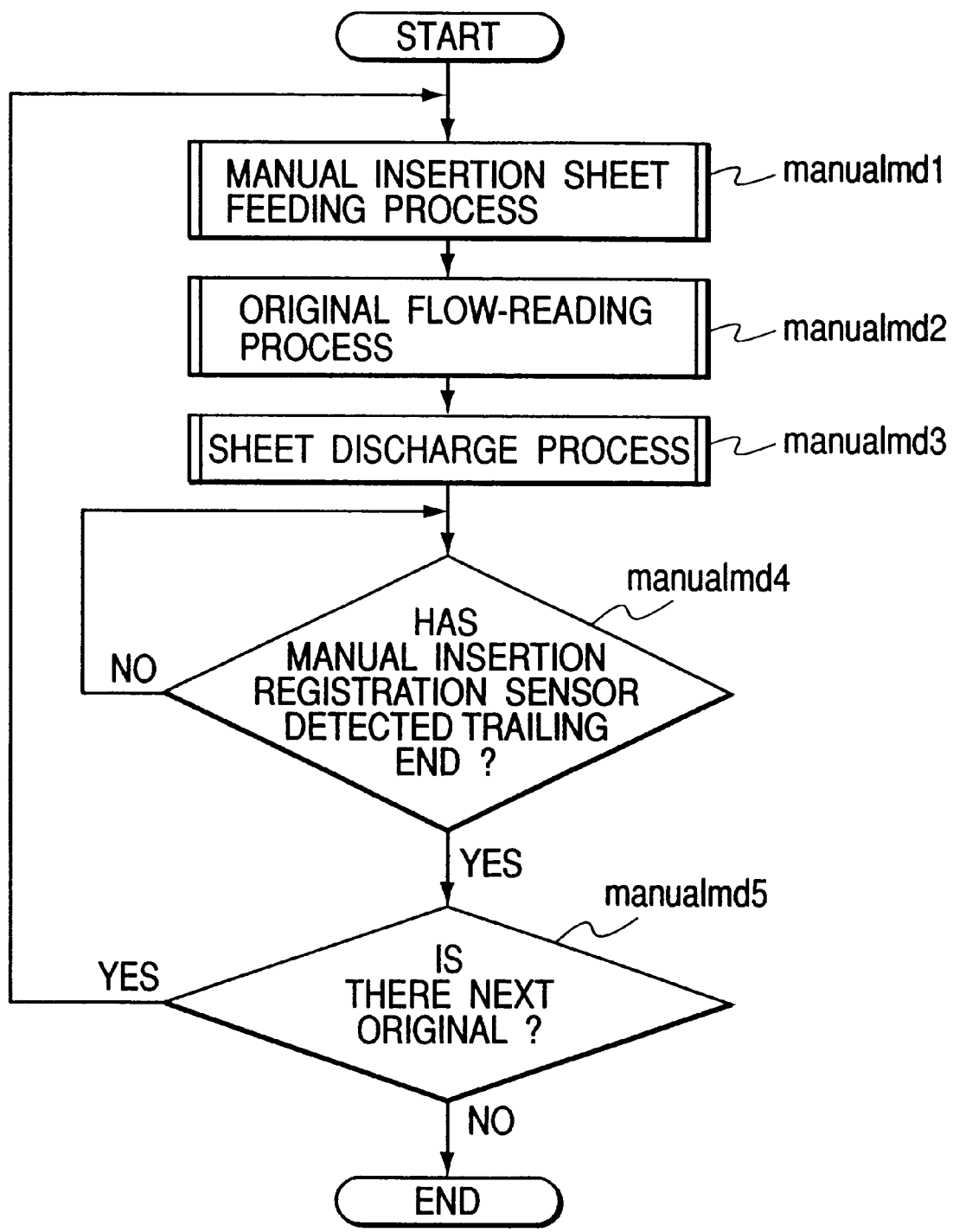
FIG. 38 is a flowchart schematically showing an operation in a manual insertion mode.

First of all, such a function will be briefly explained with reference to FIGS. 38 to 40A and 40B. FIG. 38 is a flowchart schematically showing the function in the manual insertion mode, and FIGS. 39A, 39B, 40A and 40B are schematic views showing a flow of the original when the manually-inserted original is conveyed.

Figure 39A:
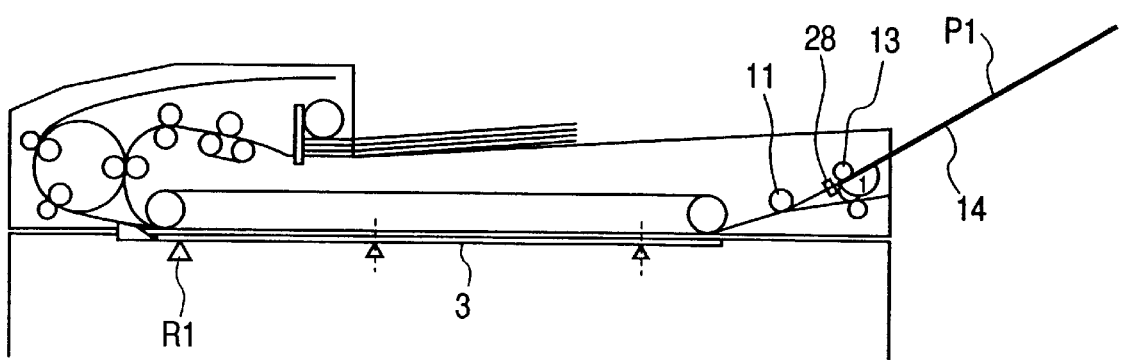
FIGS. 39A and 39B are schematic views showing a flow of an original when a manual insertion original is conveyed.
Figure 39B:
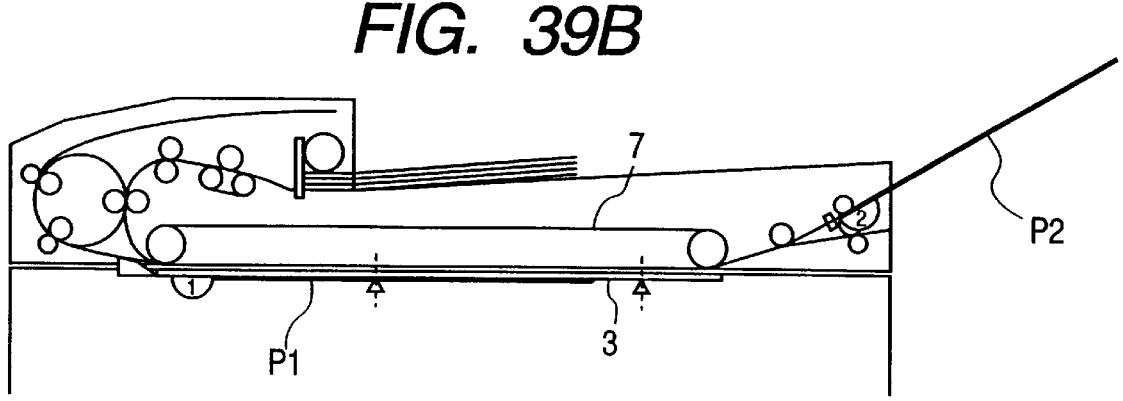
Figure 40A:
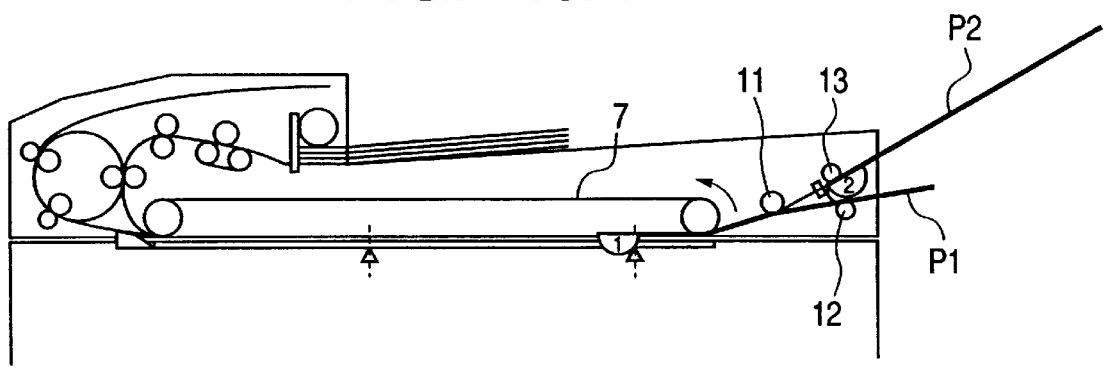
FIGS. 40A and 40B are schematic views showing a flow of an original when a manual insertion original is conveyed.
Figure 40B:
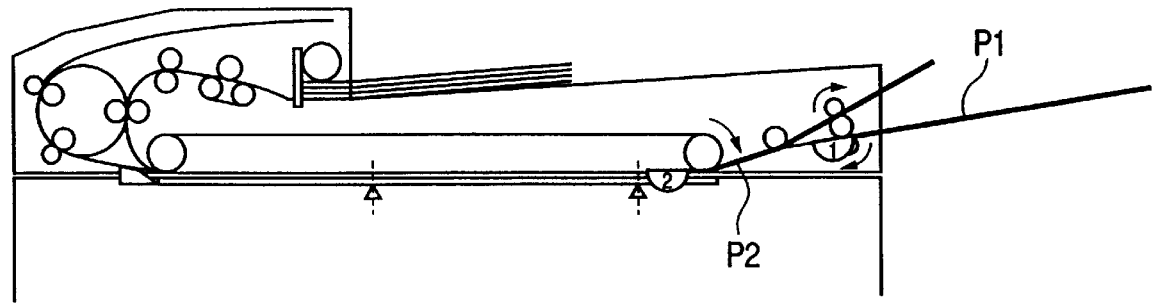

When the original is set on the manual insertion original tray 14 (refer to FIG. 39A), a manual insertion sheet feeding process (described later fully) is started (manualmd1 in FIG. 318) to convey the set original to a predetermined position on the platen 3 (refer to FIG. 39B).

Thereafter, by scanning the scanner 204, the original image reading process is effected (manualmd2 in FIG. 38). When this process is finished, a sheet discharging process (described later fully) is started to discharge the original onto the discharge tray 10 (manualmd3 in FIG. 38; refer to FIG. 40A).

Thereafter, it is waiting for detection of the trailing end of the original by the manual insertion registration sensor 34 (manualmrd4 in FIG. 38). When such detection is effected, presence or absence of a next original is detected by the manually-inserted-original detecting sensor 370 (manualmd5 in FIG. 38). If there is the next original, the above-mentioned function is repeated (manualmd1 to manualmd5 in FIG. 38). If there is no next original, a series of processes are finished.

Figure 41:
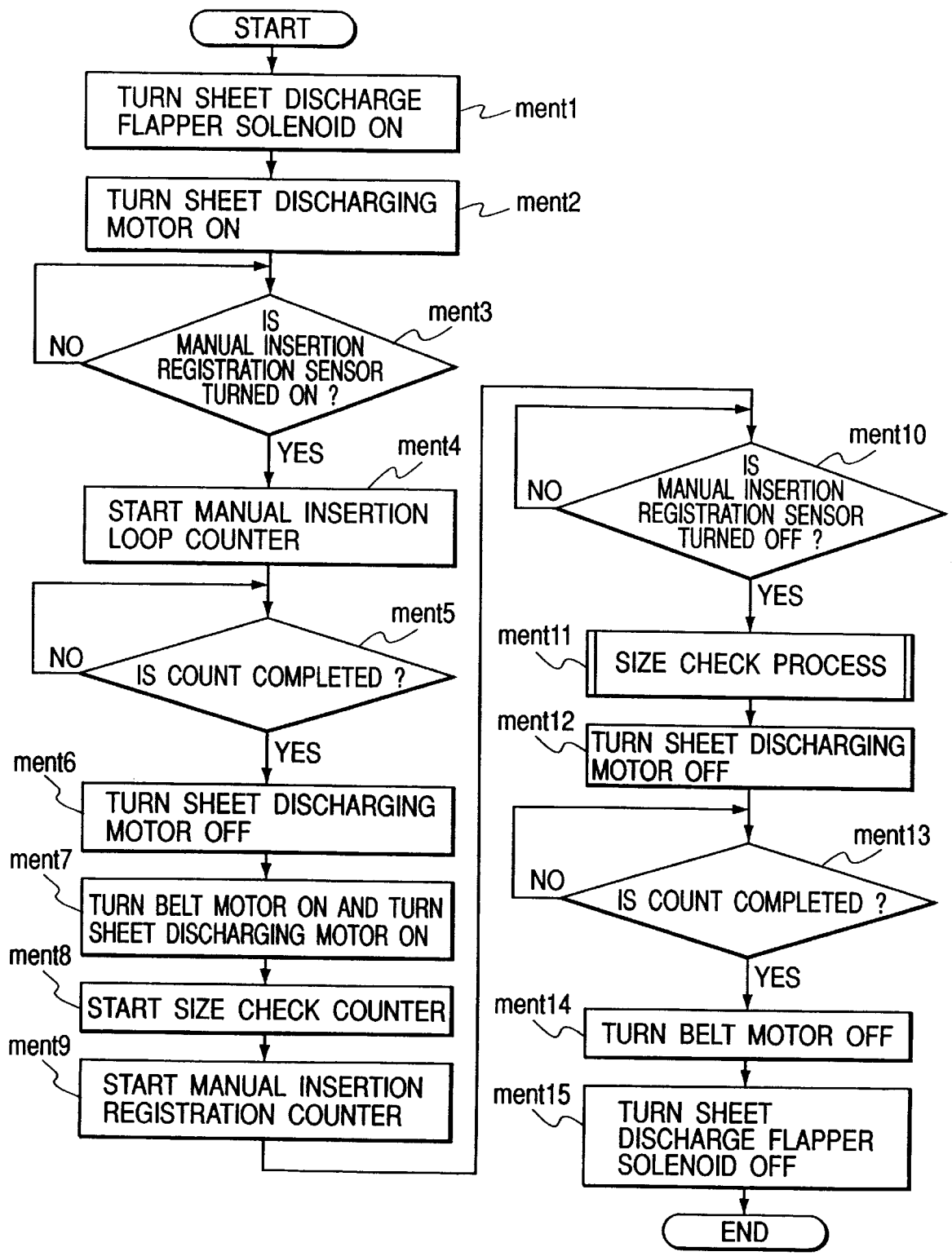
FIG. 41 is a flowchart schematically showing an operation in a manual insertion mode.

Next, the function in this mode will be fully described with reference to FIG. 41. FIG. 41 is a flowchart showing the function in manual insertion mode in detail.

Normally, the sheet discharging flapper solenoid 109 is in the OFF condition so that the sheet discharging flapper 26 and the manual insertion shutter 28 are held at the two dot and chain positions in FIG. 3. More specifically, the tip end of the sheet discharging flapper 26 is located below the platen 3 and the manual insertion shutter 28 is protruded into the original convey path. Accordingly, when the original is set on the manual insertion original tray 14, the leading end of the original abuts against the manual insertion shutter 28.

When the fact that the original is set on the manual insertion original tray 14 is detected by the manually-inserted-original detecting sensor 370, the sheet discharging flapper solenoid 109 is turned ON (ment1 in FIG. 41) to move the sheet discharging flapper 26 and the manual insertion shutter 28 to the solid line positions in FIG. 3 via a linkage (not shown). Further, the sheet discharging motor 104 is driven to rotate the manual insertion sheet feeding roller 13 (ment2 in FIG. 41), thereby conveying the original P1 into the manual insertion convey path K. Meanwhile, the manual insertion, registration roller pair 11 is stopped.

Thereafter, when the passage of the leading end of the original is detected by the manual insertion registration sensor 34 (ON) (ment3 in FIG. 41), a manual insertion loop counter for counting clock signals from a sheet discharge clock is started (ment4 in FIG. 41). At the time when such counting is finished, the sheet discharging motor 104 is stopped (ment5, ment6 in FIG. 41). As a result, the leading end of the original P1 being conveyed by the manual insertion sheet feeding roller 13 abuts against the manual insertion registration roller pair 11 which is now stopped to form a predetermined amount of loop in the original, thereby correcting the skew-feed of the original P1.

Thereafter, the sheet discharging motor 104 and the belt motor 102 are driven (ment7 in FIG. 41) to rotate the manual insertion sheet feeding roller 13, the manual insertion registration roller pair 11 and the wide belt 7. As a result, the original P1 is conveyed from the manual insertion convey path K to the original convey path D.

At the same time when the sheet discharging motor 104 is driven, the size check counter for counting the clock signals from the belt clock is started (ment8 in FIG. 41) and a manual insertion registration counter for counting clock signals from the belt exciting clock is started (ment9 in FIG. 41). When the passage of the trailing end of the original is detected by an OFF-state of the manual insertion registration sensor 34 (ment10 in FIG. 41), the counting of the size check counter is stopped. On the basis of the data from the size check counter, the size check process is effected (ment11 in FIG. 41).

When the fact that the trailing end of the original has passed through the manual insertion sheet feeding roller 13 is ascertained by the OFF-state of the manual insertion registration sensor 34, the sheet discharging motor 104 is turned OFF to stop the manual insertion sheet feeding roller 13 (ment12 in FIG. 41).

When the counting of the manual insertion registration counter is finished (ment13 in FIG. 41), the belt motor 102 (wide belt 7) is stopped (ment14 in FIG. 41) to stop the original P1 at the predetermined position (where the leading end of the original is aligned with the first original end position R1) on the platen 3.

In this condition, by scanning the scanner 204, the original reading process is effected.

The sheet discharging flapper solenoid 109 is turned OFF (ment15 in FIG. 41) and the sheet discharging flapper 26 and the manual insertion shutter 28 are held at the two dot and chain positions in FIG. 3, thereby permitting the setting of a next original.

When the original reading process is finished, the wide belt 7 is rotated in the reverse direction and the sheet discharging roller 12 and the conveying roller 19 are rotated to discharge the original P1 onto the discharge tray 10. Since the sheet discharging flapper 26 is held at the two dot and chain line position, the original can smoothly be discharged without interference with the flapper 26. As mentioned above, as the sheet discharging roller 12 is rotated, although the manual insertion sheet feeding roller 13 is also rotated, since the manual insertion shutter 28 is held at the two dot and chain line position, the feeding of the next original P2 is prevented.

When the next original is detected by the manually-inserted-original detecting sensor 370, the above-mentioned function is repeated. That is to say, the sheet discharging flapper solenoid 109 is turned ON and the sheet discharging motor 104 is driven, with the result that the sheet discharging flapper 26 and the manual insertion shutter 28 are moved to the solid line positions in FIG. 3 and the manual insertion sheet feeding roller 13 is rotated to feed the original.

The technical effect of the embodiment will be explained.

According to the illustrated embodiment, the position of the original conveyed (for example, the waiting position of the original in the original flow-reading process) is determined by the original conveying amount and the rated original length by utilizing the trailing end of the original as a reference in case of the original having fixed size, and, is determined by the original conveying amount by utilizing the leading end of the original as a reference in case of the original having non-fixed size. Accordingly, in both cases (fixed size and non-fixed size), the position of the original can be grasped more correctly than the prior art. As a result, the distance from the waiting position to the optical system fixing position,(R2) can be optimized, thereby preventing occurrence of the sheet jam due to shorter distance.

What is claimed is:

1. A sheet conveying apparatus including:

an original stacker;

conveying means for conveying originals on said original stacker one by one;

a first rotary member for further conveying the original to a reading portion;

a second rotary member for conveying the original conveyed by said first rotary member to read the original;

a reader;

size discriminating means for discriminating whether the original has a fixed size or a non-fixed size;

length detecting means for detecting a length of the original in a conveying direction;

detecting means disposed in the vicinity of said first rotary member for detecting a passage of the original; and control means for controlling an original conveying amount of said second rotary member by an action of said detecting means to stop a leading end of the original in a predetermined position on said reading position, wherein said control means controls the original conveying amount in consideration of a rated length of the original obtained from a discrimination result of said size discriminating means and a detection result of said detecting means based on a timing when a trailing end of the original passes by said detecting means when the original has a fixed size and controls the original conveying amount based on a timing when a leading end of the original passes by said detecting means when the original has a non-fixed size.

2. A sheet conveying apparatus according to claim 1, wherein said predetermined position is a position where the leading end of the original is located immediately in front of said reader, and wherein the temporarily stopped original is conveyed again by said second rotary member in response to input of a reading signal so that an image on the original is read when the original is passed through said reader.

3. A sheet conveying apparatus according to claim 2, wherein said first rotary member comprises a registration roller, and said detecting means has a first sensor disposed immediately at an upstream side of said registration roller and a second sensor disposed immediately at a downstream side of said registration roller.

4. A sheet conveying apparatus according to claim 2, wherein said original stacker is provided with discriminating means for discriminating whether the original has the fixed size or the non-fixed size.

5. A sheet conveying apparatus according to claim 4, wherein said discriminating means comprises a sensor operated in association with original width-wise direction aligning means provided on said original stacker.

6. A sheet conveying apparatus according to claim 2, wherein said first rotary member includes counting means for generating pulses in accordance with rotations of said first rotary member.

7. A sheet conveying apparatus according to claim 2, wherein said first rotary member includes detection means for detecting a length of the original in a conveying direction.

8. An image forming apparatus including a sheet conveying apparatus for conveying an original, image reading means for reading an image on the original, and an image outputting portion for outputting the read image, wherein:

said sheet conveying apparatus including:

conveying means for conveying the original;

size discriminating means for discriminating whether the original has a fixed size or a non-fixed size;

length detecting means for detecting a length of the original in a conveying direction;

sheet detecting means for detecting a timing of passage of a leading end of the original and a timing of passage of a trailing end of the original to generate a signal;

conveying amount detecting means for receiving the signal from said sheet detecting means and for calculating an original conveying amount after the timing of passage of the leading end of the original or the timing of passage of the trailing end of the original; and conveying position calculating means for calculating a position of the leading end of the original conveyed at a downstream side of said sheet detecting means;

and wherein when said size discriminating means discriminates that the original has the fixed size, said conveying position calculating means calculates the position of the leading end of the original based on the original conveying amount after the timing of passage of the trailing end of the original calculated by said conveying amount detecting means and the length of the original in the conveying direction detected by said length detecting means, and, when said size discriminating means discriminates that the original has the non-fixed size, said conveying position calculating means calculates the position of the leading end of the original based on the original conveying amount after the timing of passage of the leading end of the original calculated by said conveying amount detecting means.

9. An image forming apparatus according to claim 8, wherein said size discriminating means discriminates whether the original has the fixed size or the non-fixed size, based on the length of the original in the conveying direction.

10. An image forming apparatus according to claim 8, wherein said size discriminating means discriminates whether the sheet has the fixed size or the non-fixed size, based on a detected width of the sheet.

11. An image forming apparatus according to any one of claims 8 to 10, wherein, in a condition that the original is stopped at a predetermined position by said conveying means, said image reading means reads the image on the stopped original while moving.

12. An image forming apparatus according to any one of claims 8 to 10, wherein said conveying means conveys the original, and said image reading means reads the image on the original being conveyed, in a condition that said image reading means is stopped.

* * * * *

UNITED STATES PATENT AND TRADEMARK OFFICE
CERTIFICATE OF CORRECTION

PATENT NO. : 6,493,113 B1
DATED : December 10, 2002
INVENTOR(S) : Takayuki Fujii et al.

It is certified that error appears in the above-identified patent and that said Letters Patent is hereby corrected as shown below:

Column 6,
Line 21, "the." should read -- the --.

Column 8,
Line 52, "he" should read -- the --.

Column 12,
Line 66, "dot sand" should read -- dots and --.

Column 13,
Line 18, "the-stopper" should read -- the stopper --.

Column 16,
Line 38, "166" should read -- 106 --.

Column 18,
Line 62, "sur face-reverse" should read -- surface-reverse --.

Column 21,
Line 33, "incidentally," should read -- Incidentally, --.

Column 23,
Line 25, "flow-reading process" should read -- Flow-reading Process --.

Column 25,
Line 65, "in continuous" should read -- continuously --.

Column 27,
Line 53, "mode" should read -- mode. --.

Column 29,
Line 21, "elapse" should read -- elapsed --.

UNITED STATES PATENT AND TRADEMARK OFFICE
CERTIFICATE OF CORRECTION

PATENT NO.    : 6,493,113 B1
DATED         : December 10, 2002
INVENTOR(S)   : Takayuki Fujii et al.

It is certified that error appears in the above-identified patent and that said Letters Patent is hereby corrected as shown below:

<u>Column 32,</u>
Line 10, "off" should read -- of --.

Signed and Sealed this

Second Day of September, 2003

JAMES E. ROGAN
*Director of the United States Patent and Trademark Office*